US011010726B2

(12) United States Patent
Sueyoshi et al.

(10) Patent No.: US 11,010,726 B2
(45) Date of Patent: May 18, 2021

(54) INFORMATION PROCESSING APPARATUS, CONTROL METHOD, AND STORAGE MEDIUM

(71) Applicant: SONY CORPORATION, Tokyo (JP)

(72) Inventors: Takahiko Sueyoshi, Tokyo (JP); Atsushi Shionozaki, Tokyo (JP); Hiroshi Iwanami, Tokyo (JP); Keigo Ihara, Tokyo (JP); Yasushi Miyajima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 222 days.

(21) Appl. No.: 15/522,834

(22) PCT Filed: Aug. 4, 2015

(86) PCT No.: PCT/JP2015/072053
§ 371 (c)(1),
(2) Date: Apr. 28, 2017

(87) PCT Pub. No.: WO2016/072117
PCT Pub. Date: May 12, 2016

(65) Prior Publication Data
US 2017/0330160 A1 Nov. 16, 2017

(30) Foreign Application Priority Data

Nov. 7, 2014 (JP) .............................. JP2014-227004

(51) Int. Cl.
*G06Q 20/04* (2012.01)
*G06F 16/2457* (2019.01)
(Continued)

(52) U.S. Cl.
CPC ............. *G06Q 20/04* (2013.01); *G06F 16/00* (2019.01); *G06F 16/24575* (2019.01);
(Continued)

(58) Field of Classification Search
CPC .. G06N 3/008; G06N 3/004; G02B 2027/014;
G02B 27/0172; G06F 3/0011;
(Continued)

(56) References Cited

U.S. PATENT DOCUMENTS

2001/0001318 A1* 5/2001 Kamiya .................. F24F 11/62
700/246
2002/0015514 A1 2/2002 Kinjo
(Continued)

FOREIGN PATENT DOCUMENTS

JP 11-259129 A 9/1999
JP 2002-77592 A 3/2002
(Continued)

OTHER PUBLICATIONS

Office Action dated Jan. 8, 2019 in Japanese Patent Application No. 2016-557469 (with English translation).
(Continued)

*Primary Examiner* — Alexander G Kalinowski
*Assistant Examiner* — Sanjeev Malhotra
(74) *Attorney, Agent, or Firm* — Oblon, McClelland, Maier & Neustadt, L.L.P.

(57) ABSTRACT

An information processing system, a control method and a non-transitory storage medium through which emotional values of objects can be numerically expressed based on an interaction between the objects are provided. The information processing system includes a detection unit that detects information related to an interaction between a first object and a second object; and a generation unit that is capable of generating an emotion value of the first object and an emotion value of the second object on the basis of the information related to the interaction.

12 Claims, 50 Drawing Sheets

(51) Int. Cl.
  *G06Q 30/08* (2012.01)
  *G06Q 30/02* (2012.01)
  *G06Q 50/00* (2012.01)
  *G06F 16/00* (2019.01)
  *G06F 21/62* (2013.01)
  *G01D 9/00* (2006.01)

(52) U.S. Cl.
  CPC ......... *G06F 21/6263* (2013.01); *G06Q 30/02* (2013.01); *G06Q 30/08* (2013.01); *G06Q 50/00* (2013.01); *G01D 9/00* (2013.01)

(58) Field of Classification Search
  CPC ..... G06F 3/0012; G06T 19/006; G10L 17/26; A63F 13/212; A63F 13/235; A63F 13/56; A63F 13/58; A63F 2300/65; A63F 2300/6623; B25J 13/003; G06K 9/00335; G06Q 50/01; G06Q 30/02; G06Q 30/08; G06Q 40/06; G06Q 50/22
  USPC ............. 700/245, 246; 705/2, 14.36, 16, 22, 705/36 R, 37, 321, 35, 38, 39; 704/236, 704/246, 270; 709/204, 270; 706/11, 14; 715/744; 702/182; 318/568.11; 345/173, 633; 463/1, 31, 36, 40, 42; 250/306; 1/1
  See application file for complete search history.

(56) References Cited

U.S. PATENT DOCUMENTS

| | | | |
|---|---|---|---|
| 2002/0019678 | A1 | 2/2002 | Mizokawa |
| 2002/0023034 | A1* | 2/2002 | Brown ............... G06Q 40/04 705/36 R |
| 2002/0069036 | A1* | 6/2002 | Mizokawa ........... G06N 3/004 702/182 |
| 2002/0147650 | A1* | 10/2002 | Kaufman ............ G06Q 20/203 705/22 |
| 2002/0158599 | A1* | 10/2002 | Fujita .................. G10L 15/26 318/568.11 |
| 2002/0165642 | A1* | 11/2002 | Sakaue ................ B25J 13/084 700/245 |
| 2003/0069863 | A1* | 4/2003 | Sadakuni ............. G06N 3/008 706/11 |
| 2003/0182123 | A1* | 9/2003 | Mitsuyoshi .......... G10L 17/26 704/270 |
| 2004/0133596 | A1* | 7/2004 | Fujita ................. G06Q 10/06 |
| 2007/0149282 | A1* | 6/2007 | Lu ..................... A63F 13/06 463/36 |
| 2007/0150099 | A1* | 6/2007 | Lee .................... G06N 3/008 700/245 |
| 2008/0040110 | A1* | 2/2008 | Pereg ................. G10L 17/26 704/236 |
| 2008/0077277 | A1* | 3/2008 | Park ................... G06N 3/008 700/245 |
| 2008/0116374 | A1* | 5/2008 | Ouchi ................. G01S 13/887 250/306 |
| 2008/0195566 | A1* | 8/2008 | Lee .................... G06N 3/004 706/14 |
| 2008/0228640 | A1* | 9/2008 | Brown ................ G06Q 40/04 705/39 |
| 2009/0006242 | A1* | 1/2009 | Adjali ................ G06Q 30/08 705/37 |
| 2009/0082076 | A1* | 3/2009 | Annunziata ......... A63F 13/12 463/1 |
| 2010/0145695 | A1* | 6/2010 | Jung ................... G10L 17/26 704/246 |
| 2011/0161218 | A1* | 6/2011 | Swift .................. G06Q 40/02 705/35 |
| 2012/0011007 | A1* | 1/2012 | Blewett .............. G06Q 20/3272 705/16 |
| 2012/0158613 | A1* | 6/2012 | Bollen ................. G06Q 40/06 705/36 R |
| 2012/0311032 | A1* | 12/2012 | Murphy ............... A63F 13/21 709/204 |
| 2013/0060624 | A1* | 3/2013 | Davis .................. G06Q 30/06 705/14.36 |
| 2013/0185648 | A1* | 7/2013 | Kim .................... G06F 3/048 715/744 |
| 2013/0275320 | A1* | 10/2013 | Moore ................. G06Q 50/01 705/321 |
| 2014/0172677 | A1* | 6/2014 | King ................... G06Q 40/025 705/38 |
| 2014/0188501 | A1* | 7/2014 | Wong .................. G06Q 10/103 705/2 |
| 2014/0274414 | A1* | 9/2014 | Annunziata ......... A63F 13/58 463/42 |
| 2015/0169122 | A1* | 6/2015 | Kulik .................. G06F 3/04883 345/173 |
| 2015/0258458 | A1* | 9/2015 | Zhang ................. H04L 67/38 463/40 |
| 2015/0348200 | A1* | 12/2015 | Fair .................... G06Q 40/06 705/36 R |
| 2015/0363996 | A1* | 12/2015 | Keilwert ............. G07F 17/3209 463/31 |
| 2016/0035135 | A1* | 2/2016 | Park ................... G06T 19/006 345/633 |
| 2016/0093107 | A1* | 3/2016 | Yamamoto ......... A63F 13/212 345/633 |
| 2018/0144425 | A1* | 5/2018 | Shakil ................. G06Q 10/10 |

FOREIGN PATENT DOCUMENTS

| | | | |
|---|---|---|---|
| JP | 2005-124909 A | | 5/2005 |
| JP | 2006-140747 A | | 6/2006 |
| JP | 2007-213324 A | | 8/2007 |
| JP | 2008-15585 A | | 1/2008 |
| WO | WO 2012/166989 A2 | | 12/2012 |

OTHER PUBLICATIONS

International Search Report dated Nov. 10, 2015 in PCT/JP2015/072053 filed Aug. 4, 2015.

Kawamura, Ai et al., "An Activity Evaluation by Introducing Feature Vector for Complex Sensor Data in a Ubiquitous Environment," Dai 2 Kai Forum on Data Engineering and Information Management—DEIM 2010—Ronbunshu, May 2010, 9 pages.

Ai Kawamura et al., "An Activity Evaluation by Introducing Feature Vector for Complex Sensor Data in a Ubiquitous Environment", Dai 2 Kai Forum on Data Engineering and Information Management—DEIM 2010—Ronbunshu, May 2010, (Reference Previously Filed, Submitting English Translation only), 29 pages.

Combined Chinese Office Action and Search Report dated Mar. 10, 2020, in Patent Application No. 201580059299.0, citing documents AA and AO therein, 28 pages (with unedited computer generated English translation).

* cited by examiner

FIG.7

| OBJECT ID | TYPE | MAKER ID | MODEL NUMBER | SERIAL NUMBER | MANUFACTURE DATE AND TIME (OBJECT GENERATION DATE AND TIME) |
|---|---|---|---|---|---|
| 384 | DIGITAL CAMERA | 32 | aabb-5 | 343521123 | 2010/11/12 |
| 18000555 | PERSON・MALE | - | - | - | 1982/07/15 |
| 5505 | CAR | 234104 | Sky | 2355234 | 2000/07/31 |
| 10324 | DIGITAL CAMERA | 32 | aabb-5 | 345123453 | 2010/12/04 |
| 11401 | DETACHED HOUSE | 1484 | - | - | 1980/03/16 |
| 5963084 | PERSON・MALE | - | - | - | 1973/11/24 |
| ... | | | | | |

FIG.8

| OBJECT ID | DATE AND TIME AND PERIOD | RELATED OBJECT ID | INTERACTION TYPE | DETAILS | EVALUATION (-1.0~1.0) |
|---|---|---|---|---|---|
| 18000555 | 2000/06/21 | 5505 | DRIVING | ACCELERATOR OPERATION: CAREFUL BRAKE OPERATION: CAREFUL STEERING WHEEL OPERATION: SLOW | 1 |
| 5505 | 2000/06/21 | 18000555 | DRIVEN | FUEL EFFICIENCY: GOOD BRAKE WEAR: SMALL | 1 |
| ... | | | | | |
| 11401 | 1980/3/16~ | 18000555 | OWNER CHANGE | 11000444→18000555 | 0 |
| 18000555 | 1980/3/16~ | 11401 | PURCHASE | LIKE AND PURCHASE | 1 |
| 11401 | 2010/05/05 | 18000555 | EXCHANGE | WALLPAPER, BASE PLATE | 1 |
| 18000555 | 2010/05/05 | 11401 | MAINTENANCE | REFORM | 1 |
| 11401 | 2012/05/05 | 18000555 | CLEANING | WINDOW CLEANING, SCREEN CLEANING | 1 |
| 18000555 | 2012/05/05 | 11401 | MAINTENANCE | CLEANING | 1 |
| 11401 | 2014/09/07 | 18000555 | CLEANING | KITCHEN AND VENTILATING FAN CLEANING | 1 |
| 18000555 | 2014/09/07 | 11401 | MAINTENANCE | CLEANING | 1 |
| ... | | | | | |

FIG.12

| OBJECT ID | DATE AND TIME AND PERIOD | RELATED OBJECT ID | INTERACTION TYPE | DETAILS | EVALUATION (-1.0~1.0) |
|---|---|---|---|---|---|
| 18000555 | 1980/3/16~ | 11401 | PURCHASE | LIKE AND PURCHASE | 1 |
| 18000555 | 2010/05/05 | 11401 | MAINTENANCE | REFORM | 1 |
| 18000555 | 2012/05/05 | 11401 | MAINTENANCE | CLEANING | 1 |
| 18000555 | 2014/09/07 | 11401 | MAINTENANCE | CLEANING | 1 |

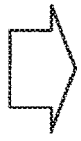

AS OF SEPTEMBER, 2014,

ELAPSED YEAR: MARCH, 1980 TO SEPTEMBER, 2014 = 414 MONTHS
MAINTENANCE INTERVAL 1: MARCH, 1980 TO MAY, 2010 = 362 MONTHS
MAINTENANCE INTERVAL 2: MAY, 1910 TO MAY, 2012 = 24 MONTHS
MAINTENANCE INTERVAL 3: MARCH, 1912 TO SEPTEMBER, 2014 = 28 MONTHS

EMOTION VALUE = $\alpha$ INITIAL COEFFICIENT × (INITIAL EVALUATION VALUE / ELAPSED YEARS)
+ $\Sigma$ $\alpha$ MAINTENANCE DEGREE COEFFICIENT × (MAINTENANCE EVALUATION / MAINTENANCE INTERVAL)

= $\alpha$ INITIAL COEFFICIENT × $(\frac{1}{414})$ + [$\alpha$ MAINTENANCE DEGREE COEFFICIENT × $(\frac{1}{362})$ + $\alpha$ MAINTENANCE DEGREE COEFFICIENT × $(\frac{1}{24})$ + $\alpha$ MAINTENANCE DEGREE COEFFICIENT × $(\frac{1}{28})$ ]

FIG.18

| EXHIBITION ID | TYPE ID | ITEM OBJECT ID | EXHIBITOR OBJECT ID | EXHIBITION DATE AND TIME | END DATE AND TIME | CURRENT PRICE | BID LIST | DESCRIPTION OF ITEM |
|---|---|---|---|---|---|---|---|---|
| 23442 | 576753 | 384 | 5963084 | 2014/09/01 | 2014/09/20 | ¥25,100 | ... | IT'S BEAUTIFUL! |
| 23443 | 87656 | 98092 | 7654239 | 2014/09/02 | 2014/09/20 | ¥894,500 | ... | IT'S PRESENT FROM GUEST AND UNUSED! |
| 23444 | 45493 | 385402 | 375354 | 2014/09/02 | 2014/09/18 | ¥340 | NONE | CHARGED 1,000 TIMES |
| 23445 | 576753 | 10324 | 180000555 | 2014/09/04 | 2014/09/18 | ¥23,400 | ... | IT HAS NOT BEEN USED RECENTLY, SO I WANT TO SELL |
| 23446 | 5256 | 455342 | 2254533 | 2014/09/05 | 2014/09/30 | ¥33,400 | ... | IT WAS EXCELLENT |
| ... | | | | | | | | |

FIG.19

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 5505 | 2000/06/21 | 18000555 | DRIVING | ACCELERATOR OPERATION : CAREFUL BRAKE OPERATION : CAREFUL STEERING WHEEL OPERATION : SLOW | 0.88 |
| 18000555 | 2000/06/21 | 5505 | DRIVEN | ACCELERATOR OPERATION : CAREFUL BRAKE OPERATION : CAREFUL STEERING WHEEL OPERATION : SLOW | 0.88 |
| ... | | | | | |
| 1930213 | 2010/08/11 | 384 | OPERATING | CAREFUL | 0.92 |
| 384 | 2010/08/11 | 1930213 | OPERATED | CAREFUL | 0.92 |
| 4649 | 2012/04/09 | 384 | OPERATING | ROUGH | -0.56 |
| 384 | 2012/04/09 | 4649 | OPERATED | ROUGH | -0.56 |
| 5963084 | 2014/05/01~ 2014/11/04 | 384 | STORING | DUST : LITTLE AVERAGE HUMIDITY : 18% | 0.88 |
| 384 | 2014/05/01~ 2014/11/04 | 5963084 | STORED | DUST : LITTLE AVERAGE HUMIDITY : 18% | 0.88 |
| 5963084 | 2014/05/01 | 384 | OPERATING | CAREFUL | 0.73 |
| 384 | 2014/05/01 | 5963084 | OPERATED | CAREFUL | 0.73 |
| ... | | | | | |

FIG.23

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 384 | 2010/08/11 | 1930213 | OPERATED | CAREFUL | 0.92 |
| 384 | 2012/04/09 | 4649 | OPERATED | ROUGH | -0.56 |
| 384 | 2014/05/01~ 2014/11/04 | 5963084 | STORED | DUST: LITTLE AVERAGE HUMIDITY: 18% | 0.88 |
| 384 | 2014/05/01 | 5963084 | OPERATED | CAREFUL | 0.73 |

EXAMPLE OF CALCULATION OF ABSOLUTE EMOTION VALUE OF ID384 :

$$\frac{\alpha \text{OPERATING} * ((0.92 + -0.56 + 0.73)/3) + \alpha \text{STORING} * ((0.88/1)}{2}$$

EXAMPLE OF CALCULATION OF RELATIVE EMOTION VALUE OF ID384 WITH RESPECT TO ID5963084 :

$$\frac{\alpha \text{OPERATING} * ((0.73/1) + \alpha \text{STORING} * ((0.88/1)}{2}$$

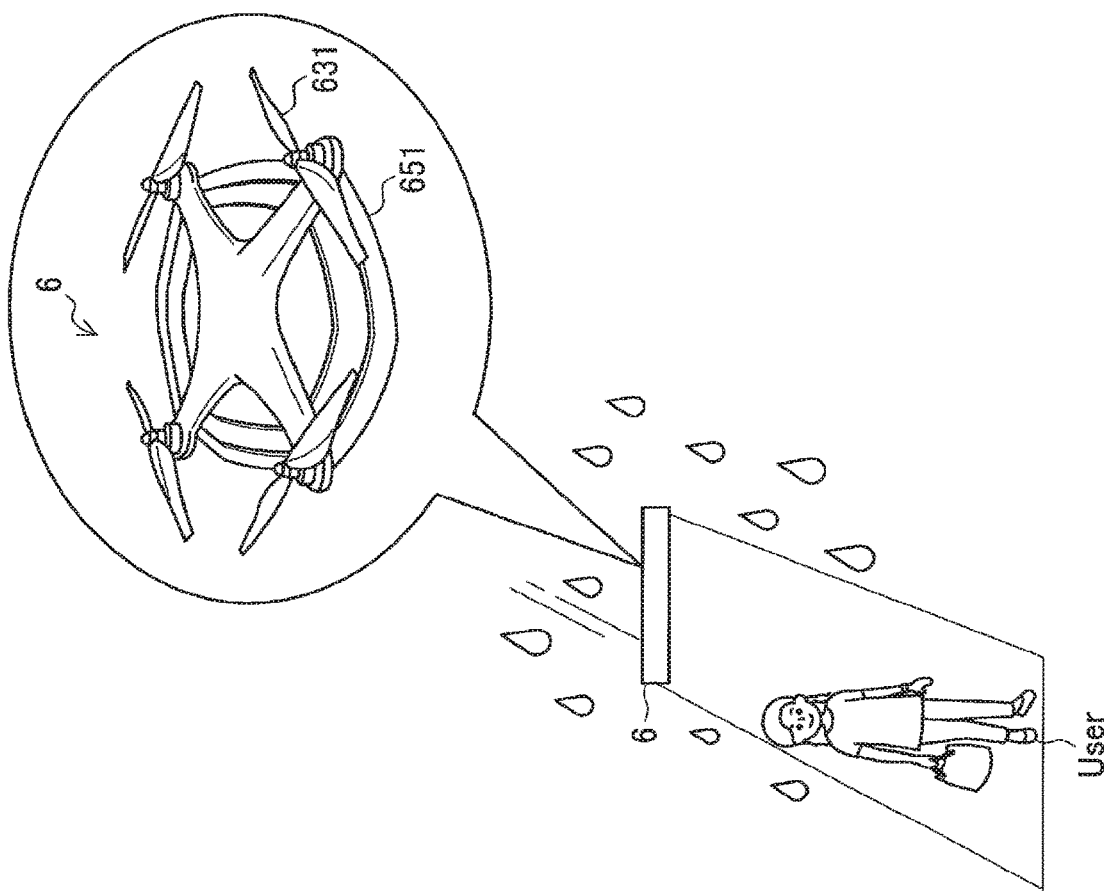
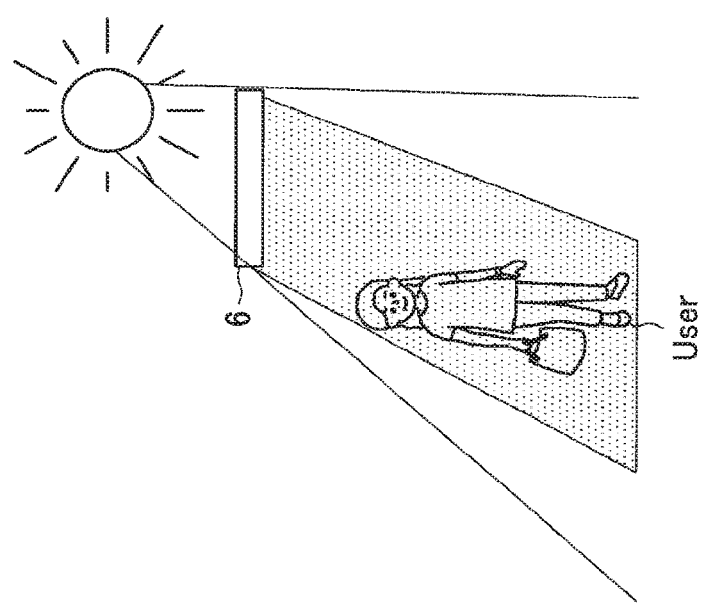
FIG.28

FIG.33

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 7007 | 2007/07/04 | 7008 | CONVERSATION | PJ MEETING | 0.1 |
| 7008 | 2007/07/04 | 7007 | CONVERSATION | PJ MEETING | 0.1 |
| 7007 | 2007/07/04 | 7008 | MAIL | EXCHANGE OF PJ | 0.1 |
| 7008 | 2007/07/04 | 7007 | MAIL | EXCHANGE OF PJ | 0.1 |
| ... | | | | | |
| 7007 | 2014/08/22 | 7008 | CONVERSATION | CUSTOMER MEETING | 0.3 |
| 7008 | 2014/08/22 | 7007 | CONVERSATION | CUSTOMER MEETING | 0.1 |
| 7007 | 2014/08/22 | 7008 | CONTACT OUTSIDE WORK | TWO PERSONS GO TO DRINK | 0.5 |
| 7008 | 2014/08/22 | 7007 | CONTACT OUTSIDE WORK | TWO PERSONS GO TO DRINK | 0.3 |
| 7007 | 2014/08/22 | 7008 | CONVERSATION | LIFE COUNSEL | 0.9 |
| 7008 | 2014/08/22 | 7007 | CONVERSATION | LIFE COUNSEL | 0.3 |
| 7007 | 2014/08/25 | 7008 | MAIL | EXCHANGE OF PJ | 0.7 |
| 7008 | 2014/08/25 | 7007 | MAIL | EXCHANGE OF PJ | 0.3 |
| 7007 | 2014/08/25 | 7008 | CONVERSATION | NORMAL | 0.7 |
| 7008 | 2014/08/25 | 7007 | CONVERSATION | NORMAL | 0.3 |
| 7007 | 2014/08/30 | 7008 | CONTACT OUTSIDE WORK | COMPANY RECREATION | 0.7 |
| 7008 | 2014/08/30 | 7007 | CONTACT OUTSIDE WORK | COMPANY RECREATION | 0.5 |
| 7007 | 2014/08/30 | 7008 | CONVERSATION | EVENT | 0.9 |
| 7008 | 2014/08/30 | 7007 | CONVERSATION | EVENT | 0.3 |
| 7007 | 2014/09/01 | 7008 | CONVERSATION | CHAT | 0.7 |
| 7008 | 2014/09/01 | 7007 | CONVERSATION | CHAT | 0.3 |
| ... | | | | | |

FIG. 34

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 8165 | 2014/06/01~ 2014/09/01 | 80075 | STORING | STORING IN SPECIALLY DESIGNED CASE | 0.5 |
| 80075 | 2014/06/01~ 2014/09/01 | 8165 | STORING | STORING IN SPECIALLY DESIGNED CASE | 0.5 |
| 8165 | 2014/09/01~ 2014/09/15 | 80075 | MAINTENANCE | OVERHAUL MAINTENANCE BY EXPERT | 0.7 |
| 80075 | 2014/09/01~ 2014/09/15 | 8165 | MAINTENANCE | OVERHAUL MAINTENANCE BY EXPERT | 0.7 |
| 8165 | 2014/09/16 | 80075 | WEARING | DINNER | 0.9 |
| 80075 | 2014/09/16 | 8165 | WEARING | DINNER | 0.9 |
| 8165 | 2014/09/16 | 80075 | STORING | STORING IN SPECIALLY DESIGNED CASE | -0.3 |
| 80075 | 2014/09/16 | 8165 | STORING | STORING IN SPECIALLY DESIGNED CASE | -0.3 |
| 8165 | 2014/09/17 | 80075 | WEARING | PRESS EVENT | 0.7 |
| 80075 | 2014/09/17 | 8165 | WEARING | PRESS EVENT | 0.3 |
| 8165 | 2014/09/17 | 80075 | MAINTENANCE | WIPING | 0.3 |
| 80075 | 2014/09/17 | 8165 | MAINTENANCE | WIPING | 0.3 |
| 8165 | 2014/09/18~ 2014/09/20 | 80075 | STORING | STORING IN SPECIALLY DESIGNED CASE | 0.3 |
| 80075 | 2014/09/18~ 2014/09/20 | 8165 | STORING | STORING IN SPECIALLY DESIGNED CASE | 0.3 |
| 8165 | 2014/09/21 | 80075 | ENJOYING | TAKE OUT OF CASE, SHOW TO FRIEND AND SAY THAT IT IS KEEPSAKE | 0.7 |
| 80075 | 2014/09/21 | 8165 | ENJOYING | TAKE OUT OF CASE, SHOW TO FRIEND AND SAY THAT IT IS KEEPSAKE | 0.7 |
| 8165 | 2014/09/21~ 2014/12/15 | 80075 | STORING | STORING IN SPECIALLY DESIGNED CASE | 0.3 |
| 80075 | 2014/09/21~ 2014/12/15 | 8165 | STORING | STORING IN SPECIALLY DESIGNED CASE | 0.3 |
| ... | | | | | |

FIG.40

| OBJECT ID | DATE AND TIME AND PERIOD | RELATED OBJECT ID | INTERACTION | DETAILS | EVALUATION (-1.0 ~ 1.0) |
|---|---|---|---|---|---|
| 5505 (USER B) | 2010/10/02 19:00~21:32 | 15850002 (TV) | WATCH | ENTHUSIASTICALLY | 0.8 |
| 15850002 | 2010/10/02 19:00~21:32 | 5505 | WATCHED | FREQUENTLY CHANGE CHANNELS | 0.1 |
| 5505 | 2010/10/02 20:12 | 15850002 | THROW OBJECT | DUE TO EXCITATION FROM PROGRAM | -0.1 |
| 15850002 | 2010/10/02 20:12 | 5505 | OBJECT IS THROWN | DAMAGED BY HITTING | -0.8 |
| 5505 | 2011/02/03 23:12~23:44 | 6532 (USER A) | MAKE PHONE CALL | LOOK UPSET | -0.1 |
| 5505 | 2011/02/03 23:12~23:44 | 17830003 (TELEPHONE #1) | MAKE PHONE CALL | IN LOUD VOICE | 0.1 |
| 17830003 | 2011/02/03 23:12~23:44 | 5505 | MAKE PHONE CALL | WHILE FREQUENTLY PULLING CABLE OF RECEIVER OF TELEPHONE | -0.5 |
| ... | | | | | |

FIG.41

| OBJECT ID | DATE AND TIME AND PERIOD | RELATED OBJECT ID | INTERACTION | DETAILS | EVALUATION (-1.0 ~ 1.0) |
|---|---|---|---|---|---|
| 15850002 | 2010/10/02 19:00~21:32 | 5505 | WATCHED | FREQUENTLY CHANGE CHANNELS | 0.1 |
| 15850002 | 2010/10/02 20:12 | 5505 | OBJECT IS THROWN | DAMAGED BY HITTING | -0.8 |
| 17830003 | 2011/02/03 23:12~23:44 | 5505 | MAKE PHONE CALL | WHILE FREQUENTLY PULLING CABLE OF RECEIVER OF TELEPHONE | -0.5 |

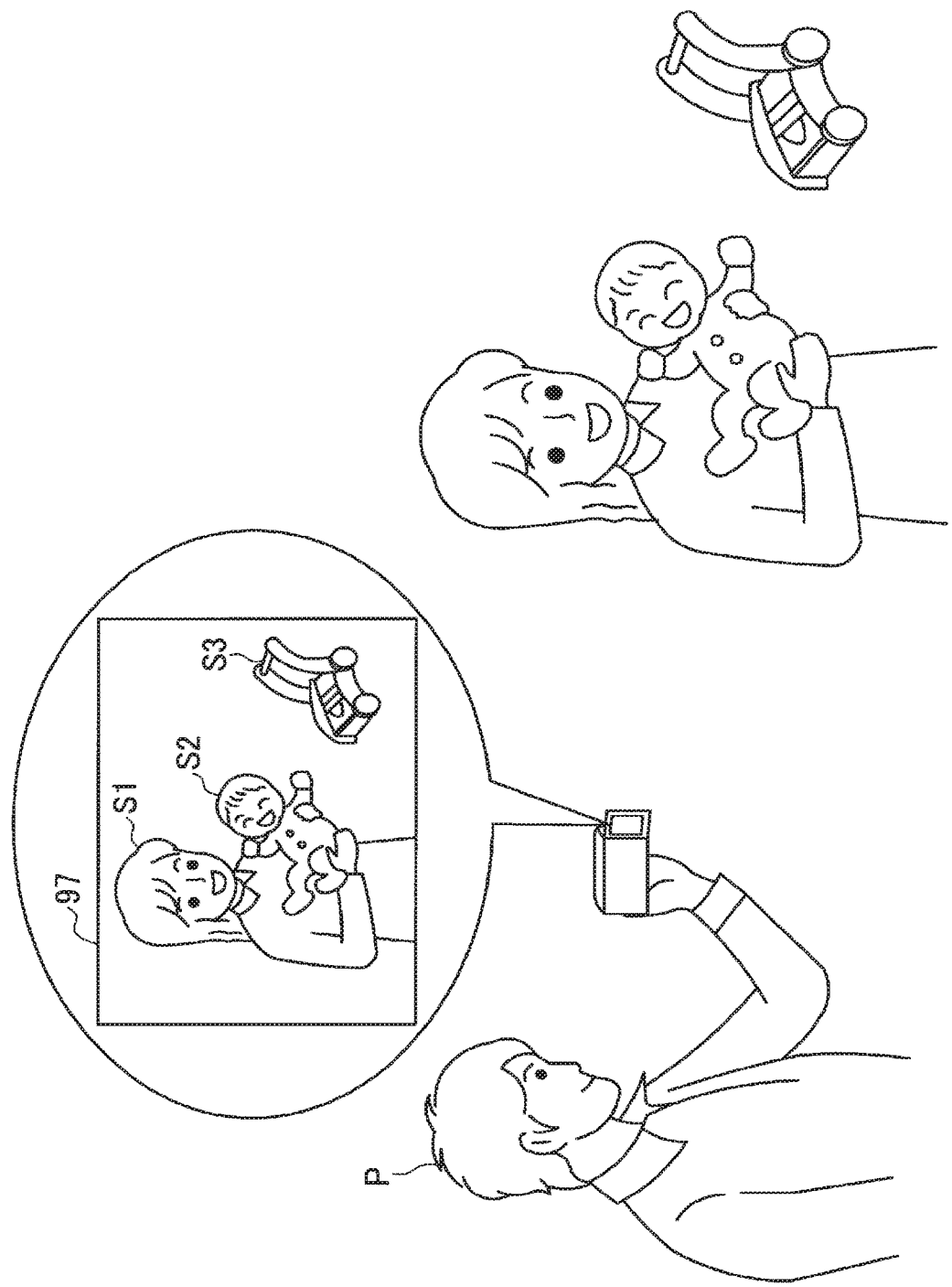

FIG.46

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 312039 | 2013/12/24 | 105384093 | GAVE | GAVE ACCESSARY | 0.7 |
| 105384093 | 2013/12/24 | 312039 | RECEIVED | RECEIVED ACCESSARY | 1.00 |
| 5505 | 2014/01/12 | 18000555 | STORED | INDOOR/SHADE/PAVEMENT | 0.85 |
| 18000555 | 2014/01/12 | 5505 | WAS STORED | INDOOR/SHADE/PAVEMENT | 1.00 |
| ... | | | | | |
| 312039 | 2014/01/14 | 15122014 | PHYSICAL AFFECTION | HUG | 0.86 |
| 15122014 | 2014/01/14 | 312039 | PHYSICAL AFFECTION | HUGGED | 0.9 |
| 105384093 | 2014/05/10 | 312039 | CONVERSATION | CONTENT: SLIGHTLY NEGATIVE | -0.23 |
| 312039 | 2014/05/10 | 105384093 | CONVERSATION | CONTENT: SLIGHTLY POSITIVE | 0.12 |
| 15122014 | 2014/05/21 | 101960 | PLAY | CONCENTRATION: HIGH TIME: 20 MINUTES | 0.86 |
| 101960 | 2014/05/21 | 15122014 | PLAY | HANDLING: SLIGHTLY ROUGH TIME: 20 MINUTES | 0.3 |
| ... | | | | | |

FIG.47

| OBJECT ID | DATE AND TIME AND PERIOD | RELATED OBJECT ID | INTERACTION TYPE | DETAILS | EVALUATION (-1.0~1.0) |
|---|---|---|---|---|---|
| 312039 | 2013/12/24 | 105384093 | GAVE | ACCESSARY | 0.7 |
| 105384093 | 2013/12/24 | 312039 | RECEIVED | RECEIVED ACCESSARY | 1.00 |
| 312039 | 2014/01/12 | 101960 | STORED | COVERED INDOORS | 0.85 |
| 101960 | 2014/01/12 | 312039 | WAS STORED | COVERED INDOORS | 1.00 |
| ... | | | | | |
| 312039 | 2014/01/14 | 15122014 | PHYSICAL AFFECTION | HUG | 0.86 |
| 15122014 | 2014/01/14 | 312039 | RECEIVED PHYSICAL AFFECTION | HUGGED | 0.9 |
| 105384093 | 2014/05/10 | 312039 | CONVERSATION | CONTENT: SLIGHTLY NEGATIVE | -0.23 |
| 312039 | 2014/05/10 | 105384093 | CONVERSATION | CONTENT: SLIGHTLY POSITIVE | 0.12 |
| ... | | | | | |

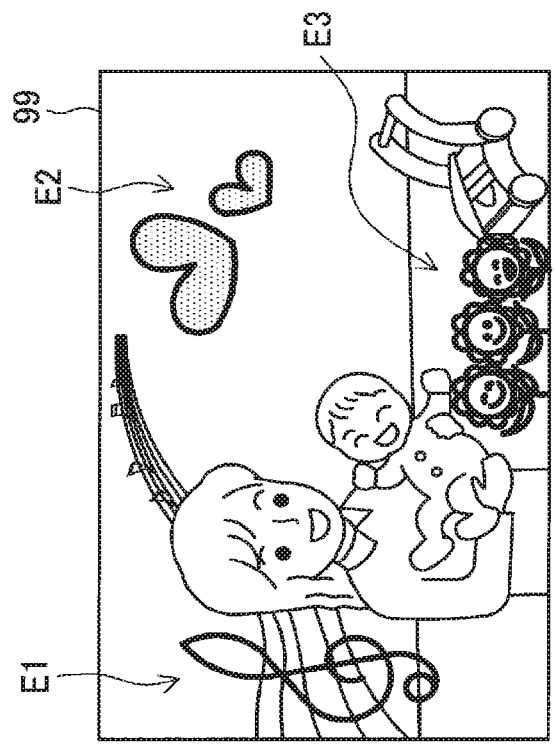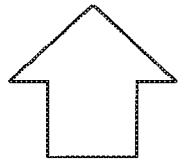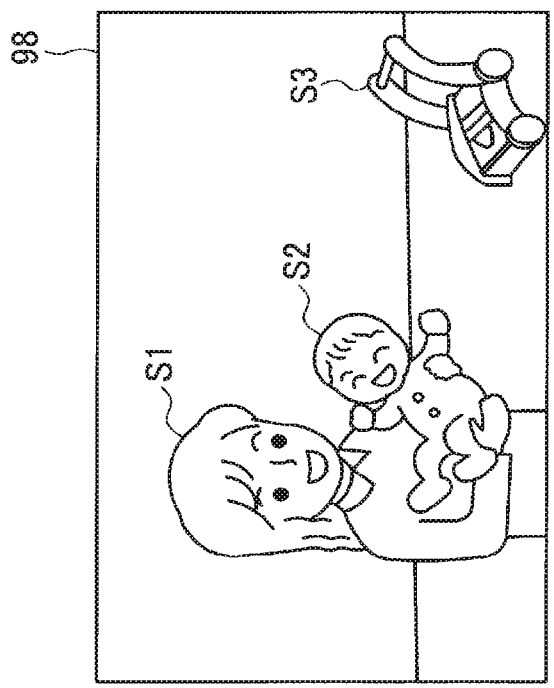
FIG.50

INFORMATION PROCESSING APPARATUS, CONTROL METHOD, AND STORAGE MEDIUM

TECHNICAL FIELD

The present disclosure relates to an information processing apparatus, a control method, and a storage medium.

BACKGROUND ART

Recently, emotions of people at certain times have been estimated from bio-information and the like and used for content data search, information recommendation and the like.

For example, Patent Literature 1 below discloses a technology for obtaining an emotion parameter indicating an emotional degree on the basis of bio-information such as heartbeat and blood pressure and converting the emotion parameter into one-dimensional emotion money.

CITATION LIST

Patent Literature

Patent Literature 1: JP 2005-124909A

DISCLOSURE OF INVENTION

Technical Problem

However, in the Patent Literature 1 above and previous technologies, human emotions (pleasant/unpleasant) were estimated on the basis of bio-information mainly and virtual psychological states of articles were not mentioned.

For example, even for the same item, a user may have different thoughts and affections with respect to the article in a case in which the user carefully uses the article with affection and a case in which the user roughly handles the article. However, there was no technology for measuring this and objectively notifying a third party of the measurement result.

In this manner, articles may have individual values in addition to functions and designs thereof even when the articles are identical items.

Accordingly, the present disclosure proposes an information processing apparatus, a control method and a storage medium through which emotional values of objects can be numerically expressed on the basis of an interaction between the objects.

Solution to Problem

According to the present disclosure, there is proposed an information processing system including: a detection unit that detects information related to an interaction between a first object and a second object; and a generation unit that is capable of generating an emotion value of the first object and an emotion value of the second object on the basis of the information related to the interaction.

According to the present disclosure, there is proposed a control method including: detecting information related to an interaction between a first object and a second object; and being capable of generating an emotion value of the first object and an emotion value of the second object on the basis of the information related to the interaction.

According to the present disclosure, there is proposed a storage medium having a program stored therein, the program causing a computer to function as: a detection unit that detects information related to an interaction between a first object and a second object; and a generation unit that is capable of generating an emotion value of the first object and an emotion value of the second object on the basis of the information related to the interaction.

Advantageous Effects of Invention

According to the present disclosure, as described above, it is possible to numerically express emotional values of objects on the basis of an interaction between the objects.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an illustration of an example of data of an object DB of an emotion server according to the first application example.

FIG. 8 is an illustration of an example of data of an emotion information DB of the emotion server according to the first application example.

FIG. 12 is an explanatory diagram of calculation of a relative emotion value of a target person with respect to a house according to the first application example.

FIG. 18 is an illustration of an example of data of exhibited items stored in an item and user information DB of the auction server according to the second application example.

FIG. 19 is an illustration of an example of data of an emotion information DB of an emotion server according to the second application example.

FIG. 23 is an explanatory diagram of calculation of relative/absolute emotion values of exhibited items according to the second application example.

FIG. 28 is an explanatory diagram of an example of environment adjustment by a moving object according to the third application example.

FIG. 33 is an illustration of an example of interaction evaluation data according to the present embodiment.

FIG. 34 is an illustration of an example of other data of interaction evaluation according to the third application example.

FIG. 40 is an illustration of an example of interaction evaluation data according to the fourth application example.

FIG. 41 is an illustration of an example of data obtained by extracting data used for emotion value calculation from the example of data of interaction evaluation values illustrated in FIG. 40.

FIG. 45 is an explanatory diagram of subject recognition according to the fifth application example.

FIG. 46 is an illustration of an example of interaction evaluation data according to the fifth application example.

FIG. 47 is an illustration of an example of data extracted from the example of interaction evaluation data illustrated in FIG. 46 and used for emotion value calculation.

FIG. 50 is an illustration of examples of image effects arranged to correspond to respective subjects depending on emotion values according to the fifth application example.

MODE(S) FOR CARRYING OUT THE INVENTION

Figure 1:
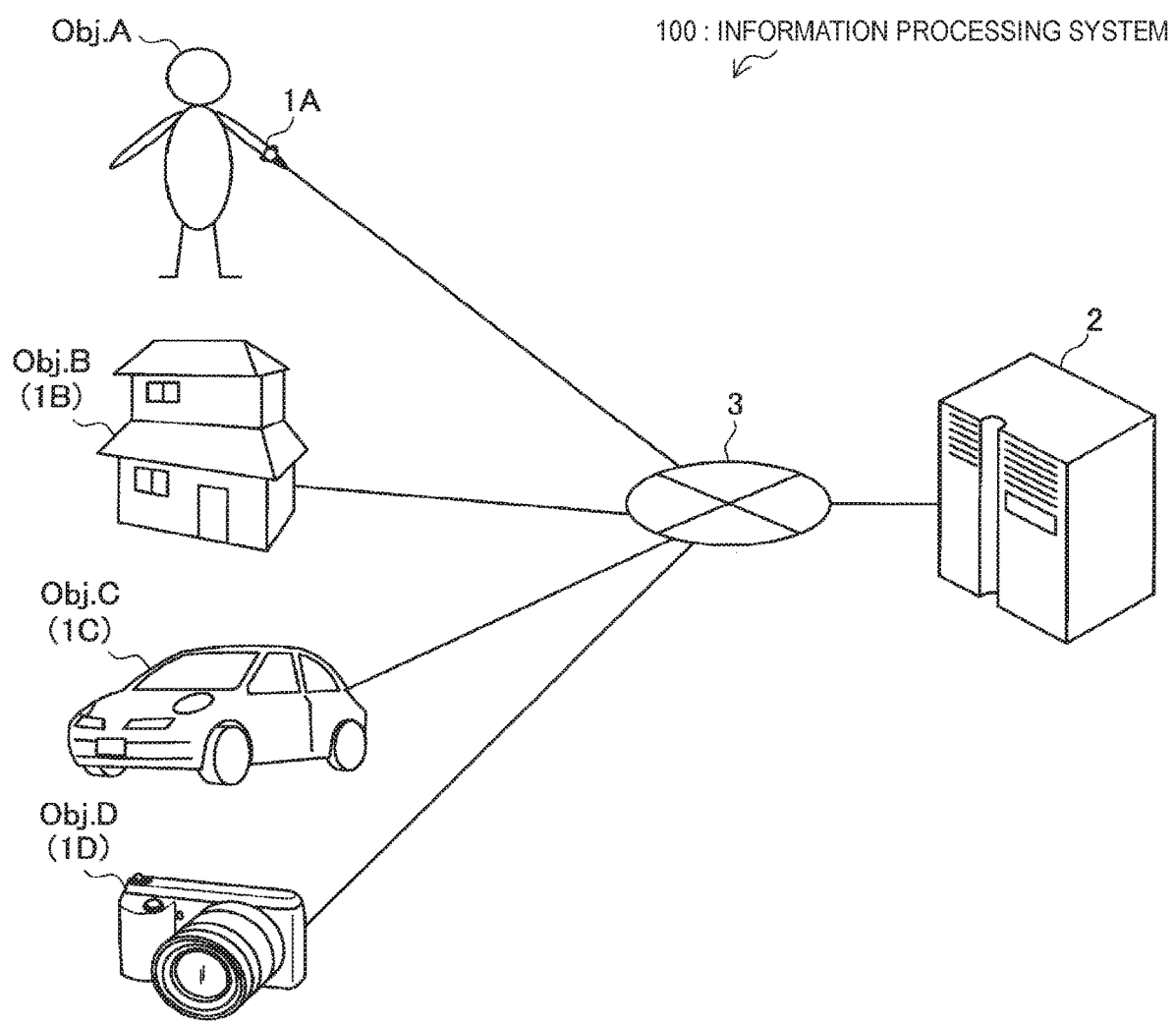
FIG. 1 is an explanatory diagram of an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Overview of information processing system according to embodiment of present disclosure
2. Basic configurations and operation processes
2-1. Sensing device
2-2. Emotion server
2-3. Operation process
3. Application examples
3-1. Personal credit information provision system
3-2. Auction system
3-3. Environment adjustment system
3-4. Telepresence system
3-5. Presence reproduction system
4. Conclusion

1. OVERVIEW OF INFORMATION PROCESSING SYSTEM ACCORDING TO EMBODIMENT OF PRESENT DISCLOSURE

First of all, an overview of an information processing system 100 according to an embodiment of the present disclosure illustrated in FIG. 1 will be described. As illustrated in FIG. 1, in the information processing system 100 according to the present embodiment, all of a person and articles are defined as objects and a sensing device 1 (10A to 10D) for detecting an inter-object interaction is provided on each of the objects (Obj.A to Obj.D). For example, a sensing device 1A realized by a wearable device such as a watch type device is attached to a person Obj.A. In addition, a sensing device 1B capable of detecting opening/closing of doors, entrance/exit of people, the repair of a house and the like is provided in a house Obj.B. Further, a sensing device 1C capable of detecting mileage, usage count, carefulness of driving, car washing and the like is provided in a car Obj.C. In addition, a sensing device 1D capable of detecting usage time, storage condition, subject type, water leakage, impact, number of maintenance operations and the like is attached to a camera Obj.D.

An interaction detected by the sensing device 1 is transmitted to an emotion server 2 through a network 3. For example, interactions (opening/closing of a door, repair, driving, storage and the like) performed by the person Obj.A with respect to the house Obj.B, the car Obj.C and the camera Obj.D are respectively detected by the sensing devices 1A to 1D and transmitted to the emotion server 2. Specifically, when the person has performed a certain interaction with respect to the house, respective interactions (an interaction performed on the other object and an interaction performed by the other object) are detected by the sensing device 1A on the side of the person and the sensing device 1B on the side of the house. Further, detected interactions are not limited to interactions between a person and an article and an interaction between articles may be detected.

The emotion server 2 accumulates interactions received from the sensing device 1 and analyzes the interactions to calculate an emotion value of each object. Emotion values calculated by the emotion server 2 are used for various services. Meanwhile, since there is a case in which necessary emotion values differ depending on properties of services, the emotion server 2 transmits an evaluation value numerically expressing evaluation of each interaction to each service, and an emotion value may be calculated on the basis of an interaction evaluation value through a predetermined calculation method on a service side.

In this way, it is possible to define all of persons and articles as objects and provide an emotion value corresponding to a new index numerically expressing a value of each object on the basis of an interaction between objects in the information processing system 100 according to the present embodiment. Usefulness of such emotion values will be described below as a background of the present disclosure.

Background

Mature societies will require new indices of value economy due to the recent excessive expansion of global economy based on neo liberalist market principles. Specifically, an "emotional value" of an article in new manufacturing is under discussion. In general, deep thought, intention, background, technology and the like put into an article by a manufacturer are called emotional values and actions of people of each region using this are performed. Further, handling of an article by a user with affection is an invisible special value of the article and may be a value exceeding its monetary value. However, such "emotional values" were not used in the domain of information science in the past.

In this regard, the era of Internet of Things (IoT) in which things are connected has dawned according to recent developments in device miniaturization, battery technology and network technology. In the future of this era, it can be assumed that the era of connection of an article and a person without discrimination (an article that has passed a Turing test interacts with a person) has come. In this case, it is possible to define correlation of "emotional values" of a person and an article with a history of all interactions without discrimination between people and articles (including services).

The present embodiment proposes emotion values numerically expressing pseudo "emotional values" of persons and articles in view of the above. Since an emotional value is represented by a multi-dimensional vector, it is considered that the dimension is decreased or the vector is converted into a simple scalar value and used such that the vector is easily handled to optimize the emotional value for each service or item and use the optimized emotional value. It is anticipated that an emotion value will become a new index of value economy and economic concept along with money in the future. Accordingly, functions of storage (accumulation), exchange medium (a function of mediating exchange of an article A and an article B) and measure of values of people and articles (emotional values are given to all items and services and the value of an article is determined by monetary and emotional values) are expected with respect to the emotion value.

The overview of the information processing system 100 according to the present embodiment has been described above. Next, configurations of the sensing device 1 and the emotion server 2 included in the information processing system 100 and operation processes of the information processing system 100 will be sequentially described.

2. BASIC CONFIGURATIONS 2-1. Sensing Device

Figure 2:
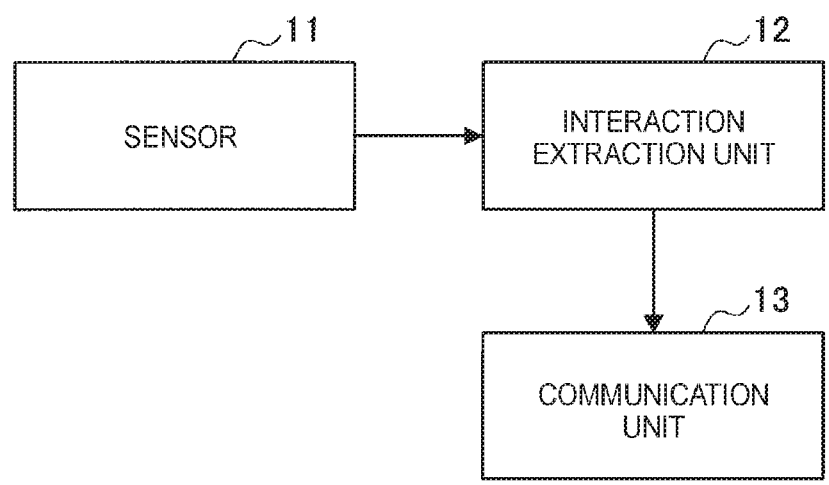
FIG. 2 is a block diagram illustrating an example of a configuration of a sensing device according to the present embodiment.

FIG. 2 is a block diagram illustrating an example of a configuration of the sensing device 1 according to the present embodiment. As illustrated in FIG. 2, the sensing device 1 includes a sensor 11, an interaction extraction unit 12 and a communication unit 13.

(Sensor)

The sensor 11 has a function of sensing an interaction between objects. For example, the sensor 11 is realized by a humidity sensor, a temperature sensor, a vibration sensor, an infrared sensor, a camera, a tactile sensor, a gyro sensor, an illumination sensor, a human sensor, an atmosphere sensor (e.g., a dust sensor and a pollutant sensor), a speed sensor, a count measurement sensor or the like.

(Interaction Extraction Unit)

The interaction extraction unit 12 functions as a detection unit for detecting information related to an interaction between a first object and a second object on the basis of sensing data extracted from the sensor 11. For example, the interaction extraction unit 12 may extract interactions such as the number of times a door is opened/closed, impact/strength of opening/closing and entrance/exit of a person on the basis of sensing data of a sensor that senses opening/closing of doors.

Further, the interaction extraction unit 12 may extract interactions such as the repair and maintenance of a target object on the basis of sensing data of a sensor that senses that the target object has been disassembled, a reset process has been performed, a failure state has been fixed (errorless), parts have been changed and the like.

In addition, when a target object is a car, a bicycle, a motor cycle or the like, the interaction extraction unit 12 may extract interactions of the target object, such as the mileage, usage count, carefulness of driving and car washing, on the basis of sensing data of a sensor that senses a distance measurement value, an engine RPM measurement value, tire change frequency, brake timing, contamination, position information, fuel refill frequency and the like.

Further, the interaction extraction unit 12 may extract interactions of a target object, such as a preference degree, an affection degree and a storage state, on the basis of sensing data of a sensor that senses a start time, a start timing, a mounting state, ambient air, humidity, a temperature, water leakage, impact and the like.

(Communication Unit)

The communication unit 13 transmits information related to an interaction extracted by the interaction extraction unit 12 to the emotion server 2 through the network 3.

The aforementioned sensing device 1 is equipped with a micro-computer including a central processing unit (CPU), a read only memory (ROM), a random access memory (RAM) and a nonvolatile memory to control each component of the sensing device 1.

2-2. Configuration of Emotion Server

Figure 3:
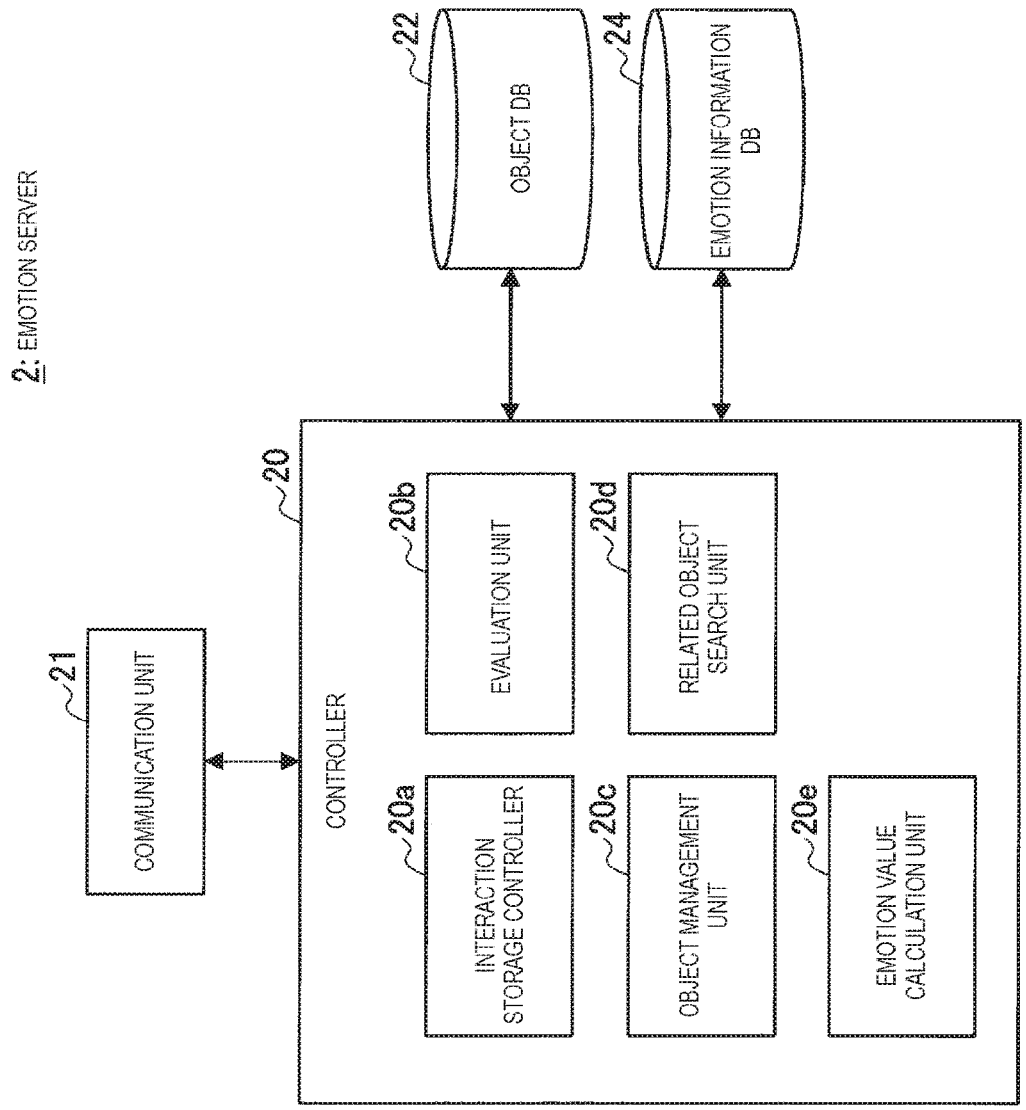
FIG. 3 is a block diagram illustrating an example of a configuration of an emotion server according to the present embodiment.

FIG. 3 is a block diagram illustrating an example of a configuration of the emotion server 2 according to the present embodiment. As illustrated in FIG. 3, the emotion server 2 includes a communication unit 21, a controller 20, an object DB 22 and an emotion information DB 24.

(Communication Unit)

The communication unit 21 receives information (referred to hereinafter as interaction information) related to an interaction from the sensing device 1 attached to/mounted on each object (person or article) through a network. In addition, the communication unit 21 transmits interaction evaluation stored in the emotion information DB 24 or an emotion value calculated by an emotion value calculation unit 20e depending on the request of an external device.

(Controller)

The controller 20 controls each component of the emotion server 2. Furthermore, the controller 20 is realized by a micro-computer including a CPU, a ROM, a RAM and a nonvolatile memory. In addition, the controller 20 according to the present embodiment serves as an interaction storage controller 20a, an evaluation unit 20b, an object management unit 20c, a related object search unit 20d, and an emotion value calculation unit 20e.

The interaction storage controller 20a controls interaction information received from a sensing device 1 attached to/mounted on an object to be stored in the emotion information DB 24.

The evaluation unit 20b evaluates interactions stored in the emotion information DB 24. While an interaction evaluation method is not particularly limited, for example, the evaluation unit 20b performs calculation and evaluation according to a standard decided with a certain evaluation index with respect to objects that perform/receive interactions and assigns scores thereto, specifically, in the range of −1.0 to 1.0. The evaluation results are correlated with the interactions and stored in the emotion information DB 24.

The object management unit 20c performs management such as registration, change and deletion of information about objects stored in the object DB 22.

The related object search unit 20d searches the object DB 22 and the emotion information DB 24 for an object for which an interaction is generated with respect to a requested object ID from the external device as a related object.

The emotion value calculation unit 20e calculates an emotion value of an object on the basis of emotion values of interaction information accumulated in the emotion information DB 24. A detailed emotion value calculation method will be described below.

(Object DB)

The object DB 22 is a storage unit that stores an object ID of each object. In addition, the object DB 22 stores various types of information about objects, such as product names, product types, maker IDs, model numbers, and manufacturing date and time, in addition to object IDs.

(Emotion Information DB)

The emotion information DB 24 is a storage unit that stores an interaction between objects and evaluation of the interaction.

2-3. Operation Processes

Figure 4:
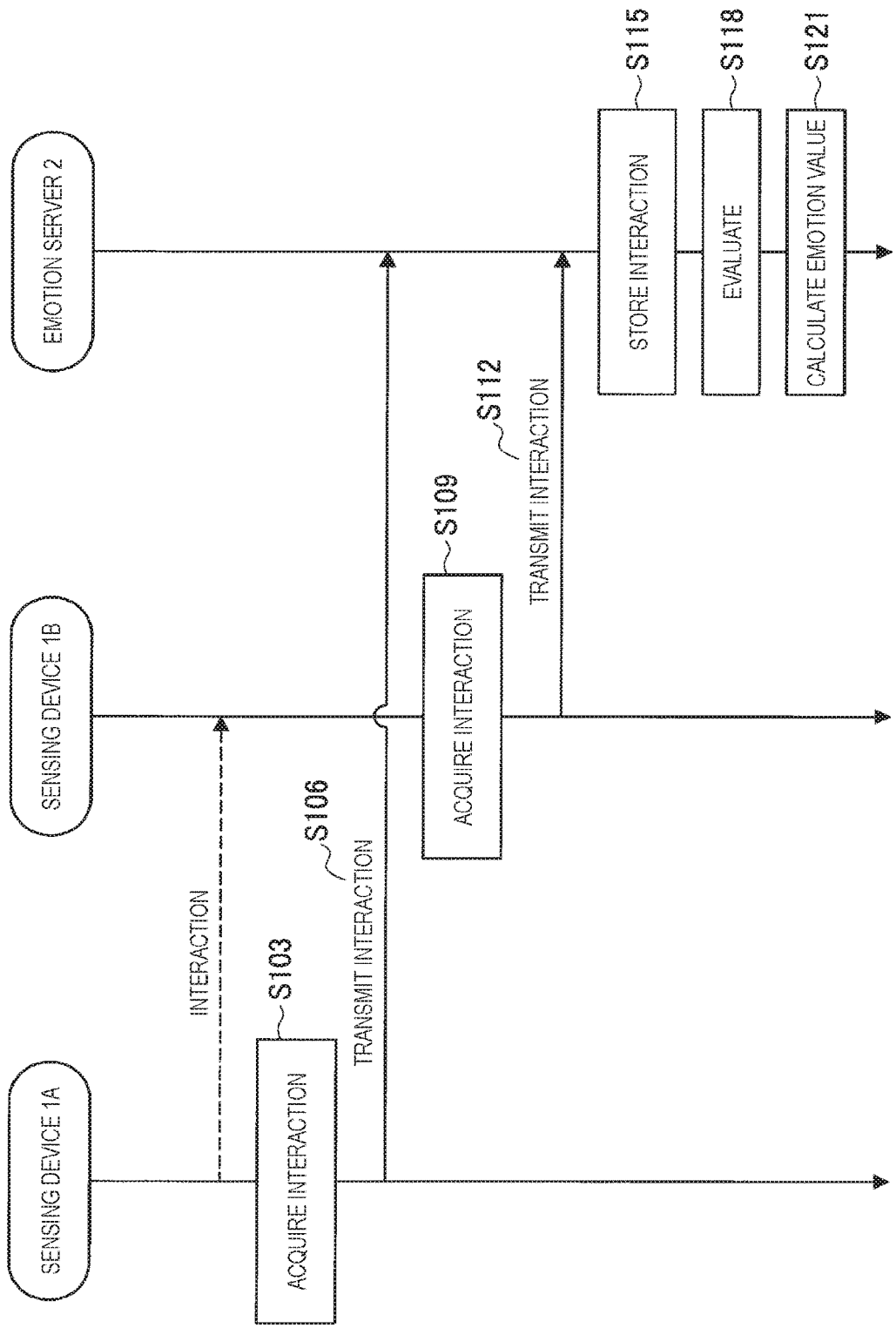
FIG. 4 is a sequence diagram illustrating an operation process of an information processing system according to the present embodiment.

Next, an operation process of the information processing system 100 according to the present embodiment will be described with reference to FIG. 4. FIG. 4 is a sequence diagram illustrating an operation process of the information processing system 100 according to the present embodiment.

As illustrated in FIG. 4, first of all, when an object A on which a sensing device 1A is provided performs a certain interaction with respect to an object B on which a sensing device 1B is provided, the interaction extraction unit 12 of the sensing device 1A acquires the interaction in step S103 and then transmits the acquired interaction to the emotion server 2 through the communication unit 13 in step S106.

In addition, the same process is performed by the sensing device 1B provided on the object B on which the interaction has been performed. That is, the interaction extraction unit 12 of the sensing device 1B acquires the interaction in step S109 and then transmits the acquired interaction to the emotion server 2 through the communication unit 13 in step S112.

Accordingly, when the interaction is performed between the objects, the interaction is acquired from both objects and the acquired interactions are transmitted to the emotion server 2.

Then, the interaction storage controller 20a of the emotion server 2 stores the interaction transmitted from each sensing device 1 in the emotion information DB 24 in step S115 and then performs interaction evaluation through the evaluation unit 20b in step S118. Further, interaction evaluation by the evaluation unit 20b is correlated with the interaction and stored in the emotion information DB 24.

In addition, the emotion value calculation unit 20e of the emotion server 2 calculates emotion values of the objects on the basis of interaction evaluation as necessary in step S121.

The operation process according to the present embodiment has been described above. It is considered that an emotion value of an object calculated on the basis of interaction history collected by the emotion server 2 of the present embodiment is used for various services as a new index indicating the value of the object. Hereinafter, various service systems using emotion values according to the present embodiment will be described using a plurality of application examples.

3. APPLICATION EXAMPLES 3-1. Personal Credit Information Provision System

First of all, a case in which an emotion value is regarded as credibility (trust) and used in a personal credit information provision system 101 will be described as a first application example with reference to FIGS. 5 to 15.

Conventionally, credibility calculated from assets, liabilities, duration of credit card contract and the like has been provided as a credit information provision service that provides personal credibility. In contrast, a personal emotion value is used as credibility information in the present embodiment. Further, it is possible to visualize credibility of a person using various measures by filtering a history of interactions with objects related to the person so far on a specific condition (time or object attributes). For example, the personality of a person, such that someone had bad conduct and roughly handled articles in the past but now is a good person who carefully handles articles, that someone drives a car recklessly while carefully handling a personal computer, or the like, is represented as an emotion value.

Figure 5:
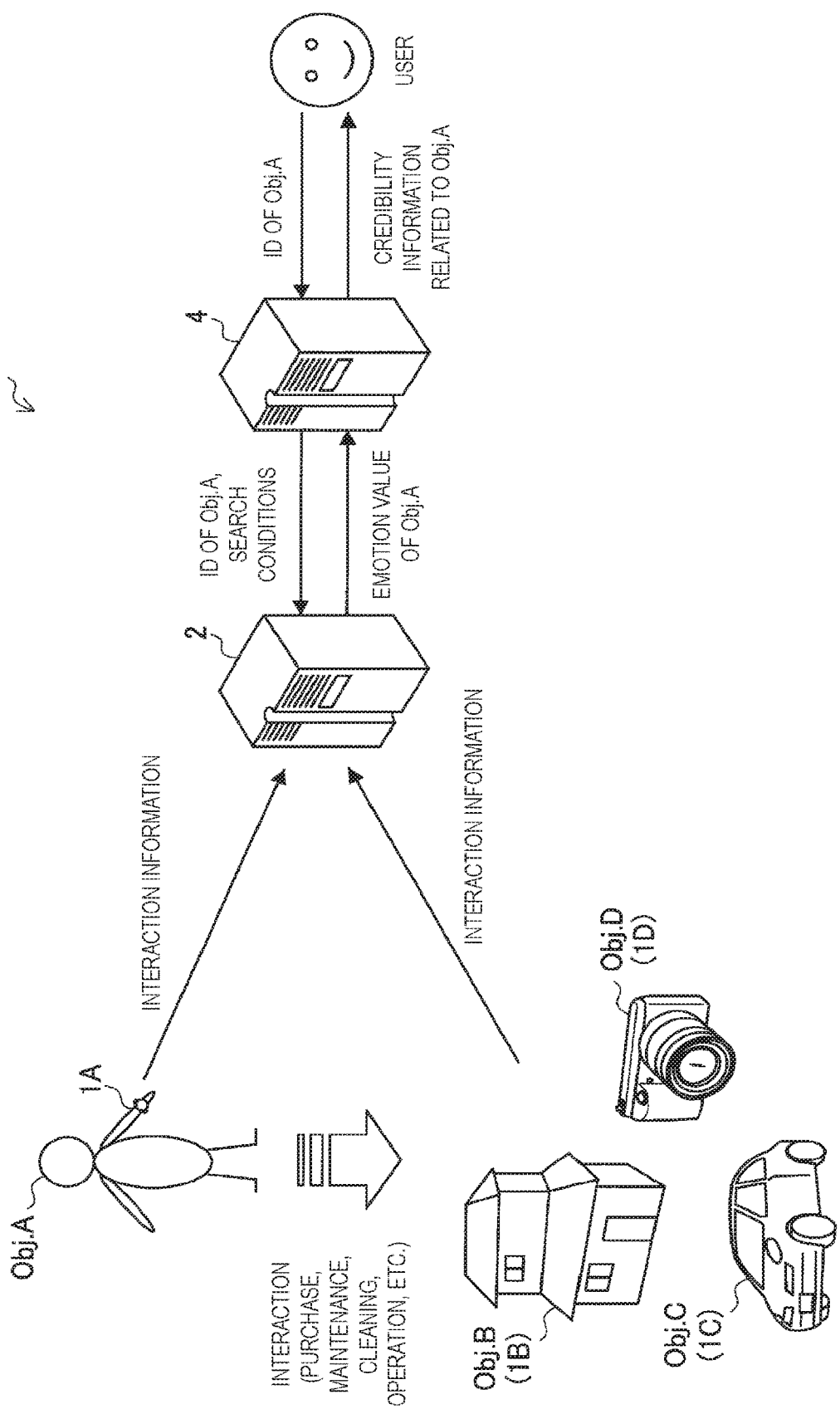
FIG. 5 is an explanatory diagram of the entire configuration of a personal credit information provision system according to a first application example.

FIG. 5 is an explanatory diagram of the entire configuration of the personal credit information provision system 101 according to the first application example. As illustrated in FIG. 5, the personal credit information provision system 101 includes a personal credit information provision server 4 and the emotion server 2.

The emotion server 2 acquires interaction information from the user Obj.A who is a member of the personal credit information provision system 101, the house Obj.B, the car Obj.C and the camera Obj.D with which the user Obj.A usually performs interactions.

Further, the user Obj.A illustrated in FIG. 5 and a user are correlated with unique IDs and registered when they are registered as members in the personal credit information provision system 101.

Here, a case in which the user acquires credit information of the user Obj.A is assumed. The user designates search conditions such as the ID (i.e., object ID) of the user Obj.A and, as necessary, a period of time (e.g., start time or end time) and attributes of related objects (e.g., item categories and maker names) and requests the personal credit information provision server 4 to display credit information of the user Obj.A, as illustrated in FIG. 5.

The personal credit information provision server 4 acquires emotion values from the emotion server 2 on the basis of the ID of the user Obj.A and the search conditions (a period of time, attributes of related objects, etc.) depending on the request from the user. In this case, emotion values of related objects (the house Obj.B, the car Obj.C and the camera Obj.D) having interactions performed with respect to the user Obj.A may also be acquired.

In addition, the personal credit information provision server 4 provides the credibility information of the user Obj.A to the user on the basis of acquired emotion values. When the search conditions such as a period of time, attributes of related objects and the like are not designated, comprehensive credibility information of the user Obj.A is displayed. Further, when a period of time is designated, credibility information of the user Obj.A in the designated period of time is displayed. In addition, when attributes of related objects are designated, credibility information depending on interactions with objects that match the designated object attributes from among objects related to the object Obj.A is displayed.

Furthermore, a credibility information display method may include displaying emotion values themselves as credibility values or visualizing emotion values by expressing them as a graph or a bar chart.

The overview of the personal credit information provision system 101 according to the first application example has been described above. Meanwhile, the user may not join the same personal credit information provision system 101 that the user Obj.A joined and may acquire the credit information of the user Obj.A using a credit company, for example. In this case, a management server (not shown) of the credit company accesses the personal credit information provision server 4 of the personal credit information provision system 101 to acquire the credit information of the user Obj.A.

3-1-1. Configuration

Next, a configuration of the personal credit information provision server 4 included in the personal credit information provision system 101 will be described with reference to FIG. 6.

Figure 6:
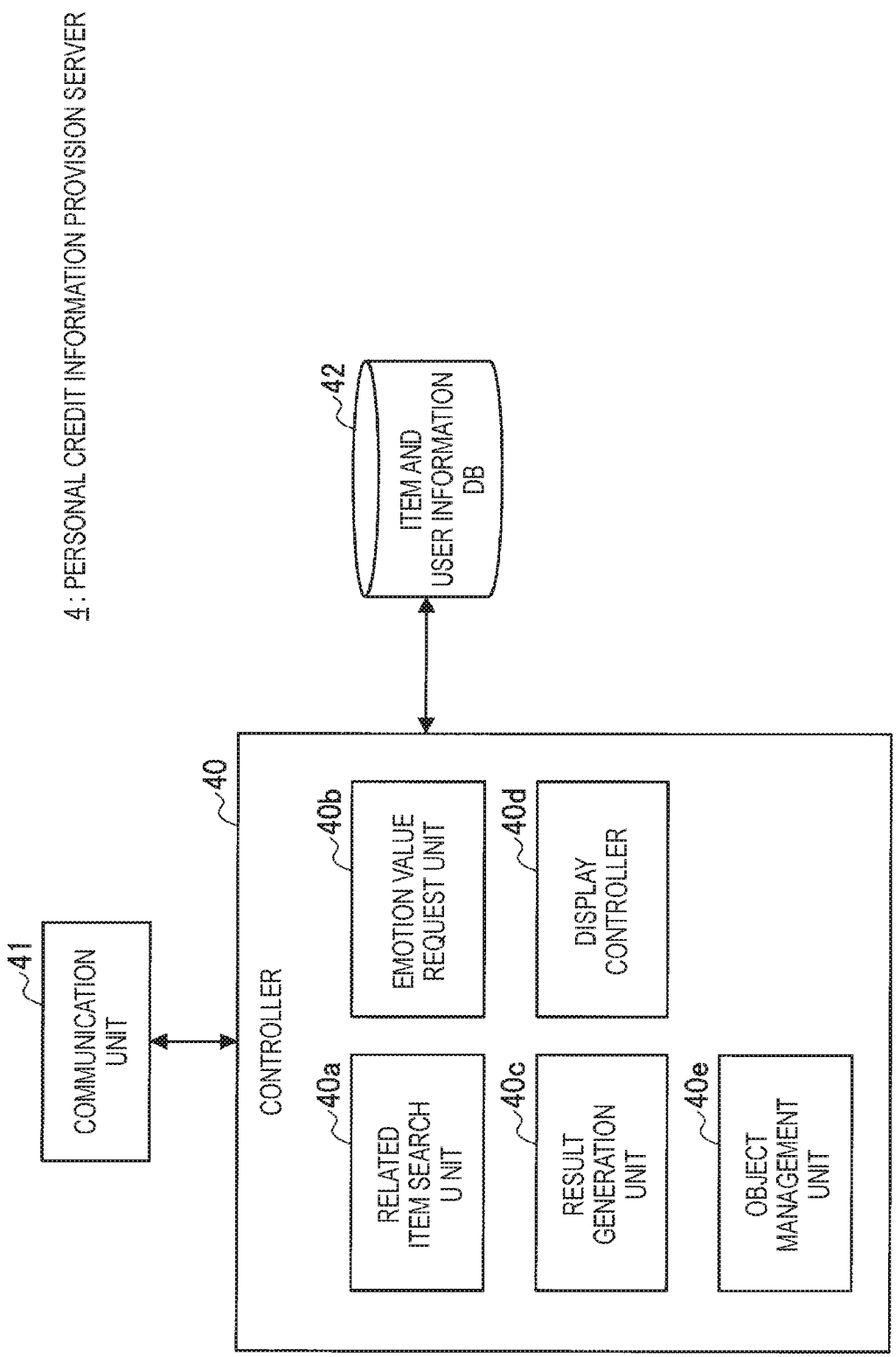
FIG. 6 is a block diagram illustrating an example of a configuration of a personal credit information provision server according to the first application example.

FIG. 6 is a block diagram illustrating an example of the configuration of the personal credit information provision server 4 according to the present embodiment. As illustrated in FIG. 6, the personal credit information provision server 4 includes a controller 40, a communication unit 41 and an item and user information DB (database) 42.

(Communication Unit)

The communication unit 41 is connected to a terminal (not shown) of a user through a network, receives a request of the user and transmits credit information to the user depending on the request. Further, the communication unit 41 is connected to the emotion server 2 through a network and acquires an emotion value of a target object and emotion values of related objects.

(Controller)

The controller 40 controls each component of the personal credit information provision server 4. Further, the controller 40 is realized by a micro-computer including a CPU, a ROM, a RAM and a nonvolatile memory. In addition, the controller 40 according to the present embodiment functions as a related item search unit 40a, an emotion value request unit 40b, a result generation unit 40c, a display controller 40d and an object management unit 40e.

The related item search unit 40a searches the item and user information DB 42 for items related to a check target person designated by a user. Items related to the check target person are items previously associated with the check target person as items owned by the check target person, for example.

The emotion value request unit 40b requests an emotion value of the check target person designated by the user from the emotion server 2. Specifically, the emotion value request unit 40b transmits, to the emotion server 2 through the communication unit 41, an object ID of the check target person and search conditions (a period of time, attributes of related objects, object IDs of the related objects, etc.) when the search conditions are present.

The result generation unit 40c generates a result of checking of credibility of the check target person on the basis of the emotion value of the check target person, acquired by the emotion value request unit 40b from the emotion server 2. Specifically, the result generation unit 40c generates a result screen displaying credibility information of the check target person, for example.

The display controller 40d controls the result screen generated by the result generation unit 40c to be displayed through a user terminal of a request source. For example, the display controller 40d controls information for displaying the result screen to be transmitted to the user terminal through the communication unit 41.

The object management unit 40e performs management such as registration, modification and deletion of information about items and users (examples of objects) stored in the item and user information DB 42.

(Item and User Information DB)

The item and user information DB 42 is a storage unit storing information about items and users. A user is a user registered as a member in the personal credit information provision system 101, for example. Further, item and user information includes object IDs of each item and each user.

The configuration of the person al credit information provision server 4 according to the present application example has been described above. Meanwhile, the configuration of the emotion server 2 included in the personal credit information provision system 101 has been described with reference to FIG. 3 and thus description thereof is omitted here.

[Example of Data Configuration]

Next, an example of data of the object DB 22 of the emotion server 2 and an example of data of the emotion information DB 24 used to calculate emotion values used in the personal credit information provision system 101 will be described with reference to FIGS. 7 and 8.

FIG. 7 is an illustration of an example of data of the object DB 22 of the emotion server 2 according to the first application example. Object IDs for identifying respective objects, object types, maker IDs, model numbers, serial numbers and manufacture dates and times (object generation dates and times) are correlated and stored in the object DB 22 of the emotion server 2, as illustrated in FIG. 7.

FIG. 8 is an illustration of an example of data of the emotion information DB 24 of the emotion server 2 according to the first application example. Information about an interaction generated between objects is stored in the emotion information DB 24. When an interaction is generated between objects, the interaction is detected by the objects of both sides, as described above. In the example of data illustrated in FIG. 8, a data stream of interaction information generated in each object is created for each object. Here, with respect to the data stream, a counterpart object when the interaction is generated is called a related object.

Object IDs of objects for which interactions have been generated, interaction dates and times and periods, related object IDs, interaction types, details of interactions, and interaction evaluation values are correlated and stored in the emotion information DB 24 of the emotion server 2, as illustrated in FIG. 8.

For example, in the first line of the example of data illustrated in FIG. 8, a person having object ID: 18000555 performs an interaction of "driving" with respect to a car having object ID: 5505 on 21 Jun. 2000, details of the interaction are "access/brake operations: careful, steering wheel operation: slow," and an interaction evaluation value of 1 is given to the interaction. Further, in the second line, the car having object ID: 5505 receives an interaction of "driving" from the person having object ID: 18000555 on 21 Jun. 2000, details of the interaction are "fuel efficiency: good, brake wear: small," and an interaction evaluation value of 1 is given to the interaction. In this way, an interaction performed by an object on one side with respect to an object on the other side may be sensed by both objects.

Sensed interaction types may be change of ownership, purchase, exchange, maintenance, cleaning and the like in addition to the aforementioned driving, as illustrated in FIG. 8.

Regarding an interaction of driving, when a person sitting on a driver's seat is recognized by the sensor 11 attached to a car, for example, and movement of the car is sensed while the person is on the driver's seat, the fact that the car is driven by the person sitting on the driver's seat is sensed.

For an interaction of maintenance, the fact that the owner of a house has performed maintenance on the house may be detected on the basis of records of vibration and sounds sensed by the sensor 11 provided in the house, a picture of a camera (an example of the sensor 11) provided in each place of the house and motion analysis through the sensor 11 attached to the body of a user, and additionally reference to records in a registered reform company server, and the like, for example.

3-1-2. Display Process

Next, a display process of the personal credit information provision system 101 will be described with reference to FIGS. 9 to 15.

[Credit Ranking Display]

Figure 9:
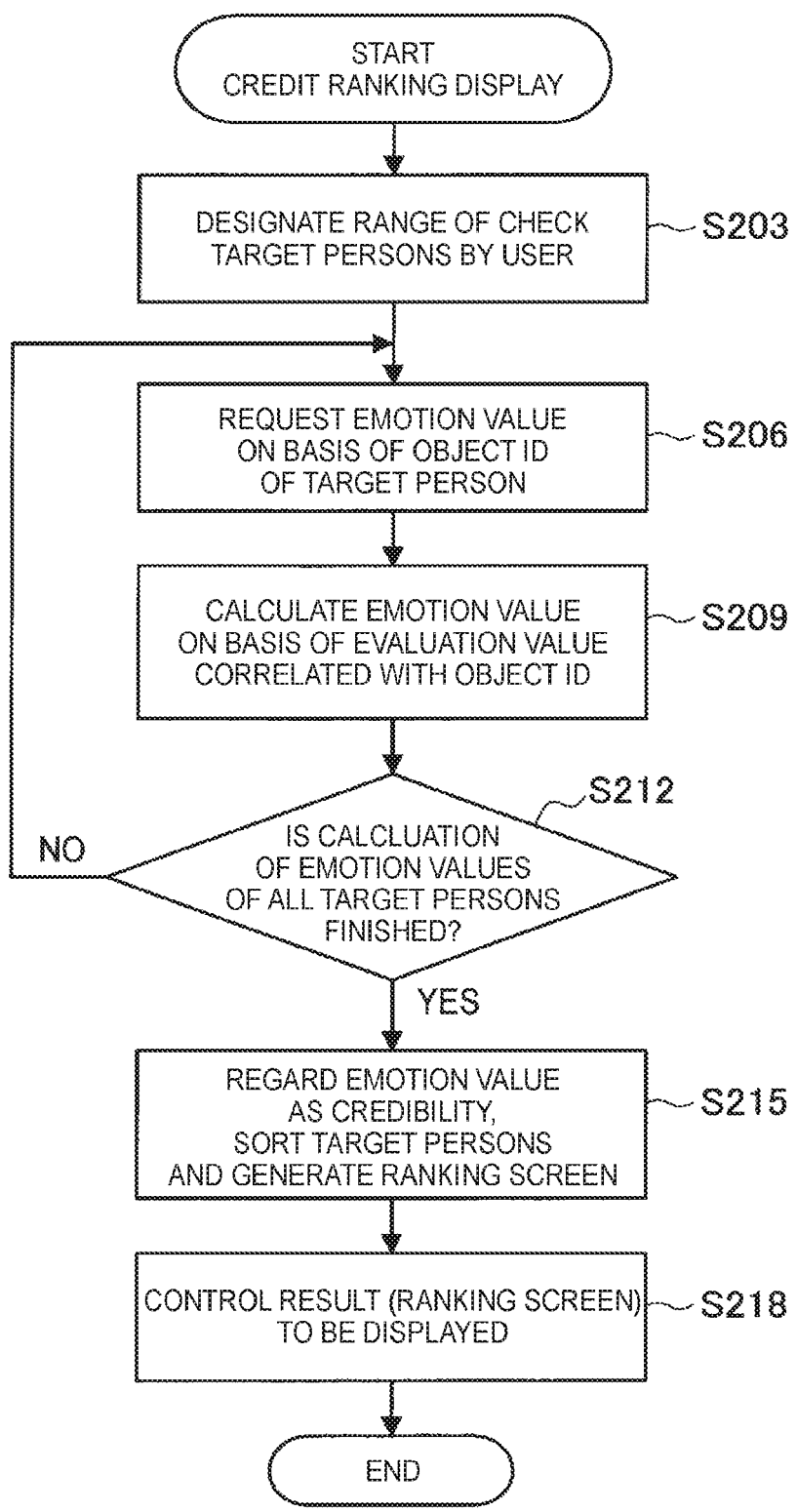
FIG. 9 is a flowchart illustrating a credit ranking display process according to the first application example.

FIG. 9 is a flowchart illustrating a credit ranking display process according to the first application example. As illustrated in FIG. 9, first of all, a range of check targets persons is designated by a user in step S203. Specifically, a request to the personal credit information provision server 4 for checking credibility of a target person is performed through a user terminal.

Then, the emotion value request unit 40*b* of the personal credit information provision server 4 requests an emotion value of the target person from the emotion server 2 on the basis of an object ID of the target person in step S206. The object ID of the target person may be designated by the user or acquired from the item and user information DB 42. Otherwise, the object ID of the target person may be acquired from the object DB 22 on the side of the emotion server 2 depending on the name and the like of the target person designated by the personal credit information provision server 4.

Subsequently, the emotion value calculation unit 20*e* of the emotion server 2 calculates an emotion value on the basis of an interaction evaluation value correlated with the object ID of the designated target person in step S209. For example, the emotion value calculation unit 20*e* calculates a total emotion value of the target person based on a total sum of evaluation values of interactions between the target person and other objects. Otherwise, the emotion value calculation unit 20*e* may calculate the total emotion value of the target person based on an average of evaluation values of interactions between the target person and other objects, or perform chronological weighting and then calculate the total emotion value based on a total sum or an average.

When emotion values of a plurality of target persons are requested, the aforementioned steps S206 and S209 are repeated until calculation of emotion values of all target persons is finished (S212).

Thereafter, when the emotion values of all target persons have been calculated ("Yes" in S212), the result generation unit 40*c* of the personal credit information provision server 4 regards the emotion values as credibility, sorts the target persons and generates a credibility ranking screen in step S215. Here, the result generation unit 40*c* generates a ranking screen based on total credibility of the target person.

Figure 10:
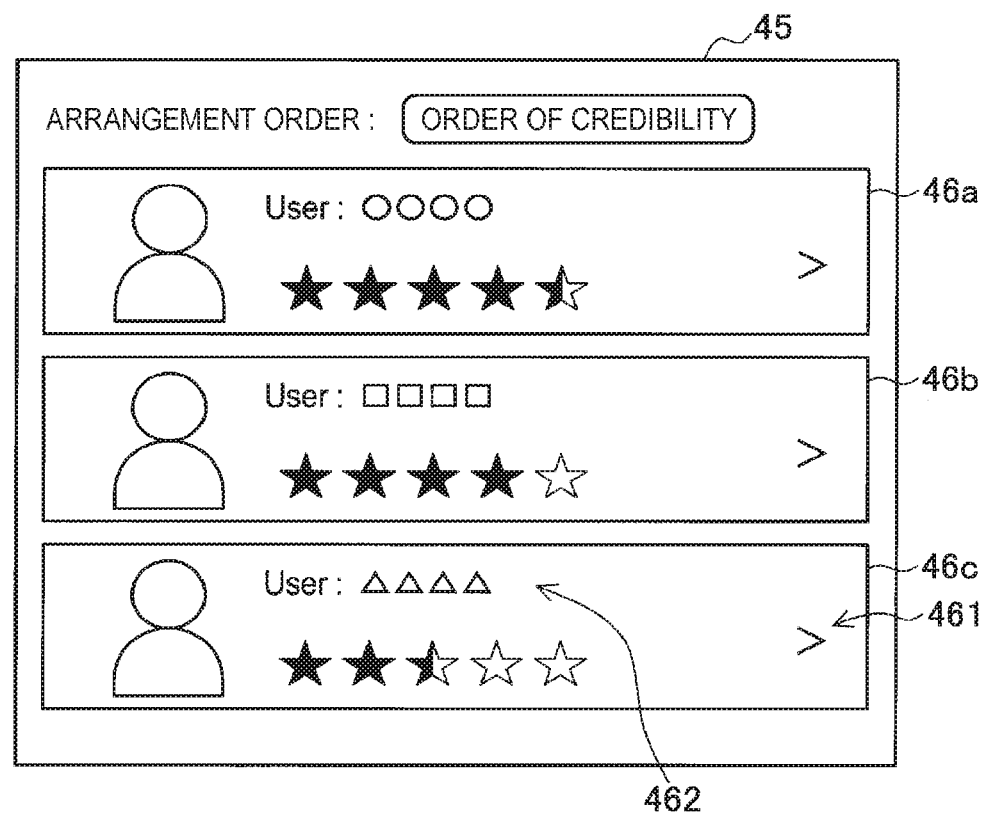
FIG. 10 is an illustration of an example of a credibility ranking screen according to the first application example.

Here, an example of the credibility ranking screen is illustrated in FIG. 10. As illustrated in FIG. 10, check target persons are displayed in the order based on personal total credibility in a ranking screen 45. Specifically, the ranking screen 45 includes target person information boxes 46*a*, 46*b* and 46*c* which are arranged in the descending order of credibility. The target person information boxes 46*a*, 46*b* and 46c include the names of target persons and star indicators indicating ranking depending on credibility.

Further, numerical values (i.e., emotion values) of credibility corresponding to a basis of ranking may be displayed in the target person information boxes 46a, 46b and 46c. In addition, when an arrow 461 included in the target person information box 46c is selected, for example, credibility information on each object attribute of a target person ΔΔΔΔ is displayed. Display of credibility information on each object attribute will be described below with reference to FIGS. 11 to 13. Further, when a target person name 462 included in the target person information box 46c is selected, for example, chronological credibility information on the target person ΔΔΔΔ is displayed. Display of chronological credibility information will be described below with reference to FIGS. 14 and 15.

Referring back to FIG. 9, the display controller 40d controls the result (ranking screen) generated by the result generation unit 40c to be displayed through a user terminal of a request source in step S218.

[Display of Credibility Information on Each Object Attribute]

Figure 11:
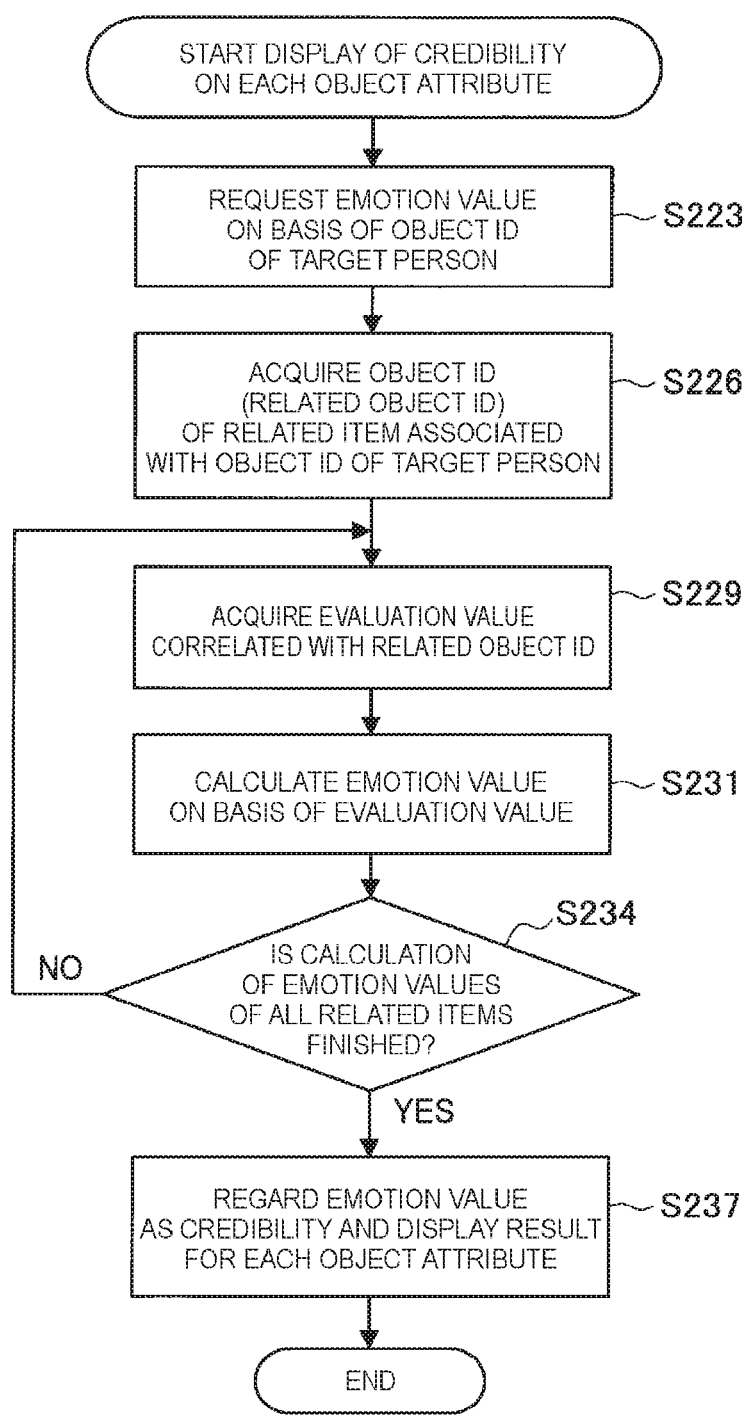
FIG. 11 is a flowchart illustrating a process of displaying credibility information on each object attribute according to the first application example.

FIG. 11 is a flowchart illustrating a process of displaying credibility information on each object attribute according to the first application example. As illustrated in FIG. 11, first of all, the personal credit information provision server 4 requests an emotion value from the emotion server 2 on the basis of the object ID of a target person in step S223.

Then, the related object search unit 20d of the emotion server 2 acquires an object ID (related object ID) of a related item associated with the object ID of the target person in step S226. Here, the related item associated with the object ID of the target person refers to another object (referred to as a related object) having an interaction generated with respect to the target person. Further, the related object search unit 20d may search for other objects having interactions generated with respect to the target person for an object that matches a designated object attribute (i.e., object type) on the basis of the object attribute designated by a user and included in search conditions.

Subsequently, the emotion value calculation unit 20e of the emotion server 2 acquires an interaction evaluation value correlated with the related object ID from the emotion information DB 24 in step S229.

Thereafter, the emotion value calculation unit 20e calculates an emotion value of the related item on the basis of the interaction evaluation value of the related item in step S231. Here, the calculated emotion value is a relative emotion value between the target person and the related item. Hereinafter, an example of calculation of an emotion value of a related item will be described with reference to FIG. 12.

FIG. 12 is an explanatory diagram of calculation of a relative emotion value of a target person with respect to a house according to the first application example. As illustrated in FIG. 12, first of all, only information on an interaction performed by the target person (object ID: 18000555) with respect to the house (object ID: 11401) is extracted from the emotion information DB 24. Then, the emotion value calculation unit 20e calculates a relative emotion value between the target person and the house based on a total sum of the product of the quotient of an initial evaluation value divided by elapsed years and a predetermined weighting factor and the sum of the products of the quotients of evaluation values of each maintenance divided by respective maintenance intervals and a predetermined weighting factor on the basis of the extracted interaction information, as illustrated in FIG. 12.

Referring back to FIG. 11, when there are a plurality of related items, the aforementioned steps S229 and S231 are repeated until calculation of emotion values of all related items is finished (S234).

Subsequently, when calculation of emotion values of all related items are finished ("Yes" in S234), the result generation unit 40c of the personal credit information provision server 4 regards the relative emotion values of the related items acquired by the emotion value request unit 40b from the emotion server 2 as credibility and generates a display screen of credibility information on each object attribute. Then, the display controller 40d controls the display screen of credibility information on each object attribute to be displayed through a user terminal of a request source.

Figure 13:
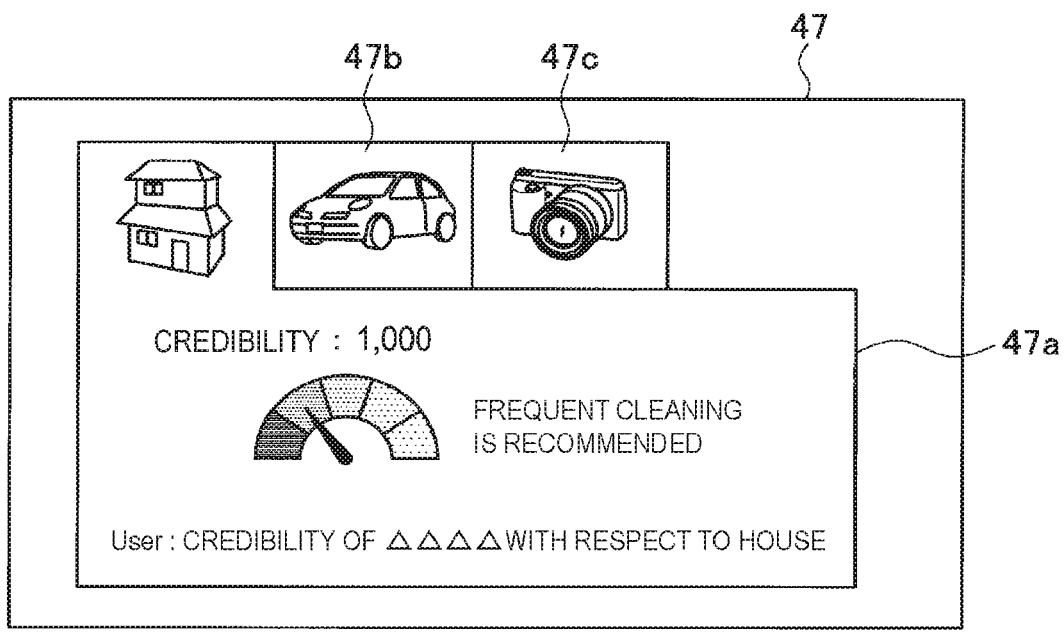
FIG. 13 is an illustration of an example of a credibility information display screen with respect to each object attribute according to the first application example.

Here, an example of the display screen of credibility information on each object attribute is illustrated in FIG. 13. The target person information box 46c of the ranking screen 45 illustrated in 10 is switched to a display screen 47 of credibility information on each object attribute illustrated in FIG. 13 when the arrow 461 included in the target person information box 46c of the ranking screen 45 illustrated in FIG. 10 is selected, and relative emotion values based on interaction evaluation values between the target person ΔΔΔΔ and other objects as credibility are displayed.

As illustrated in FIG. 13, a credibility information display screen 47b with respect to a car attribute and a credibility information display screen 47c with respect to a camera attribute may be displayed in addition to a credibility information display screen 47a with respect to a house attribute, for example. Furthermore, credibility may be expressed by a graph and the like, and advice depending on credibility is also displayed. Accordingly, in search for a counterpart for home stay, room sharing or car sharing, and the like, for example, it is possible to individually recognize degrees of credibility (manner of handling articles) with respect to attributes of articles in addition to total credibility of the counterpart.

[Chronological Credibility Display]

Figure 14:
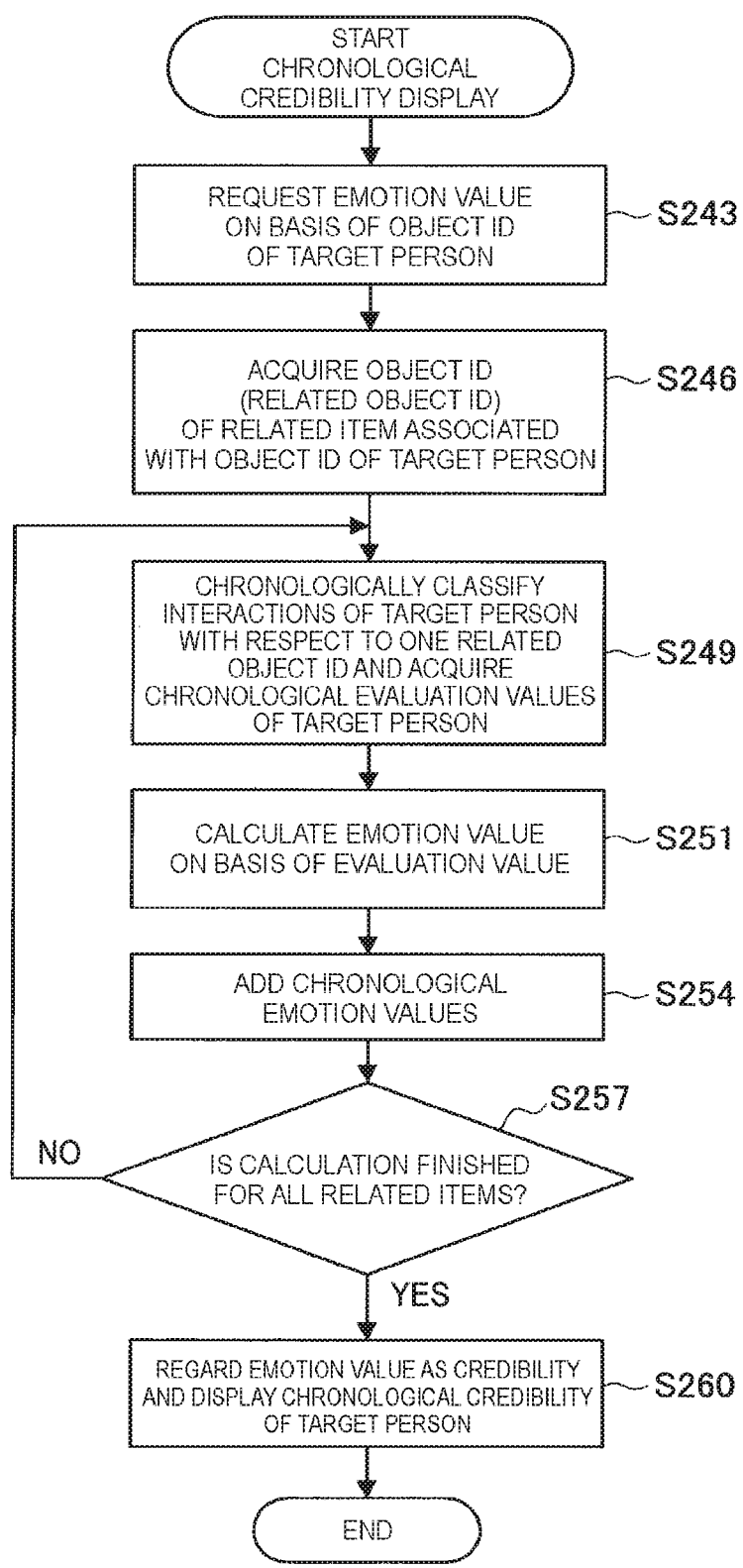
FIG. 14 is a flowchart illustrating a chronological credibility display process according to the first application example.

FIG. 14 is a flowchart illustrating a chronological credibility display process. As illustrated in FIG. 14, first of all, the personal credit information provision server 4 requests an emotion value from the emotion server 2 on the basis of an object ID of a target person in step S243.

Then, the related object search unit 20d of the emotion server 2 acquires an object ID (related object ID) of a related item associated with the object ID of the target person in step S246. Here, the related item associated with the object ID of the target person refers to an object (also referred to as a related object) having an interaction generated with respect to the target person.

The emotion value calculation unit 20e chronologically classifies interactions of the target person with respect to one related object ID and acquires chronological evaluation values of the target person in step S249.

Subsequently, the emotion value calculation unit 20e calculates chronological emotion values between the target person and the related object on the basis of the evaluation values in step S251. Here, the emotion value calculation unit 20e may acquire chronological evaluation values based on a total sum of chronological interaction evaluation values, an average value thereof, a total sum/average value after the chronological interaction evaluation values have been weighted, or the like.

Then, the emotion value calculation unit 20e adds the chronological emotion values of the target person to acquire a total emotion value.

Thereafter, when there are a plurality of related items, the aforementioned steps S249 and S251 are repeated until calculation of emotion values of all related items is finished (S257).

When calculation of the emotion values of all related items is finished ("Yes" in S257), the result generation unit 40c of the personal credit information provision server 4 regards the emotion values acquired by the emotion value request unit 40b from the emotion server 2 as credibility and generates a display screen of chronological credibility information of the target person in step S260. Then, the display controller 40d controls the generated display screen of the chronological credibility information of the target person to be displayed through a user terminal of a request source.

Figure 15:
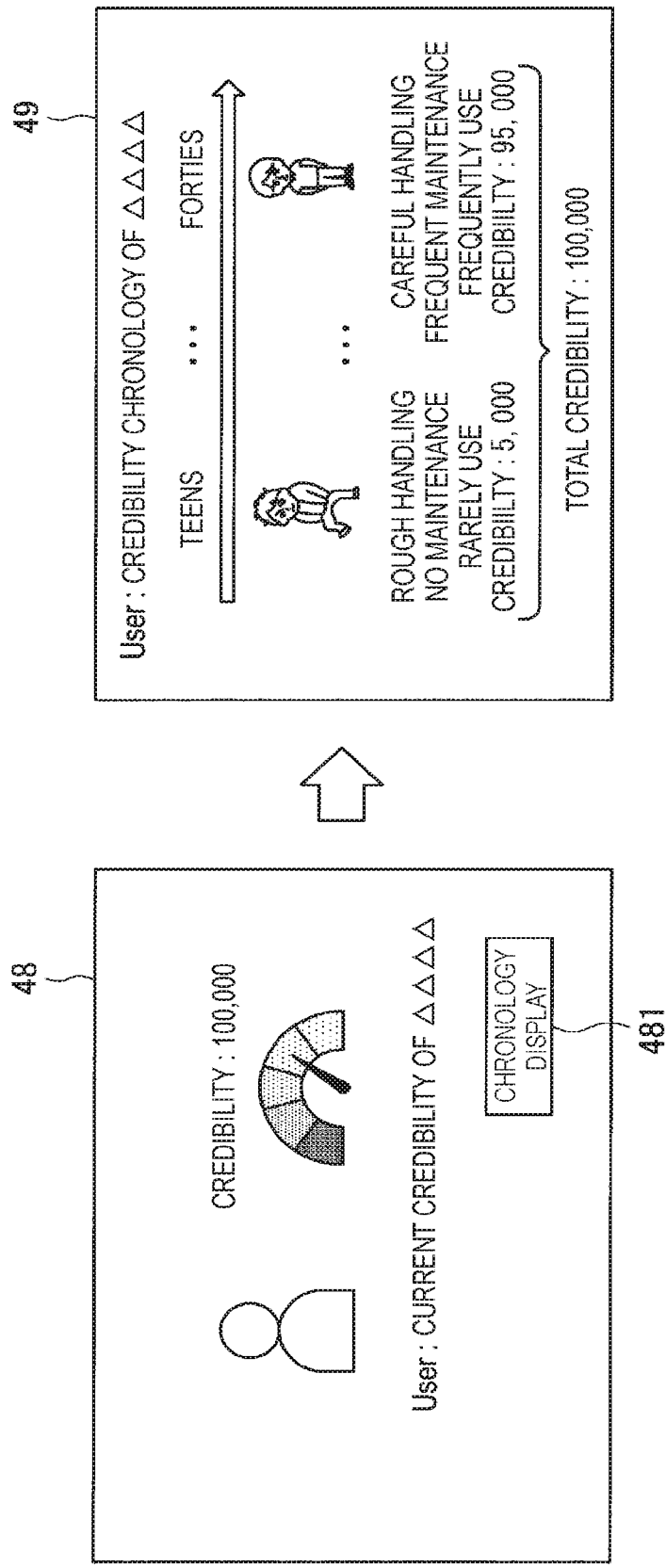
FIG. 15 is an illustration of examples of a chronological credibility display screen according to the first application example.

Here, examples of the display screen of the chronological credibility information of the target person are illustrated in FIG. 15, The target person information box 46c of the ranking screen 45 illustrated in FIG. 10A is switched to a credibility information display screen 48 shown on the left in FIG. 15 when the target person name 462 included in the target person information box 46c of the ranking screen 45 illustrated in FIG. 10 is selected, and current credibility of the target person ΔΔΔΔ is displayed. Further, when a chronology display button 481 of the credibility information display screen 48 is selected, the screen switches to a chronological credibility information display screen 49 shown on the right in FIG. 15. The chronological credibility information display screen 49 displays chronological credibility of the target person with respect to all articles (total chronological credibility). Further, chronological credibility information displayed on the chronological credibility information display screen 49 is not limited to chronological credibility with respect to all articles as illustrated in FIG. 15, and the chronological credibility information display screen 49 may display chronological credibility with respect to each object attribute.

The personal credit information provision system 101 according to the first application example has been described above. Meanwhile, although credibility ranking of people is displayed in FIG. 10, the present application example is not limited thereto and, for example, credibility ranking in which people and articles are mixed may be displayed. In search for a helper, for example, when a check target is designated as "helper," ranking of both a person and an article (robot) may be displayed.

3-2. Auction System

Next, a case in which emotion values are considered to indicate trust of an exhibitor, an intention about an exhibited item, carefulness of a handled side and the like and used in an auction system 102 will be described as a second application example with reference to FIGS. 16 to 26.

Since an article used by a certain user is exhibited at an auction, in general, it is desirable for users that a price be decided on the basis of an emotional value of the article calculated from a relationship between the user and the article. Meanwhile, an emotional value according to the present embodiment may be used as a basis of trust of a user who exhibits an article (exhibitor). In the present embodiment, an emotional value may be converted to a value called "emotion value" and used. Further, the trust of an exhibitor and his or her carefulness of handling may be determined with reference to whether the exhibitor is a person who usually handles articles carefully or roughly by referring to emotion values based on interaction evaluation values with respect to articles other than the exhibited article.

Figure 16:
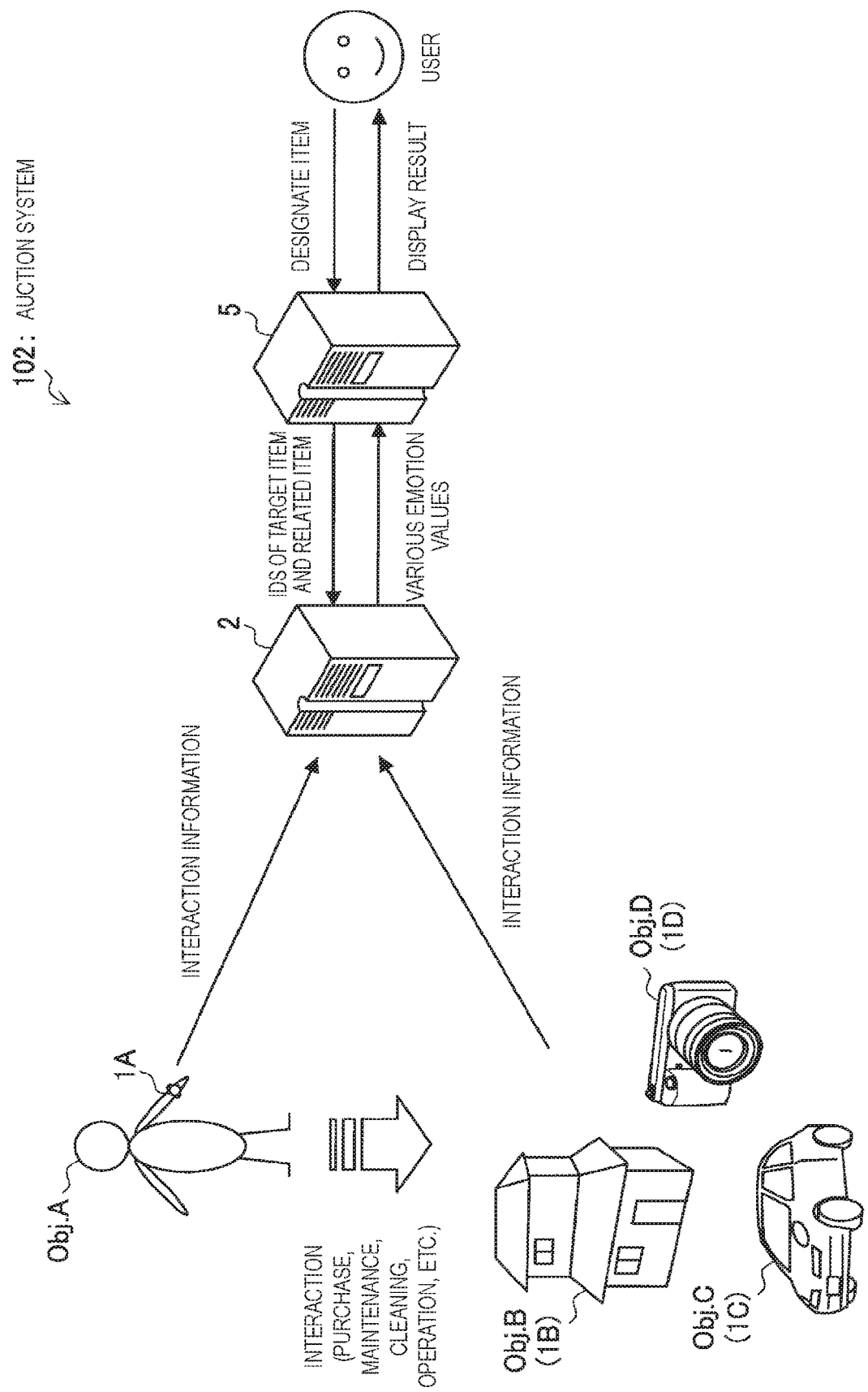
FIG. 16 is an explanatory diagram of the entire configuration of an auction system according to a second application example.

FIG. 16 is an explanatory diagram of the entire configuration of the auction system 102 according to the second application example. As illustrated in FIG. 16, the auction system 102 includes an auction server 5 and an emotion server 2.

The emotion server 2 acquires interaction information from the user Obj.A who is a member of the auction system 102, the house Obj.B, the car Obj.C and the camera Obj.D with which the user Obj.A usually performs interactions.

Further, the user Obj.A and a user illustrated in FIG. 16 are respectively correlated with unique IDs and registered when they are registered as members in the auction system 102. In addition, the user Obj.A transmits a unique object ID of an item to the auction server 5 when he or she exhibits the item at the auction system 102. The auction server 5 requests an emotion value of the corresponding object from the emotion server 2 on the basis of the object ID of the exhibited object. Here, the auction server 5 also requests an emotion value of the user Obj.A who is the exhibitor of the corresponding object from the emotion server 2. Further, when the corresponding object is an item having a specific model number and item name, it may be possible to acquire information on other exhibited items having the same model number and item name from the item and user information DB 42 (refer to FIG. 6) of the auction server 5 and request emotion values from the emotion server 2 on the basis of acquired object IDs of the items.

Such acquisition of emotion values by the auction server 5 from the emotion server 2 may be performed when a new item is exhibited or when an auction service user designates an item with the auction server 5 while checking items to purchase.

Then, the auction server 5 may regard the acquired emotion values as credibility (carefulness, whether the item was carefully handled, affection, etc.) of the item and sort items in order of emotion values to display items handled more carefully and items for which their users have affection at higher levels on the basis of the acquired emotion values.

The overview of the auction system 102 according to the second application example has been described above.

3-2-1. Configuration

Next, a configuration of the auction server 5 included in the auction system 102 will be described with reference to FIG. 17.

Figure 17:
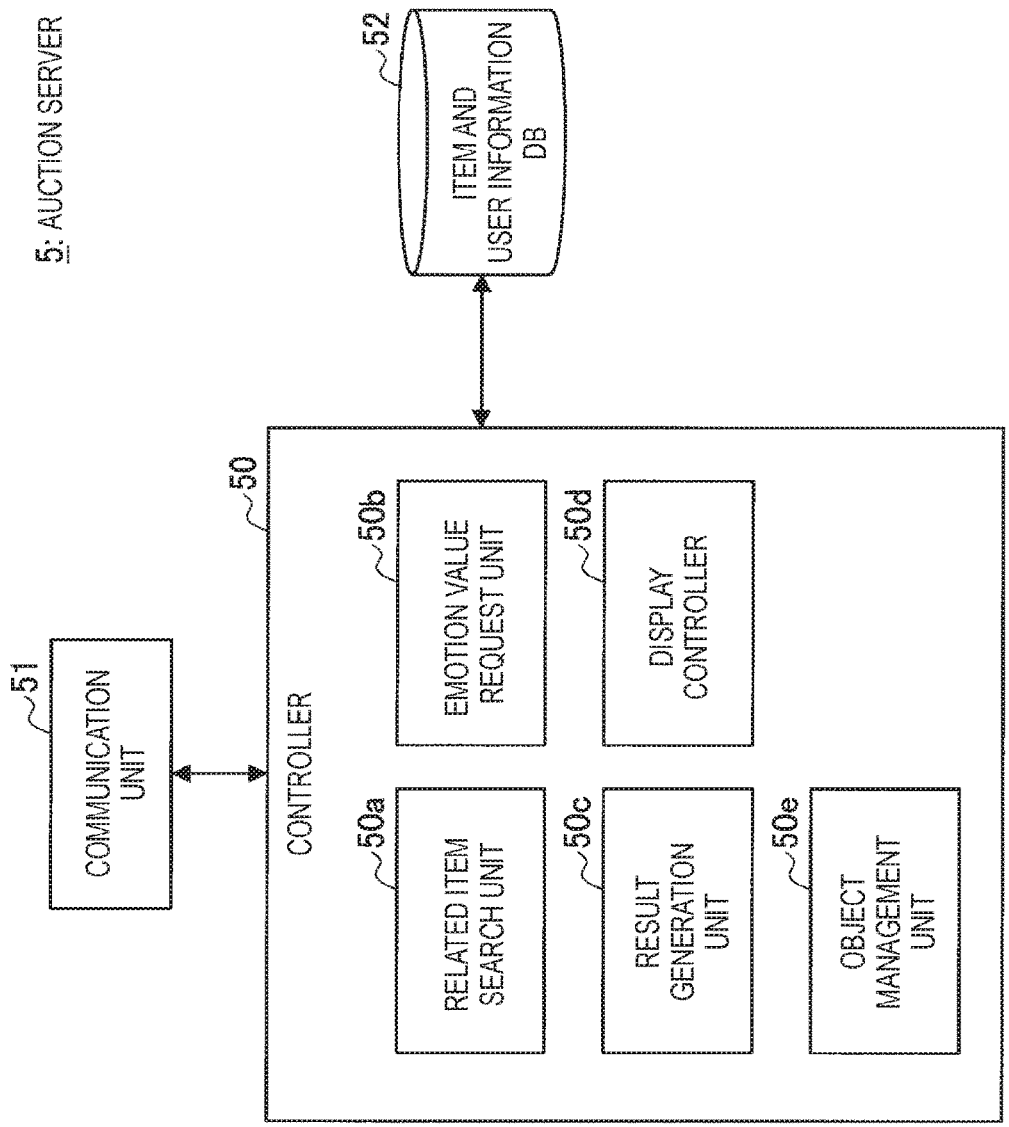
FIG. 17 is a block diagram illustrating a configuration of an auction server according to the second application example.

FIG. 17 is a block diagram illustrating an example of the configuration of the auction server 5 according to the present embodiment. As illustrated in FIG. 17, the auction server 5 includes a controller 50, a communication unit 51 and an item and user information DB 52.

(Communication Unit)

The communication unit 51 is connected to a terminal (not shown) of a user through a network, receives a request from the user and transmits emotion values of exhibited items and exhibitors to the user depending on the request. Further, the communication unit 41 is connected to the emotion server 2 through a network and acquires an emotion value of a target object and emotion values of related objects.

(Controller)

The controller 50 controls each component of the auction server 5. Further, the controller 50 is realized by a microcomputer including a CPU, a ROM, a RAM and a nonvolatile memory. In addition, the controller 50 according to the present embodiment functions as a related item search unit 50*a*, an emotion value request unit 50*b*, a result generation unit 50*c*, a display controller 50*d* and an object management unit 50*e*.

The related item search unit 50*a* searches the item and user information DB 42 for items related to a check target item. Items related to the check target item are items having the same model number and name as the check target item, for example.

The emotion value request unit 50*b* requests an emotion value of the check target item from the emotion server 2. Specifically, the emotion value request unit 50*b* transmits, to the emotion server 2 through the communication unit 51, the object ID of the check target item, object IDs of related items when there are related items, and the object ID of the exhibitor of the check target item.

The result generation unit 50*c* generates a result of checking of emotion values of the check target item and the like on the basis of the emotion values of the check target item and the like acquired by the emotion value request unit 50*b* from the emotion server 2. Specifically, the result generation unit 50*c* generates a result screen displaying the emotion value of the check target item, for example.

The display controller 50*d* controls the result screen generated by the result generation unit 50*c* to be displayed through a user terminal of a request source. For example, the display controller 50*d* controls information for displaying the result screen to be transmitted to the user terminal through the communication unit 51.

The object management unit 50*e* performs management such as registration, modification and deletion of information about items and users (examples of objects) stored in the item and user information DB 42.

(Item and User Information DB)

The item and user information DB 52 is a storage unit storing information about items and users. A user is a user registered as a member in the auction system 102, for example. Further, item and user information includes object IDs of each item and each user.

Here, an example of data of exhibited item information stored in the item and user information DB 52 is illustrated in FIG. 18. As illustrated in FIG. 18, exhibition IDs for identifying respective exhibited items, type IDs, object IDs of items, object IDs of exhibitors, exhibition dates and times, auction end dates and times, current prices, bid lists and item descriptions are correlated and stored in the item and user information DB 52.

The configuration of the auction server 5 according to the present application example has been described above. Meanwhile, the configuration of the emotion server 2 included in the auction system 102 has been described with reference to FIG. 3 and thus description thereof is omitted here.

[Example of Data Configuration]

Next, an example of data of the emotion information DB 24 of the emotion server 2 used to calculate emotion values used in the auction system 102 will be described with reference to FIG. 19. Meanwhile, an example of data of the object DB 22 used in the present application example is the same as the example illustrated in FIG. 7 and thus description thereof is omitted here.

FIG. 19 is an illustration of an example of data of the emotion information DB 24 of the emotion server 2 according to the second application example. Information about an interaction generated between objects is stored in the emotion information DB 24. In the example of data illustrated in FIG. 19, object IDs of objects for which interactions have been generated, dates and times and periods of interactions, related object IDs, interaction types, details of interactions and interaction evaluation values are correlated and stored.

When an interaction is generated between objects, the interaction is extracted with respect to both objects and each interaction is evaluated by the evaluation unit 20*b*. While interaction evaluation values extracted with respect to both objects are identical in the example illustrated in FIG. 19, the present application example is not limited thereto and the interaction evaluation values may be different. For example, when an interaction of "operating" performed by a user (object ID: 1930213) with respect to a digital camera (object ID: 384) is extracted, a positive evaluation is performed for the user who treasures the camera and thus operated the camera carefully whereas a negative evaluation is performed for the camera which was forcibly operated, roughly placed and the like. In this manner, different evaluations may be performed depending on interaction directions.

Meanwhile, examples of extraction and evaluation of each interaction are as follows.

For example, with respect to a driving interaction, details of the interaction, such as carefulness and recklessness of driving, are analyzed on the basis of sensing data sensed by sensors attached to an accelerator pedal, a brake pedal and a steering wheel. Further, an evaluation value of the driving interaction is obtained in a range of −1.0 to 1.0 by inputting input values of accelerator, brake and steering wheel operations to an evaluation function.

In addition, with respect to an interaction of operating a camera or the like, force of pressing a shutter button of the camera, speed of rotating dials/the number of returns due to excessive rotation, impact when the camera is placed, and impact applied to the body when put into a bag or the like are sensed with sensors. The evaluation unit 20*b* weights each value on the basis of sensing data sensed by the sensors to calculate an evaluation value. Further, the evaluation unit 20*b* normalizes the calculated value to a range of −1.0 to 1.0.

In addition, with respect to an interaction of storing the camera or the like, temperature, humidity and dustiness (sensible with a dust sensor) of a storage place are extracted through sensing. On the basis of variations of such values in a storage period, the evaluation unit 20*b* numerically expresses whether a storage state of the camera or the like is favorable or unfavorable. Further, each parameter may be weighted to calculate an evaluation value. The evaluation unit 20*b* normalizes calculated values to a range of −1.0 to 1.0.

3-2-2. Display Process

Next, a display process of the auction system 102 will be described with reference to FIGS. 20 to 26.

[List Display]

Figure 20:
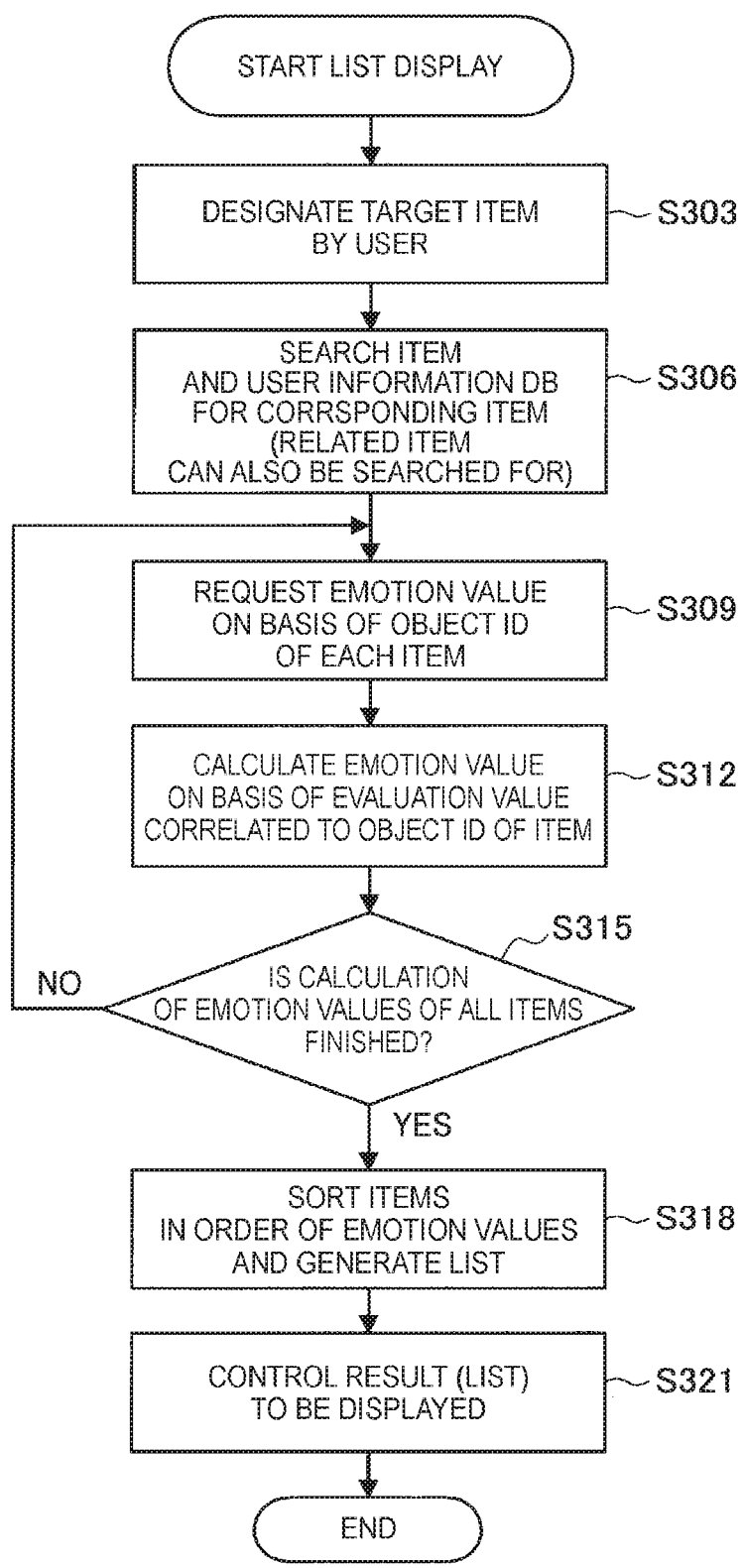
FIG. 20 is a flowchart illustrating a list display process depending on emotion values of exhibited items according to the second application example.

FIG. 20 is a flowchart illustrating a list display process depending on emotion values of exhibited items according to the second application example. As illustrated in FIG. 20, first of all, an exhibited item of a check target is designated by a user in step S303.

Then, the emotion value request unit 50*b* of the auction server 5 searches the item and user information DB 52 for the item designated by the user in step S306. Here, items related to information on the corresponding item searched for by the related item search unit 50*a* (other exhibited items having the same model number and name) may also be searched for.

Subsequently, the emotion value request unit 50*b* requests an emotion value of the target person to the emotion server 2 on the basis of the object ID of each item in step S309.

Thereafter, the emotion value calculation unit 20e of the emotion server 2 calculates an emotion value on the basis of an interaction evaluation value correlated with the object ID of the designated item in step S312.

When emotion values of a plurality of items are requested, the aforementioned steps S309 and S312 are repeated until calculation of emotion values of all items is finished (S315).

Thereafter, when calculation of emotion values of all items is finished ("Yes" in S315), the result generation unit 50c of the auction server 5 sorts items in order of emotion values and generates an exhibited item ranking screen based on emotion values in step S318 Here, the result generation unit 40c generates a ranking screen based on a total emotion value (absolute emotion value) of the target item.

Figure 21:
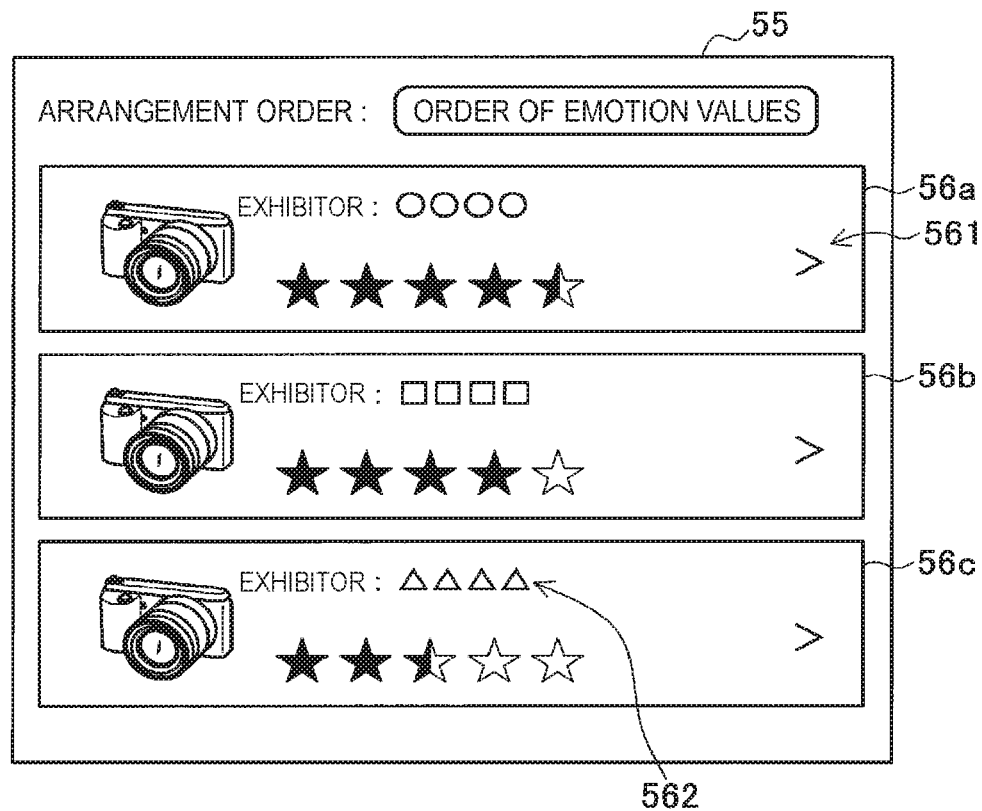
FIG. 21 is an illustration of an example of a list display screen depending on emotion values of exhibited items according to the second application example.

Here, an example of a list display screen based on emotion values of exhibited items is illustrated in FIG. 21. As illustrated in FIG. 21, a list display screen 55 displays check target items in order based on total emotion values (absolute emotion values) of respective items. The check target items include exhibited items (related items) having the same model number and name as an exhibited item designated by a user in addition to the exhibited item designated by the user. Accordingly, the user can recognize emotion values of exhibited items of the same type as the designated exhibited item in addition to the designated exhibited item.

For example, the list display screen 55 includes target item information boxes 56a, 56b and 56c which are arranged in descending order of emotion values. The target item information boxes 56a, 56b and 56c each include the names of exhibitors of target items, and star indicators indicating ranking based on emotion values. Further, emotion values corresponding to a basis of ranking may be displayed in the target item information boxes 56a, 56b and 56c.

In addition, when an arrow 561 included in the target item information box 56a is selected, for example, detailed information about an emotion value of an item exhibited by an exhibitor ○○○○ is displayed. Display of detailed information about an emotion value of an item will be described below with reference to FIGS. 22 to 24. Further, when an exhibitor name 562 included in the target item information box 56c is selected, for example, detailed information about an emotion value of an exhibitor ▲▲▲▲ is displayed. Display of detailed information about an emotion value of an exhibitor will be described below with reference to FIGS. 23 and 24.

Referring back to FIG. 20, the display controller 50d controls the result (list display screen) generated by the result generation unit 50c to be displayed through a user terminal of a request source in step S321.

[Display of Detailed Information about Emotion Value of Exhibited Item]

Figure 22:
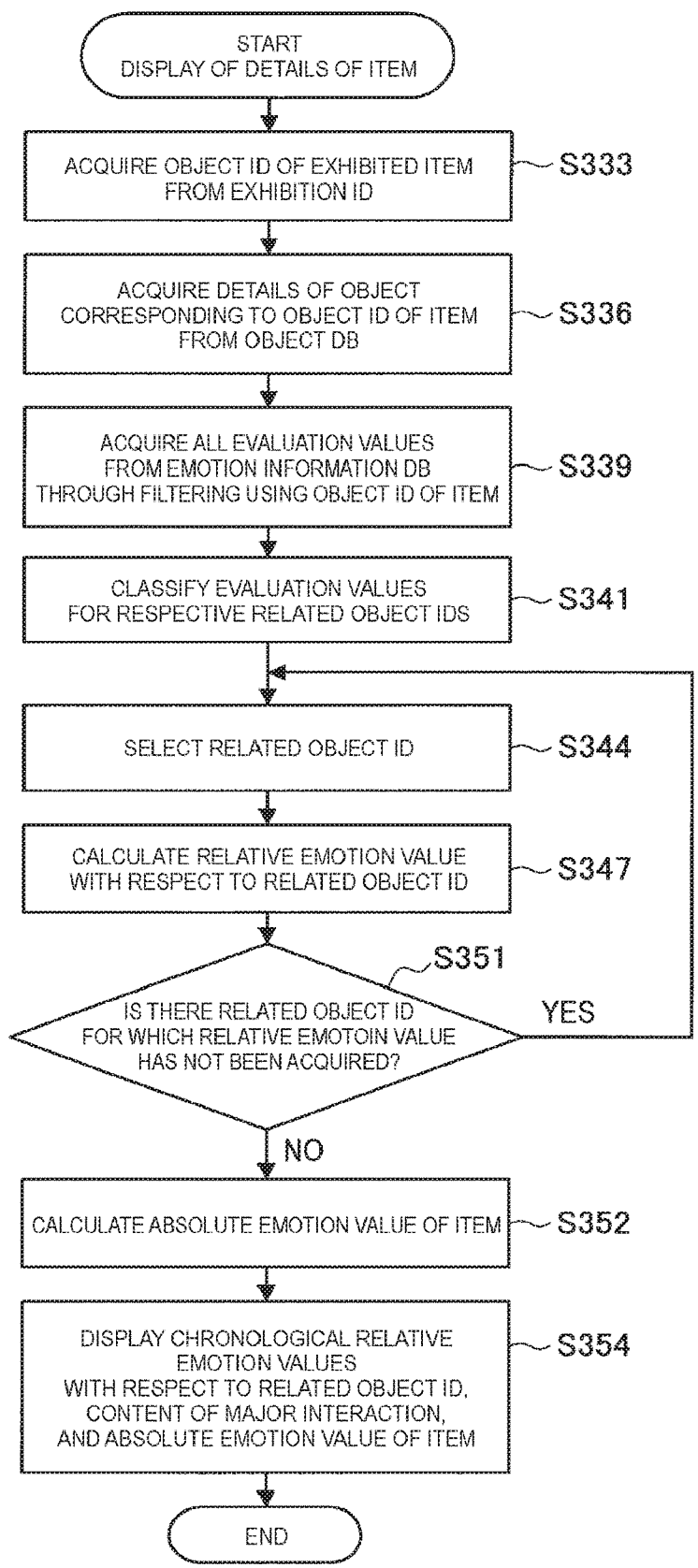
FIG. 22 is a flowchart illustrating a process of displaying detailed information about emotion values of exhibited items according to the second application example.

FIG. 22 is a flowchart illustrating a process of displaying detailed information about an emotion value of an exhibited item according to the second application example. As illustrated in FIG. 22, first of all, the personal credit information provision server 4 acquires an object ID of an exhibited item from an exhibition ID and requests an emotion value of the exhibited item from the emotion server 2 in step S333.

Subsequently, the emotion value calculation unit 20e of the emotion server 2 acquires detailed content (item type, maker, manufacture date and time, etc.) of an object corresponding to the object ID of the item from the object DB 22 in step S336.

Then, the emotion value calculation unit 20e acquires all interaction evaluation values of the target item from the emotion information DB 24 through filtering using the object ID of the item in step S339 (refer to FIG. 23).

Thereafter, the emotion value calculation unit 20e classifies all the acquired interaction evaluation values of the target item for respective related object IDs in step S341. Here, a related object ID refers to an object having an interaction performed with respect to the target item and, generally, corresponds to the owner of the target item.

Then, the emotion value calculation unit 20e selects one related object ID in step S344.

Subsequently, a relative emotion value between the selected related object ID and the target item is calculated in step S347. That is, the emotion value calculation unit 20e calculates an interaction evaluation value with respect to the related object ID selected in the aforementioned step S344 from among the emotion values classified for respective related object IDs in the aforementioned step S341.

Subsequently, the aforementioned steps S344 and S347 are repeated until calculation of relative emotion values of all related object IDs corresponding to (having interaction relations with) the target item is finished (S351).

Then, the emotion value calculation unit 20e calculates an absolute emotion value of the target item on the basis of all interaction evaluation values of the target item, acquired in S339, in step S352. Hereinafter, an example of calculation of relative/absolute emotion values of an exhibited item will be described with reference to FIG. 23.

FIG. 23 is an explanatory diagram of calculation of relative/absolute emotion values of an exhibited item according to the second application example. As illustrated in FIG. 23, first of all, all interaction information about the exhibited item is acquired from the emotion information DB 24 through filtering using the exhibited item (object ID: 384).

Then, the emotion value calculation unit 20e calculates an absolute emotion value of the item and emotion values (relative emotion values with respect to respective related object IDs (object IDs: 1930213, 4649 and 5963084) on the basis of the acquired interaction information. A related object ID is an object ID of a past owner of the item.

The absolute emotion value of the item is a total number of emotion values based on interaction history of the item so far. Specifically, the absolute emotion value of the item is calculated based on a total sum of the products of average values with respect to respective interaction types and weights a depending on interaction types (operating and storing), for example, as illustrated in FIG. 23.

Further, the absolute emotion value of the item is an emotion value based on interaction history of each past owner of the item. FIG. 23 illustrates a mathematical expression of calculating a relative emotion value between object ID: 5963084 (an owner) and a digital camera (object 384) as an example. As illustrated in FIG. 23, a relative emotion value between the item and the related object ID is calculated based on a total sum of the products of average values with respect to interaction types and weights a depending on interaction types (operating and storing) using interaction history (the third and fourth lines of the example of data illustrated in FIG. 23) with respect to related object ID: 5963084.

Referring back to FIG. 22, the result generation unit 50c of the auction server 5 generates a screen displaying chronological relative emotion values with respect to the related object ID, content of major interactions, and the absolute emotion value (total emotion value) of the item as detailed information about emotion values of the item acquired by the emotion value request unit 50b from the emotion server 2 in step S354. Then, the display controller 50d controls the generated detailed information display screen through a user terminal of a request source.

Figure 24:
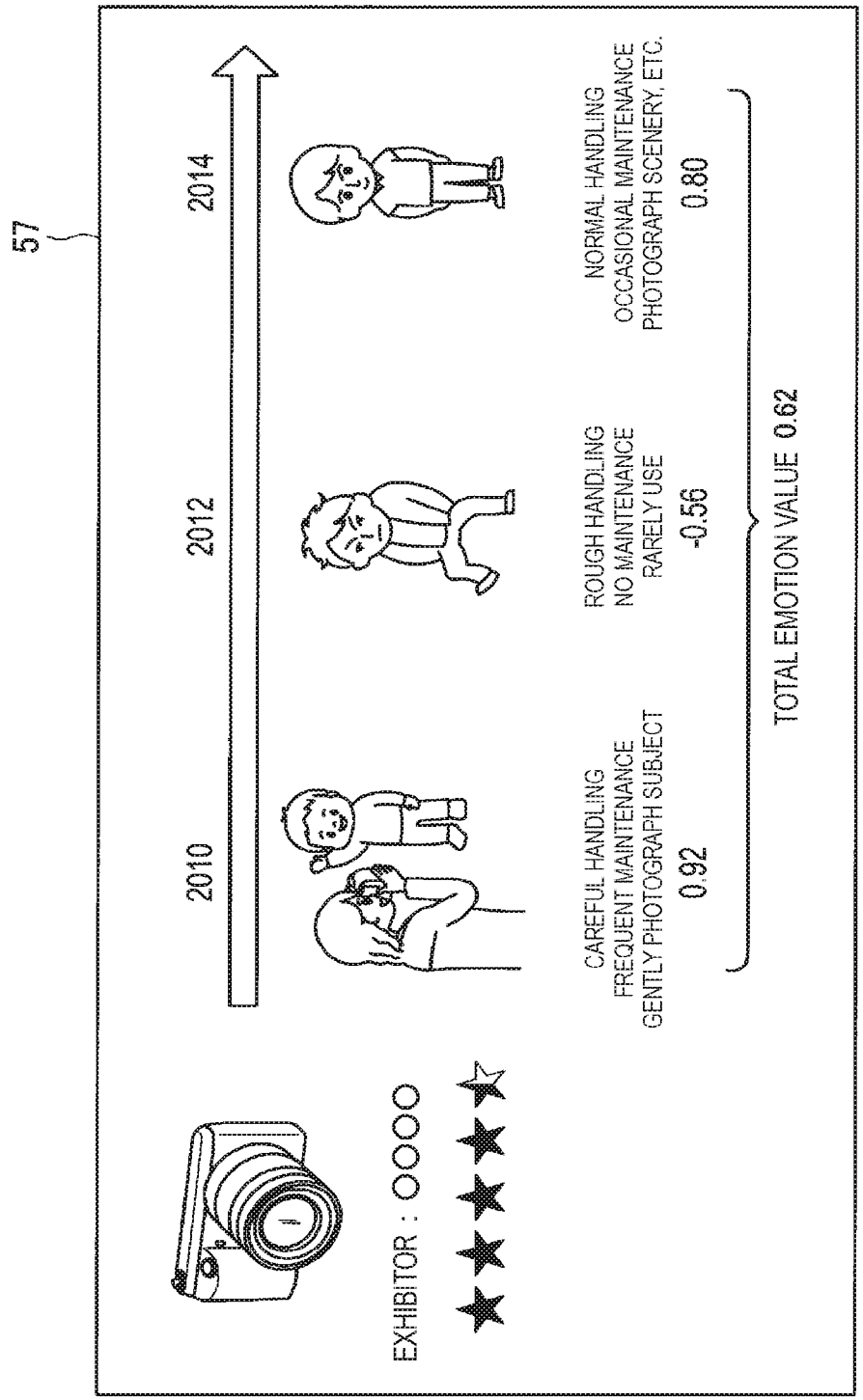
FIG. 24 is an illustration of an example of a display screen of detailed information about an exhibited item according to the second application example.

Here, an example of the display screen of detailed information about emotion values of the exhibited item is illustrated in FIG. 24. The target item information box 46a of the list display screen 55 illustrated in FIG. 21 is switched to a display screen 57 of detailed information on the exhibited item illustrated in FIG. 24 when the arrow 561 included in the target item information box 46a of the list display screen 55 illustrated in FIG. 21 is selected, and detailed information about emotion values of the item exhibited by the exhibitor ○○○○ is displayed.

The detailed information display screen 57 illustrated in FIG. 24 displays relative emotion values (0.92, −0.56 and 0.80) of past owners of the item exhibited by the exhibitor ○○○○ in time series and also displays a total emotion value (absolute emotion value) of the item. Accordingly, a user can recognize how the item has been handled so far and what past owners thought about the item. In this way, emotion values objectively indicating an emotional value based on manners of handling so far are specified as a new value of the item.

[Display of Detailed Information about Emotion Value of Exhibitor]

Figure 25:
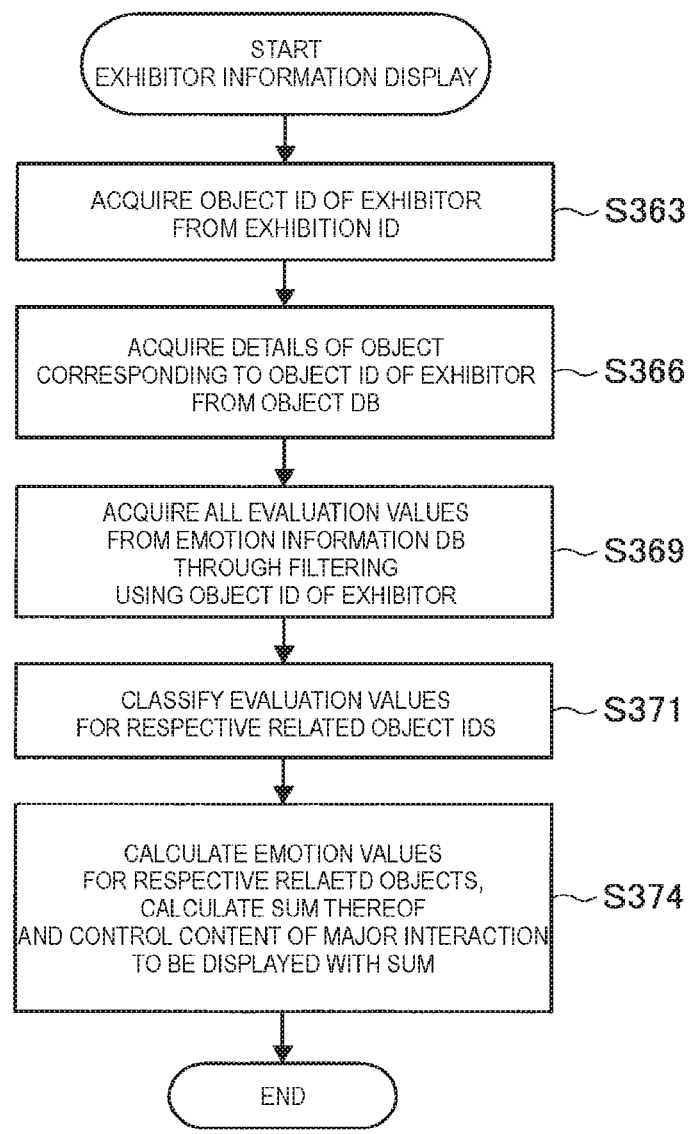
FIG. 25 is a flowchart illustrating a process of displaying detailed information about emotion values of an exhibitor according to the second application example.

FIG. 25 is a flowchart illustrating a process of displaying detailed information about an emotion value of an exhibitor. As illustrated in FIG. 25, first of all, the personal credit information provision server 4 acquires an object ID of the exhibitor from an exhibition ID and requests an emotion value of the exhibitor from the emotion server 2 in step S363.

Subsequently, the emotion value calculation unit 20e of the emotion server 2 acquires detailed content (name, sex, age and the like) of an object corresponding to the object ID of the exhibitor from the object DB 22 in step S366.

Then, the emotion value calculation unit 20e acquires all interaction evaluation values (interaction information history so far) of the exhibitor from the emotion information DB 24 through filtering using the object ID of the exhibitor in step S369.

Thereafter, the emotion value calculation unit 20e classifies all the acquired interaction evaluation values of the exhibitor for respective related object IDs in step S371. Here, related object IDs refer to objects having interaction relations with a target person and generally correspond to items owned by the exhibitor and other items exhibited by the exhibitor.

Then, in step S374, the emotion value calculation unit 20e calculates emotion values (relative emotion values) for respective related objects, calculates the sum (absolute emotion value) of the emotion values and transmits the sum to the auction server 5. The result generation unit 50c of the auction server 5 generates a screen displaying the relative emotion values of the respective related object IDs, content of major interactions, and an absolute emotion value (total emotion value) of the exhibitor as detailed information about emotion values of the exhibitor acquired by the emotion value request unit 50b from the emotion server 2. Then, the display controller 50d controls the generated detailed information display screen to be displayed through a user terminal of a request source. Meanwhile, the total emotion value (absolute emotion value) of the exhibitor may be a total sum of emotion values (relative emotion values) of respective related objects or an average value thereof or may be calculated by applying weights to interaction types and then summing evaluation values or averaging the evaluation values.

Figure 26:
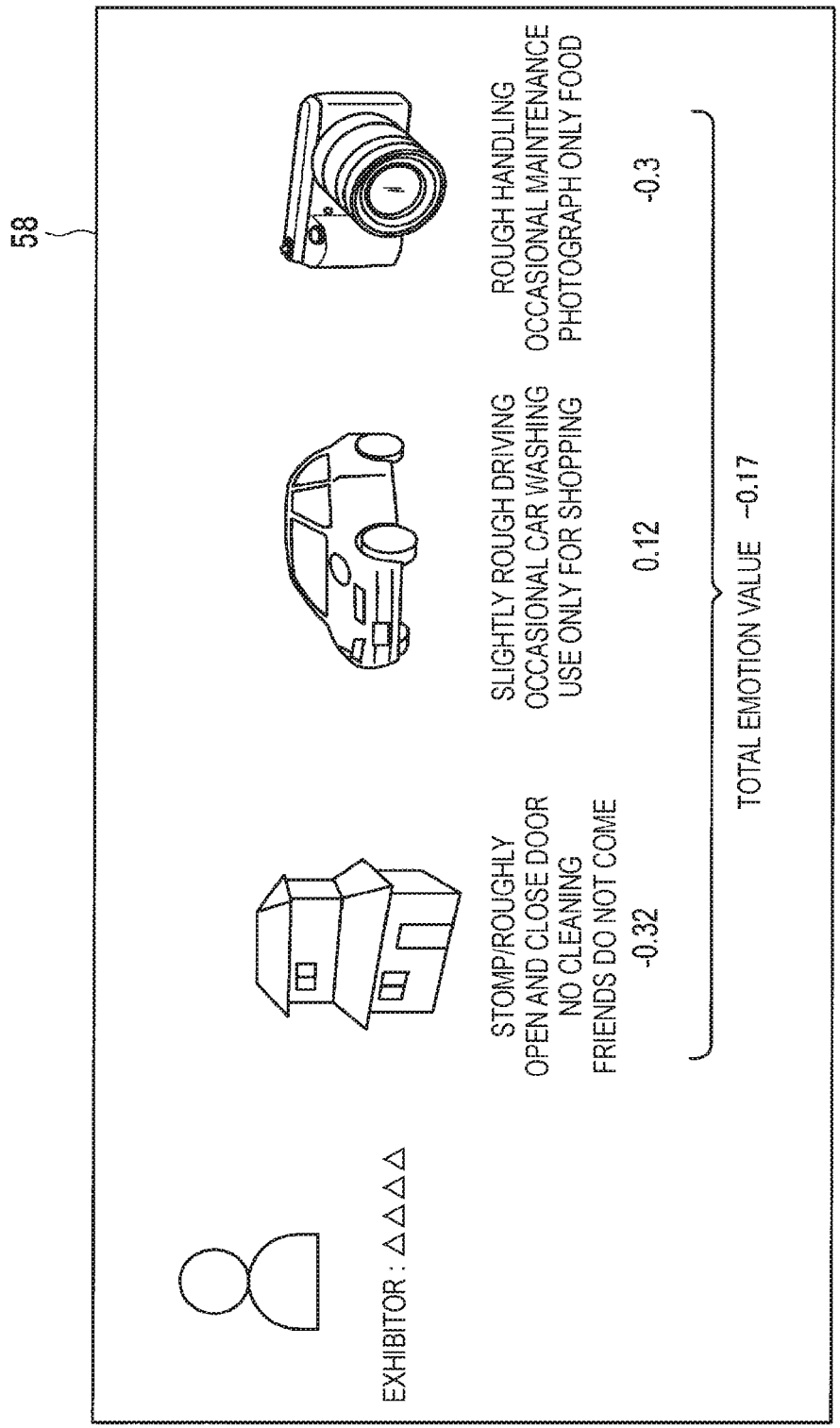
FIG. 26 is an illustration of an example of a display screen of detailed information about emotion values of an exhibitor according to the second application example.

Here, an example of the display screen of detailed information about emotion values of the exhibitor is illustrated in FIG. 26. The target item information box 46c of the list display screen 55 illustrated in FIG. 21 is switched to a display screen 58 of detailed information on the exhibitor illustrated in FIG. 26 when the exhibitor name 562 included in the target item information box 46c of the list display screen 55 illustrated in FIG. 21 is selected, and detailed information about emotion values of the exhibitor ΔΔΔΔ is displayed.

The detailed information display screen 58 illustrated in FIG. 26 displays relative emotion values (−0.32, 0.12 and −0.3) with respect to items of the exhibitor ΔΔΔΔ and additionally displays the total emotion value (absolute emotion value) of the exhibitor. Accordingly, a user can determine whether the exhibitor is a person who generally handles articles carefully or a person who usually handles articles roughly by checking emotion values of articles other than the exhibited item with respect to trust and carefulness of handling of the exhibitor. The personality of the exhibitor can be recognized by checking emotion values of the exhibitor before successfully bidding on the exhibited item.

Meanwhile, the detailed information display screen 58 may display other information (age, sex and the like) set as sharable information by the exhibitor as information on the exhibitor.

The auction system 102 according to the second application example has been described above.

3-3. Environment Adjustment System

Next, a case in which emotion values are used for an environment adjustment system 103 that locally adjusts a surrounding environment of a moving user will be described as a third application example with reference to FIGS. 27 to 34.

Figure 27:
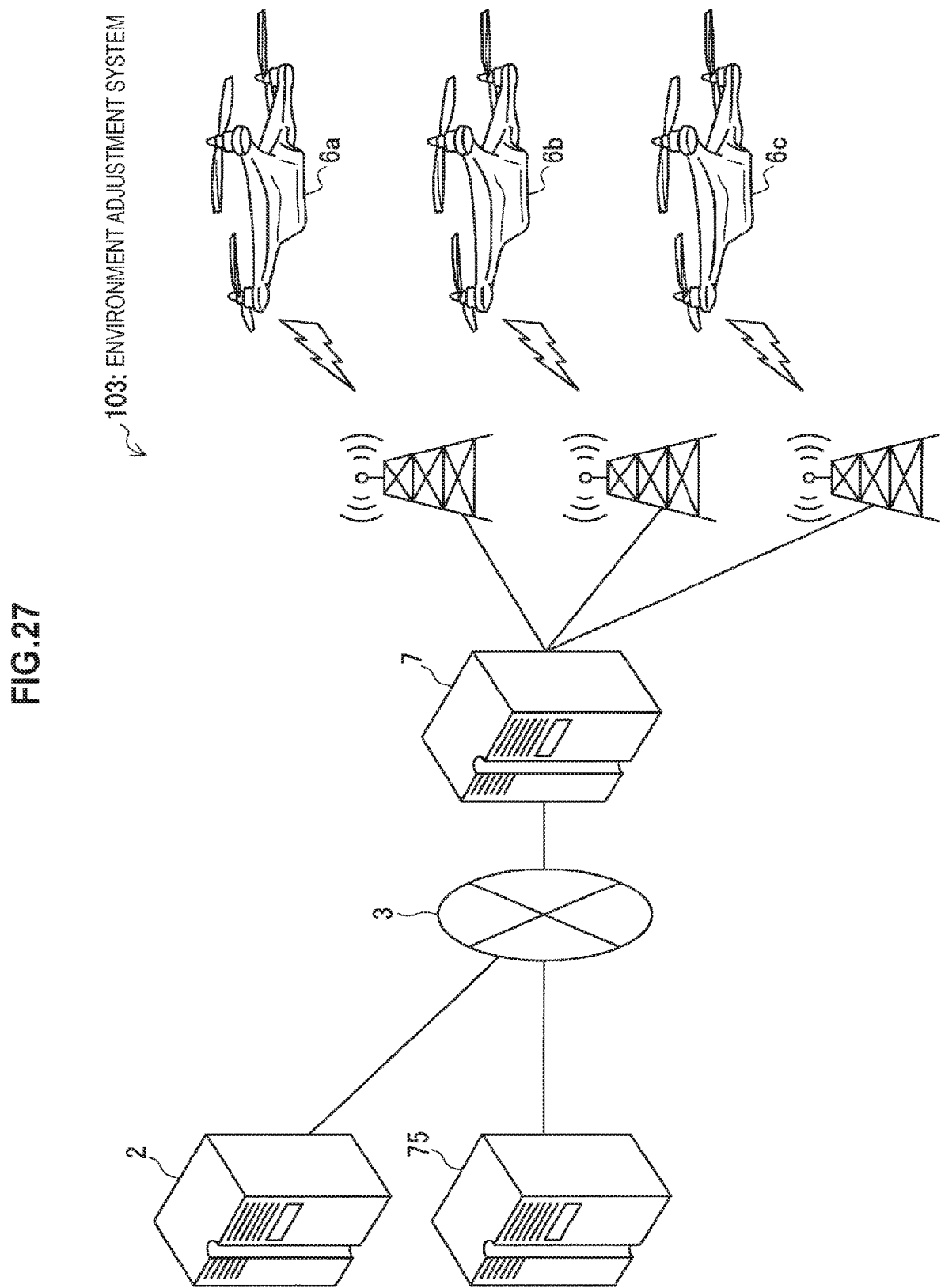
FIG. 27 is an explanatory diagram of the entire configuration of an environment adjustment system according to a third application example.

FIG. 27 is an explanatory diagram of the entire configuration of the environment adjustment system 103 according to the third application example. As illustrated in FIG. 27, the environment adjustment system 103 includes a moving object 6 that tracks a user to change a surrounding environment of the user and an environment adjustment server 7 that controls the moving object 6. The environment adjustment server 7 communicates with the moving object 6 via an access point or the like and performs movement control and the like of the moving object 6. The moving object 6 may be a plurality of moving objects 6a to 6c and may move using base stations installed outdoors or the like as base points, as illustrated in FIG. 1.

The environment adjustment server 7 is connected to an emotion server 2 and a heat map server 75 via a network 3 and acquires information necessary for movement control of the moving object 6. For example, the environment adjustment server 7 may acquire an emotion value of a user from the emotion server 2 and perform environment adjustment control depending on the emotion value.

In addition, the environment adjustment server 7 may provide a more pleasant environment for a user by causing the moving object 6 to track the user and locally change a surrounding environment depending on an emotion of the user.

The moving object 6 may be realized by a small flying drone as illustrated in FIG. 27 and can fly while tracking a moving user. FIG. 28 is an explanatory diagram of an example of environment adjustment by the moving object 6 of the present application example. As illustrated in FIG. 28, the moving object 6 may fly and track a moving user while remaining above the user to function as an umbrella or a parasol such that the user is not exposed to rain or direct sunlight, thereby locally changing a surrounding environment of the user, for example. Further, the moving object 6 may change a cover range as necessary. For example, the cover range may be widened by extending a plate member 651 that extends from the center of the moving object 6 in a circular form, as illustrated in FIG. 28.

Meanwhile, the moving object 6 is not limited to the flying object illustrated in FIG. 27 and may be, for example, a robot type moving object that moves on the ground while tracking a user or a moving object in the water.

The overview of the environment adjustment system 103 according to the present disclosure has been described above.

3-3-1. Configuration

Next, configurations of the moving object 6 and the environment adjustment server 7 included in the environment adjustment system 103 according to the present application example will be sequentially described. Incidentally, the configuration of the emotion server 2 has been described with reference to FIG. 3 and thus description thereof is omitted here.

[Configuration of Moving Object 6]

Figure 29:
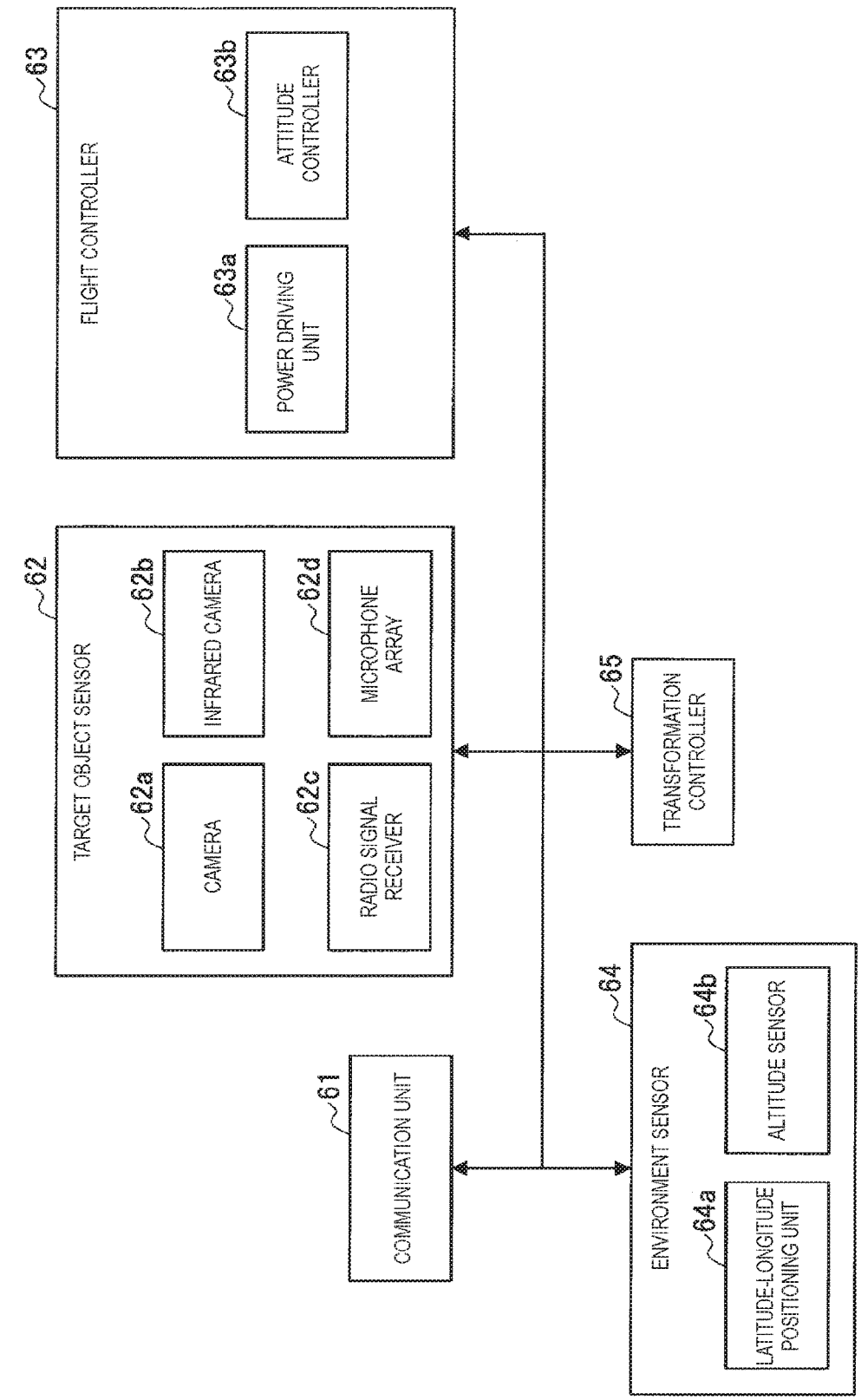
FIG. 29 is a block diagram illustrating an example of a configuration of a moving object according to the third application example.

FIG. 29 is an illustration of an example of the configuration of the moving object 6 according to the present application example. As illustrated in FIG. 29, the moving object 6 includes a communication unit 61, a target object sensor 62, a moving object controller 63, an environment sensor 64 and a transformation controller 65.

The communication unit 61 transmits/receives data to/from the environment adjustment server 7. For example, the communication unit 61 transmits sensor information acquired through the target object sensor 62 and the environment sensor 64 to the environment adjustment server 7 and receives control information including instructions of movement control and transformation control from the environment adjustment server 7.

The target object sensor 62 is a sensing unit that acquires information about a tracking target object. Here, the tracking target object corresponds to a user moving outdoors, for example. The target object sensor 62 includes a camera 62a, an infrared camera 62b, a radio signal receiver 62c or a microphone array 62d, for example, and acquires information about a user.

The moving object controller 63 has a function of controlling movement of the moving object 6. Specifically, the moving object controller 63 includes a power-driving unit 63a and an attitude controller 63b. The power-driving unit 63a is realized by, for example, a propeller, a wheel or walking legs and operates to track a target user in accordance with control of the moving object controller 63. In addition, the attitude controller 63b senses an attitude of the moving object 6 through a gyro sensor or the like and controls the power-driving unit 63a to adjust an inclination and altitude of the moving object 6. The moving object controller 63 according to the present disclosure may locally change a surrounding environment of a user by controlling a flight path and altitude of the moving object 6 such that the moving object 6 becomes, for example, a cover from rain or sunlight for the user.

The environment sensor 64 is a sensing unit that acquires information about a surrounding environment. Specifically, the environment sensor 64 acquires environment information through a latitude-longitude positioning unit 64a or an altitude sensor 64b, for example. The specific example of the environment sensor 64 is not limited to this and the environment sensor 64 may further include a temperature sensor, a humidity sensor and the like as necessary.

The transformation controller 65 performs control of transforming the shape of the moving object 6 to extend a cover range when covering from rain or sunlight.

The aforementioned moving object 6 is equipped with a micro-computer including a central processing unit (CPU), a read only memory (ROM), a random access memory (RAM) and a nonvolatile memory to control each component of the moving object 6.

[Configuration of Environment Adjustment Server]

Figure 30:
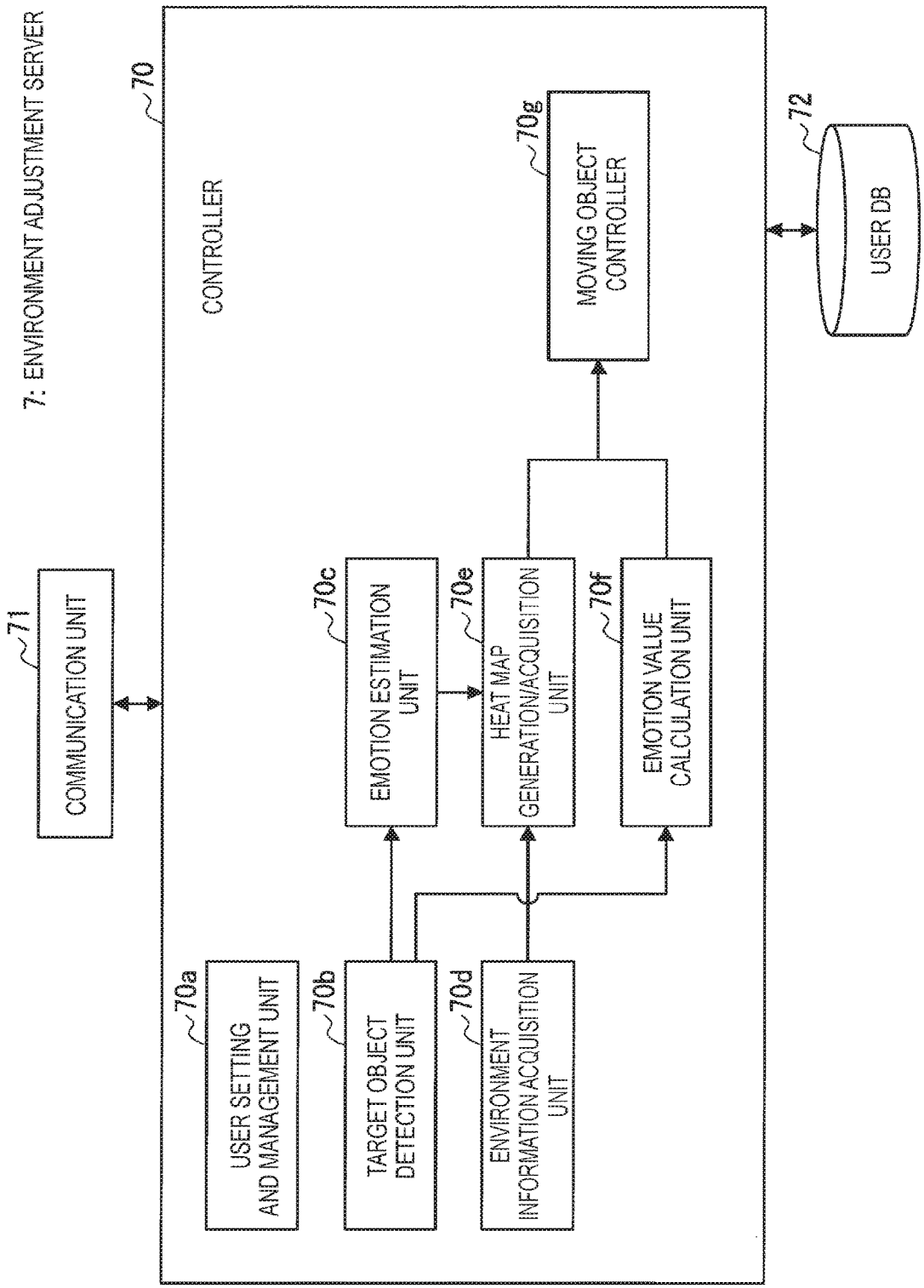
FIG. 30 is a block diagram illustrating an example of a configuration of an environment adjustment server according to the third application example.

FIG. 30 is a block diagram illustrating an example of a configuration of the environment adjustment server 7 according to the present embodiment. As illustrated in FIG. 30, the environment adjustment server 7 includes a communication unit 71, a controller 70 and a user DB 72.

The communication unit 71 transmits/receives data to/from an external device. Specifically, the communication unit 71 receives target object information and environment information from the moving object 6 and transmits control information for controlling movement of the moving object 6 to the moving object 6, for example. Furthermore, the communication unit 71 acquires predetermined data from the emotion server 2 and the heat map server 75 via the network 3.

The controller 70 controls each component of the environment adjustment server 7. Specifically, the controller 70 controls the moving object 6 to track a target user to change a surrounding environment of the target user depending on a user's emotion. In addition, the controller 70 is realized by a micro-computer including a CPU, a ROM, a RAM and a nonvolatile memory.

Here, the controller 70 functions as a user setting and management unit 70a, a target object detection unit 70b, an emotion estimation unit 70c, an environment information acquisition unit 70d, a heat map generation/acquisition unit 70e, an emotion value calculation unit 70f and a moving object controller 70g.

The user setting and management unit 70a manages registration, change and deletion of information of a user who uses the present system. For example, the information of the user includes the user's name, identification number, face image, age, sex, hobbies, tastes, home address, place of work, behavior pattern and the like.

The target object detection unit 70b detects a person located near the moving object 6, an object carried by the person, and the like on the basis of target object sensor information transmitted from the moving object 6. Specifically, the target object detection unit 70b may detect the target user, for example, by analyzing a captured image transmitted from the moving object 6 and comparing the captured image with a face image of the user registered in the user DB 72. Otherwise, the target object detection unit 70b may detect the target user on the basis of user identification information received by the moving object 6 from a radio communication device such as the smart band worn by the user.

The emotion estimation unit 70c estimates an emotion of the target user detected by the target object detection unit 70b. Specifically, the emotion estimation unit 70c estimates an emotion of the target user on the basis of bio-information (pulse, temperature, volume of perspiration, brainwave and the like), for example. The bio-information is acquired by the smart band worn by a user, transmitted to the moving object 6 and transmitted from the moving object 6 to the environment adjustment server 7.

Furthermore, the emotion estimation unit 70c may estimate an emotion of the target user on the basis of attributes (sex, age, height, weight, personality, occupation and the like), hobbies and tastes and a surrounding environment of the target user.

The environment information acquisition unit 70d acquires information about a surrounding environment from the moving object 6 through the communication unit 71. Specifically, the environment information acquisition unit 70d acquires data (latitude, longitude, altitude and the like) sensed by the environment sensor 64 of the moving object 6 as environment information. In addition, the environment information acquisition unit 70d may acquire surrounding geographic information, building information and the like from a predetermined server as environment information depending on the location (latitude and longitude information) of the moving object 6.

The heat map generation/acquisition unit 70e generates an emotion heat map that geographically maps emotions on the basis of estimation results of the emotion estimation unit 70c and the environment information output from the environment information acquisition unit 70d. More specifically, the heat map generation/acquisition unit 70e generates an emotion heat map indicating whether there are many users having certain emotions in certain places on the basis of results of estimation of emotions of a plurality of users.

Further, the heat map generation/acquisition unit 70e generates an environment heat map of surroundings of the current place of the target user on the basis of the environment information (latitude, longitude, altitude, geographical information, building information, etc.) output from the environment information acquisition unit 70d.

The heat map generated in this manner may be stored in the heat map server 75 on a network or stored in a storage unit (not shown) of the environment adjustment server 7. Furthermore, the heat map may be periodically updated.

In addition, the heat map generation/acquisition unit 70e may generate an integrated heat map of an emotion heat map and an environment heat map.

The emotion value calculation unit 70f calculates emotion values (i.e., relative emotion values) with respect to belongings of the target user detected by the target object detection unit 70b and a person (related object) along the target user. Specifically, the emotion value calculation unit 70f acquires an interaction evaluation value correlated to an object ID of the target user from the emotion server 2 and calculates a relative emotion value of the target user for each interaction evaluation value on the basis of the interaction evaluation.

For example, evaluation of an interaction of the target user frequently maintaining a watch that he or she owns and evaluation of an interaction of storing the watch in a case specially designed therefor are stored in the emotion server 2 and the emotion value calculation unit 70f acquires such interaction evaluations of the target user and calculates emotion values. Although an evaluation value calculation method is not particularly limited, for example, interactions with a specific object (related object) of the target user may be classified by interaction types and evaluations of all interactions with respect to the specific object may be averaged using a weighting function depending on interaction type. The object ID of the target user may be acquired from the user DB 72.

The moving object controller 70h determines an area that requires environmental change on a route through which the target user moves on the basis of the integrated heat map output from the heat map generation/acquisition unit 70e and controls the moving object 6 to change a surrounding environment of the user. Determination of the area that requires environmental change is performed on the basis of whether a value of the integrated heat map is higher than a predetermined threshold value. In this manner, the surrounding environment of the target user may be locally changed by causing the moving object 6 to track the target user when the target user passes through a place where the user easily gets wet in the rain, for example, to take shelter from the rain by using the integrated heat map obtained by integrating the emotion heat map and the environment heat map, thereby allowing the target user to be in a pleasant state.

Furthermore, when the surrounding environment of the target user is changed by the moving object 6, the moving object controller 70h may perform control of extending a cover range by the moving object 6 or covering belongings of the target user or a person with the target user prior to the target user depending on an emotion value (a valuing degree) with respect to the belongings of the target user or the person with the target user, obtained by the emotion value calculation unit 70f.

The configuration of each device included in the present application example has been described in detail above. Meanwhile, although the principle of calculation of emotion values by the emotion value calculation unit 70f of the environment adjustment server 7 has been described in the present application example, calculation of emotion values may be performed on the side of the emotion server 2.

3-3-2. Operation Processes

Next, operation processes according to the present application example will be described with reference to FIGS. 31 and 32.

[Environment Adjustment Process]

Figure 31:
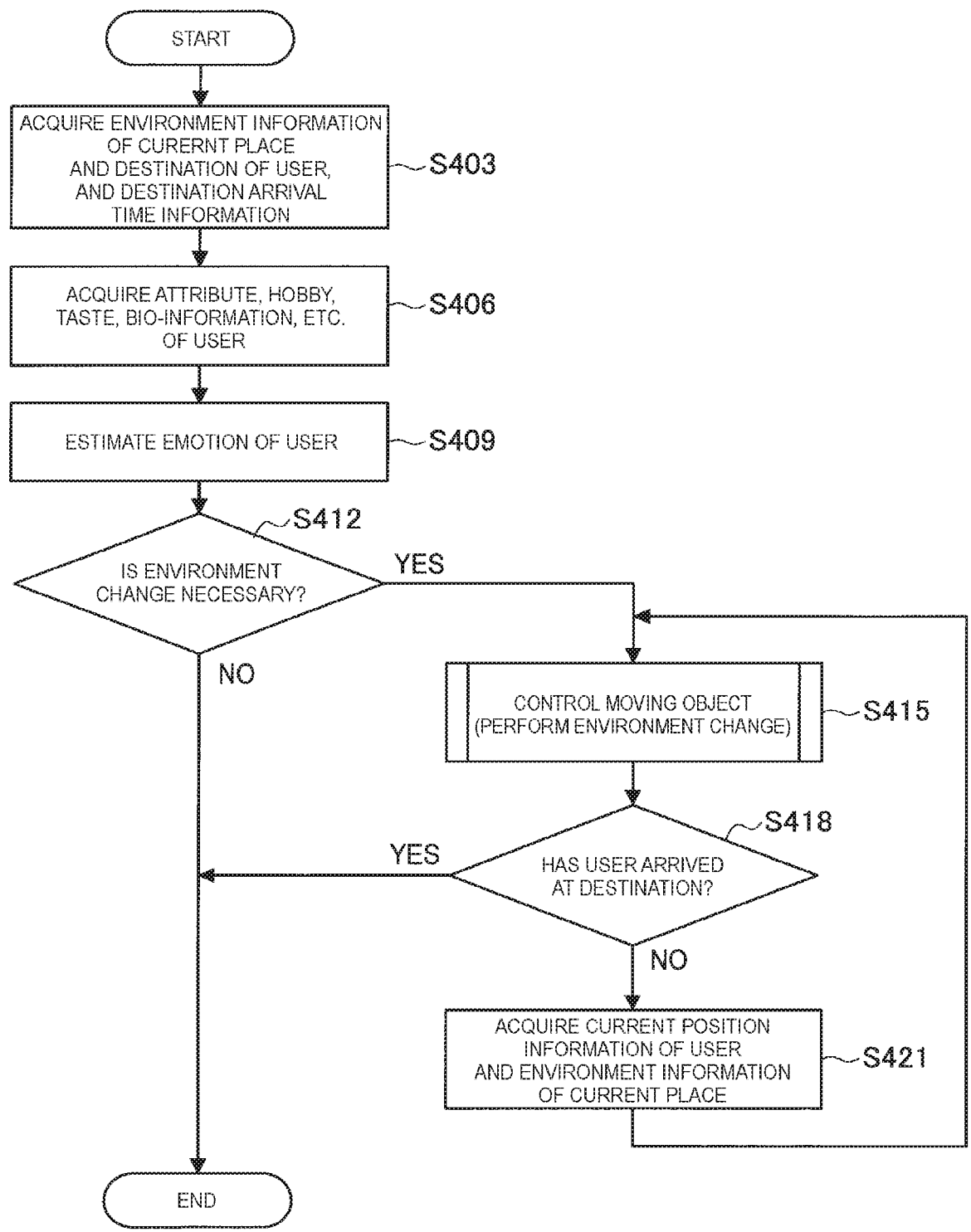
FIG. 31 is a flowchart illustrating an environment adjustment process according to the third application example.

FIG. 31 is a flowchart illustrating an environment adjustment process. As illustrated in FIG. 31, first of all, the environment adjustment server 7 acquires environment information of a current place and a destination of a target user and destination arrival time information in step S403.

Subsequently, the emotion estimation unit 70c of the environment adjustment server 7 acquires attributes, hobbies, tastes, bio-information and the like of the user in step S406.

Next, the emotion estimation unit 70c estimates a user's emotion in step S409. That is, the emotion estimation unit 70c may estimate a user's emotion in the current environment on a route from the current location to the destination on the basis of the attributes, hobbies, tastes, bio-information and the like of the user. For example, when the user is a woman in her 30s, the fact that the user usually carries a parasol is extracted from the past behavior history, conversations, writing and the like and the fact that sunblock and the parasol were purchased is extracted from purchase history, it is estimated that the woman has a feeling of being worried (unpleasant emotion) about ultraviolet rays, direct sunlight and sunburn.

Subsequently, the controller 70 of the environment adjustment server 7 determines whether environmental change is necessary on the basis of the estimation result in step S412. Specifically, when the user has a feeling of warrying (unpleasant emotion) about ultraviolet rays, direct sunlight and sunburn, for example, the controller 70 determines that environmental change is necessary if weather of the current location and destination is clear and there is exposure to direct sunlight.

Thereafter, when the environment change is necessary ("Yes" in S412), the moving object controller 70g controls the moving object 6 to change a surrounding environment of the target user in step S415. Specifically, the moving object controller 70g causes the moving object 6 to track the target user to fly at a position for covering from rain or sunlight.

Then, the environment adjustment server 7 determines whether the user has arrived at the destination in step S418. When the user has arrived at the destination, the environment adjustment operation is ended and thus the moving object controller 70g controls the moving object 6 to return a predetermined base station, for example.

When the user has not arrived at the destination ("No" in S418), the environment adjustment server 7 acquires current position information of the user and environment information of the current location through the target object detection unit 70b and the environment information acquisition unit 70d in step S421. S415 is repeated.

[Cover Range Change Process]

Next, a process of changing the cover range of the moving object 6 will be described with reference to FIG. 32. The present application example may change the cover range on the basis of an emotion value of the target user. Accordingly, it is possible to perform environment adjustment depending on a feeling of the target user such as preferentially covering an article usually important to the target user or covering a person important to the target user.

Figure 32:
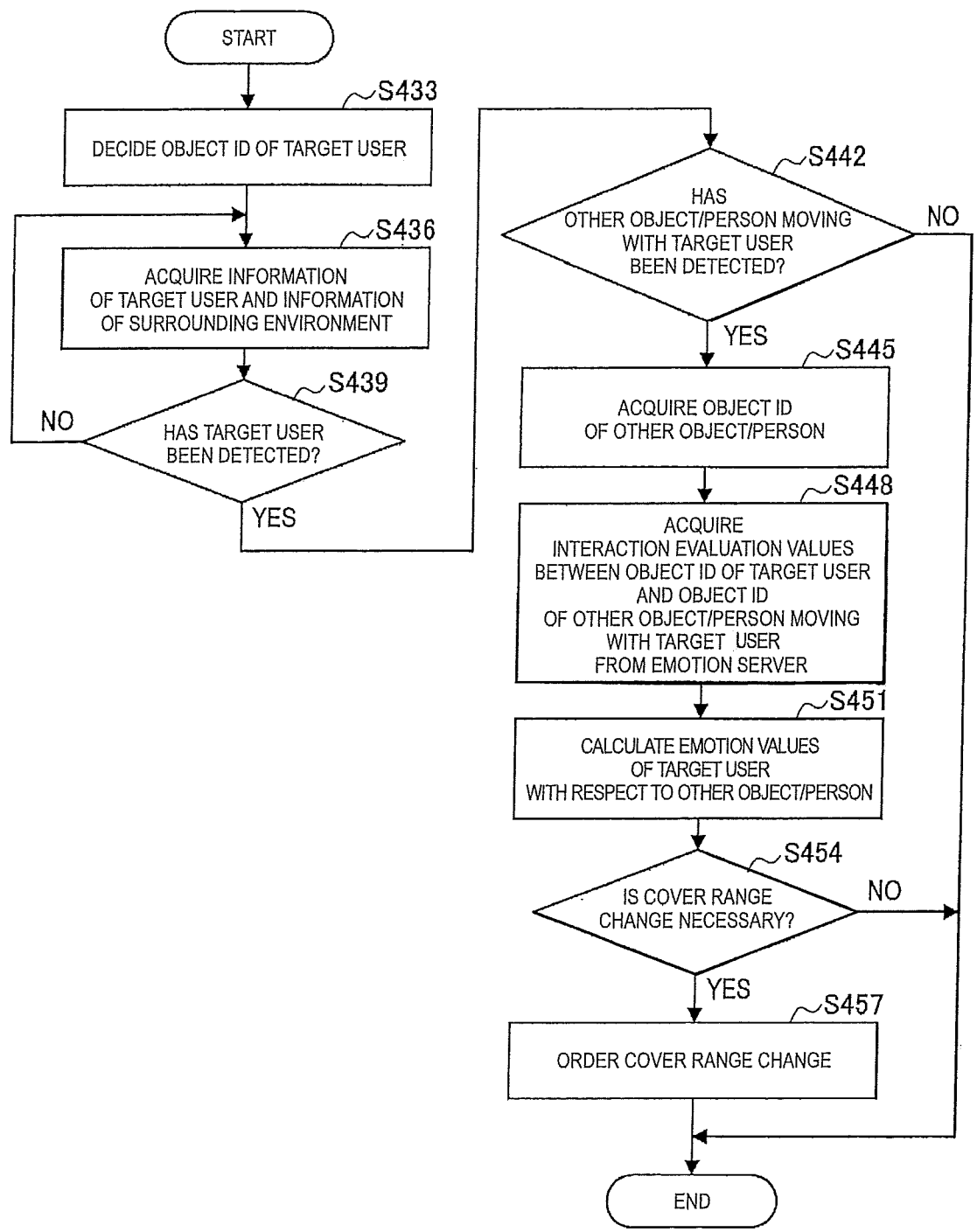
FIG. 32 is a flowchart illustrating a coverage range change process according to the third application example.

FIG. 32 is a flowchart illustrating a range change process. As illustrated in FIG. 32, first of all, the emotion value calculation unit 70f of the environment adjustment server 7 decides an object ID of a target user in step S433.

Then, information on the surroundings of the moving object 6 is sensed by the target object sensor 62 and the environment sensor 64 to acquire information on the target user and information on a surrounding environment in step S436.

Subsequently, the aforementioned step S436 is repeated until the decided target user can be detected in step S439.

When the target user is detected ("Yes" in S439), an object (such as a stroller or baggage) moving with the target user or a person moving with the target user is detected by the target object detection unit 70b in step S442.

Subsequently, the emotion value calculation unit 70f acquires an object ID of the detected object or person in step S445. This object ID (also referred to as a related object ID) may be previously registered in the user DB 72 or may be searched for in the object DB 22 by the related object search unit 20d inquiring of the emotion server 2 on the basis of a result of analysis of a captured image acquired by the camera 62a of the moving object 6.

Then, in step S448, the emotion value calculation unit 70f designates the object ID of the target user and the object ID of the object or person moving with the target user and acquires an interaction evaluation values between the target user and the object or person from the emotion server 2. For example, the interaction evaluation values are obtained by normalizing evaluation values of conversations and mail between the target user and other persons, or behaviors of the target user with respect to objects, such as storing, maintenance, wearing and enjoying to a range of −1.0 to 1.0. Here, an example of specific interaction evaluation data used for emotion value calculation will be described with reference to FIGS. 33 and 34.

FIG. 33 is an illustration of an example of interaction evaluation data according to the present application example. FIG. 33 is an example of interaction evaluation used when the moving object 6 functions as an umbrella. A case in which it is raining when a target user (object ID: 70007) tries to come back to work after lunch outside with a co-worker (object ID: 70008) is assumed as a situation. In this case, the moving object controller 70g acquires interaction evaluation values as illustrated in FIG. 33 from the emotion server 2 in order to decide whether the moving object 6 will fly while covering the co-worker in addition to the target user from the rain (how much the moving object 6 will cover, whether to equally cover the two persons or preferentially cover one side over the other side, etc. when covering the two persons).

The interaction evaluation example illustrated in FIG. 33 includes evaluation values of interactions, for example, a conversation, mail and contact in places outside work when the interactions are generated. The conversation interaction is evaluated based on, for example, likability based on a conversation speech tone of the user through voice recognition, an intimacy level based on conversation content recognized through voice recognition and syntactic analysis (whether a conversation about personal issues other than issues regarding work have been performed in this case), a degree of smiling of the user based on image analysis, the number of times the two persons' eyes make contact based on image analysis, and the like. Further, the mail interaction is evaluated using an intimacy degree of writing of mail based on syntactic analysis, a degree of respect, the number of pieces of mail and the like. In addition, the interaction of contact in places outside work is evaluated by detecting whether an interaction is an interaction at work or outside work through position information or other sensors and evaluated based on the time the persons spent together outside work, the time they were close to each other, and conversation interaction evaluation when a conversation was performed.

In the example illustrated in FIG. 33, evaluation of a co-worker (object ID: 70008) from the viewpoint of a target user (object ID: 70007) slowly increases and thus high likability is measured. Further, evaluation of the target user (object ID: 70007) from the viewpoint of the co-worker (object ID: 70008) also slowly increases but is lower than evaluation of the co-worker (object ID: 70008) from the viewpoint of the target user (object ID: 70007), and thus it can be recognized that they evaluate each other differently.

When the target user (object ID: 70007) calls the moving object 6, the moving object controller 70g controls the moving object 6 to cover the co-worker with the target user because the fact that the target user (object ID: 70007) has a good feeling toward the co-worker (object ID: 70008) is recognized from the calculated high emotion value although the control depends on evaluation weights depending on interaction types when emotion values are calculated.

FIG. 34 is an illustration of another example of interaction evaluation data according to the present application example. FIG. 34 is an example of interaction evaluation used when the moving object 6 functions as a parasol. A case in which the sunlight is strong when a target user (object ID: 8165) wears an antique wrist watch (object ID: 80075) that he or she considers a treasure and that is a keepsake from his or her father is assumed as a situation. The wrist watch is important to the target user and thus the target user wants to preferentially cover the wrist watch (such that it is not exposed to direct sunlight) over his or her body.

The interaction evaluation example illustrated in FIG. 34 includes evaluation values of interactions, for example, storing, maintenance, wearing and enjoying when the interactions are generated. With respect to the storing interaction, evaluation is decided based on the intensity of light (darkness level), humidity and temperature of a preservation place, an average value of such values, and a degree of constant preservation. In this example, a specially designed case was used and thus evaluation therefor is very high. Further, since the user preserved the wrist watch in a specially designed preservation case for a hot summer period, evaluation therefor is weighted more and thus much higher than in other preservation periods (0.5 in the first and second lines although normally 0.3). In addition, when the watch was preserved without maintenance after dinner, evaluation of preservation decreases and thus order in preservation also affects evaluation. Further, although affection for a certain article disappears as its preservation period increases and thus evaluation therefor may decrease, it is assumed that a temporal factor during preservation does not affect evaluation with respect to the wrist watch because the wrist watch is important to the user.

In addition, maintenance is evaluated based on a prescribed index of content of the maintenance, evaluation of a maintenance expert, or other objective ranking indices or the like. For example, in the case of content such as a thorough overhaul or maintenance at a shop used so far, evaluation increases.

The wearing maintenance is evaluated depending on importance, specificity and the like of an event (a destination place) for which the user goes out wearing the watch. In the case of a special event in which the user does not usually participate, for example, evaluation of wearing the watch is higher. Meanwhile, evaluation of wearing the watch when the user participates in a press event held many times every year is lower. In addition, the intensity of light, temperature, humidity, a degree of proximity to other peoples, and the like when the user is wearing the watch also affect evaluation values.

Further, the maintenance interaction is evaluated through analysis of whether each part was separated and maintained through a maintenance process using pictures.

With respect to evaluation of enjoying, an enjoying interaction is detected on the basis of the time for which the user enjoyed the watch and a face expression of the user at that time and evaluated depending on a degree of happiness, a degree of relaxation in accordance with brainwaves, and the like. Further, when an action of the user when enjoying the watch, for example, explicitly explaining that the watch is a keepsake to a friend, is detected through voice recognition, syntactic analysis and the like, evaluation becomes high.

The emotion value calculation unit 70f calculates a user's intention with respect to an article and a thought about the article as emotion values on the basis of evaluation of such interaction with the article worn on the body of the user. In addition, the moving object controller 70g determines importance of the wrist watch worn on the body of the user on the basis of emotion values and controls the moving object 6 to preferentially cover the wrist watch from the direct sunlight over the target user.

Subsequently, returning to FIG. 32, the emotion value calculation unit 70f calculates an emotion value of the target user with respect to the object/person in step S451. Although an emotion value calculation formula is not particularly limited, interactions of the target user with a specific object (related object) may be classified by interaction types and interaction evaluations for the specific object may be averaged using a weighting function depending on interaction type (refer to the following formula 1), for example.

$$\text{Ave}(\omega_{intA} \cdot (\text{Ave}(E_{intA} \cdot TW(t))), \omega_{intB} \cdot (\text{Ave}(E_{intB} \cdot TW(t))), \omega_{intC} \cdot (\text{Ave}(E_{intC} \cdot TW(t))), \dots)$$ (Formula 1)

Here,
$\omega_{intA}$: Weight of interaction A
$E_{intA}$: Evaluation value of interaction A
TW(t): Weighting function of elapsed time for evaluation value The above formula 1 corresponds to a case in which an emotion value is calculated on the basis of an interaction evaluation value between persons and uses a weighting function TW(t) of elapsed time for an evaluation value. t specifies interaction time (or evaluation time) and weighting is performed depending on a time elapsed from when an interaction is performed. This is because a recent interaction is considered as more important than a past interaction in the case of a relation between persons.

Next, the moving object controller 70g determines whether the cover range needs to be changed on the basis of the emotion value calculated by the emotion value calculation unit 70f in step S454. Specifically, the moving object controller 70g determines that the object/person is covered along with the target user or covered prior to the target user when a relative emotion value of the target user with respect to the object/person is higher than a threshold value.

When the cover range needs to be changed ("Yes" in S454), the moving object controller 70g instructs the moving object 6 to change the cover range in step S457.

According to the present application example, as described above, when the target user walks while carrying a valued antique, for example, the antique can be covered by the moving object 6 such that the antique is not exposed to the sun or rain. When the target user is with a child or a friend, they can share the cover range.

3-4. Telepresence System

Next, a case in which emotion values are used when a privacy level is set in a telepresence system 104 that controls communication of remote places will be described as a fourth application example with reference to FIGS. 35 to 41.

Figure 35:
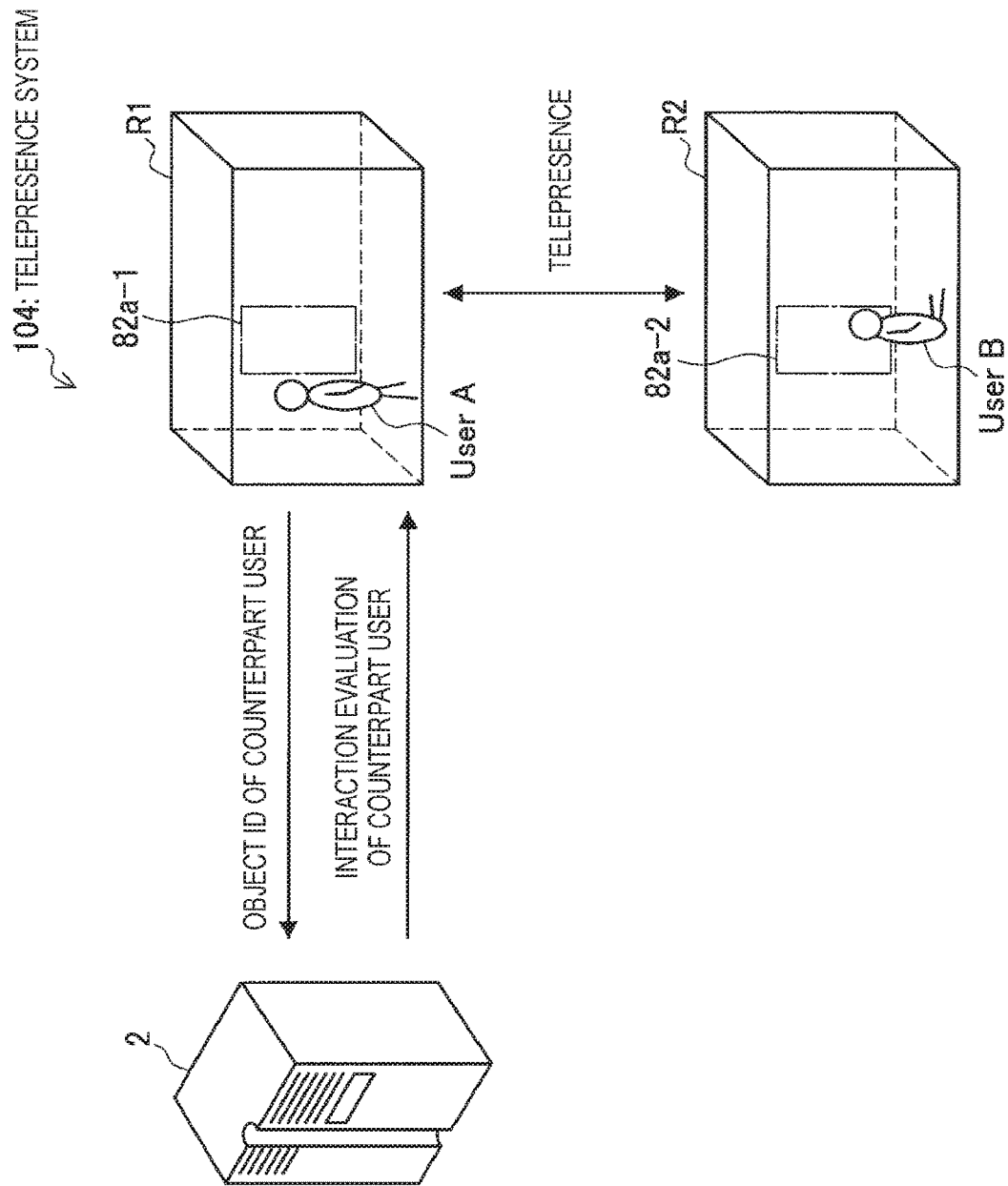
FIG. 35 is an explanatory diagram of the entire configuration of a telepresence system according to a fourth application example.

FIG. 35 is an explanatory diagram of the entire configuration of the telepresence system 104 according to the fourth application example. As illustrated in FIG. 35, the telepresence system 104 according to the present application example can connect a plurality of spaces (e.g., rooms R1 and R2) and provide a picture of one space to the other space to achieve communication between users in remote spaces. Specifically, the telepresence system 104 acquires a state of a user A in the room R1 with a high-definition camera and a microphone array installed in the room R1 and outputs the acquired state through a display part 82a-2 and a speaker installed in the room R2. Similarly, the telepresence system 104 acquires a state of a user B in the room R2 with a high-definition camera and a microphone array installed in the room R2 and outputs the acquired state through a display part 82a-1 and a speaker installed in the room R1.

In this way, states of both sides are photographed with high-definition cameras and provided to counterparts and thus even remotely located users can perform more realistic and close communication. However, a means for controlling user privacy is needed.

The telepresence system 104 according to the present application example can appropriately maintain privacy by automatically setting a privacy level in the telepresence system depending on a counterpart. Specifically, it is possible to cope with a user demand for not wanting to show part of a picture of a room without turning off and unilaterally shutting communication by masking pictures provided to a counterpart depending on a set privacy level.

In the present application example, emotion values corresponding to predetermined indices indicating personality and trust of a counterpart are used to set such privacy level.

For example, when an emotion value of the user B is high, it can be said that the user B is a highly trusted person and thus the telepresence system 104 sets a privacy level of the user A with respect to the user B to be lower and extends an area of a picture exposed to the user B. Conversely, when the emotion value of the user B is low, it can be said that the user B is not a highly trusted person and thus the telepresence system 104 sets a privacy level of the user A with respect to the user B to be higher and reduces the area of the picture open to the user B or controls communication to be turned off.

Here, control of the area of the picture (captured image of the user A) open to the counterpart depending on the set privacy level is realized by masking the picture using a predetermined means. As the picture masking means, privacy of the user A may be appropriately protected by superimposing an image on the open picture (captured image of the user A) to hide at least part of the open picture, for example. In the present application example, a shoji image, for example, is used as the superimposed image. The shoji is a device that expresses the intention of a person who operates it because the shoji is opened and closed by horizontal movement. That is, in the case of the shoji, stopping in a slightly open state is not unstable and expresses the intention (to open to a certain degree) of a person who operates the door, distinguished from doors and windows which turn on hinges. The user B can intuitively recognize a degree to which the user A is willing to share depending on a degree of the open picture hidden by the shoji image (an opening degree of a virtual shoji, that is, opening degree).

The privacy level is set as an opening degree of a virtual shoji of such a shoji image. That is, the opening degree increases when the privacy level decreases and the opening degree decreases when the privacy level increases. In addition, the opening degree of the shoji image (privacy level) may be shared by a communication source and a communication destination. Accordingly, the user A can intuitively recognize to what degree his or her privacy level is set by viewing the opening degree of the shoji image displayed on a display part 82*a*-1.

Figure 36:
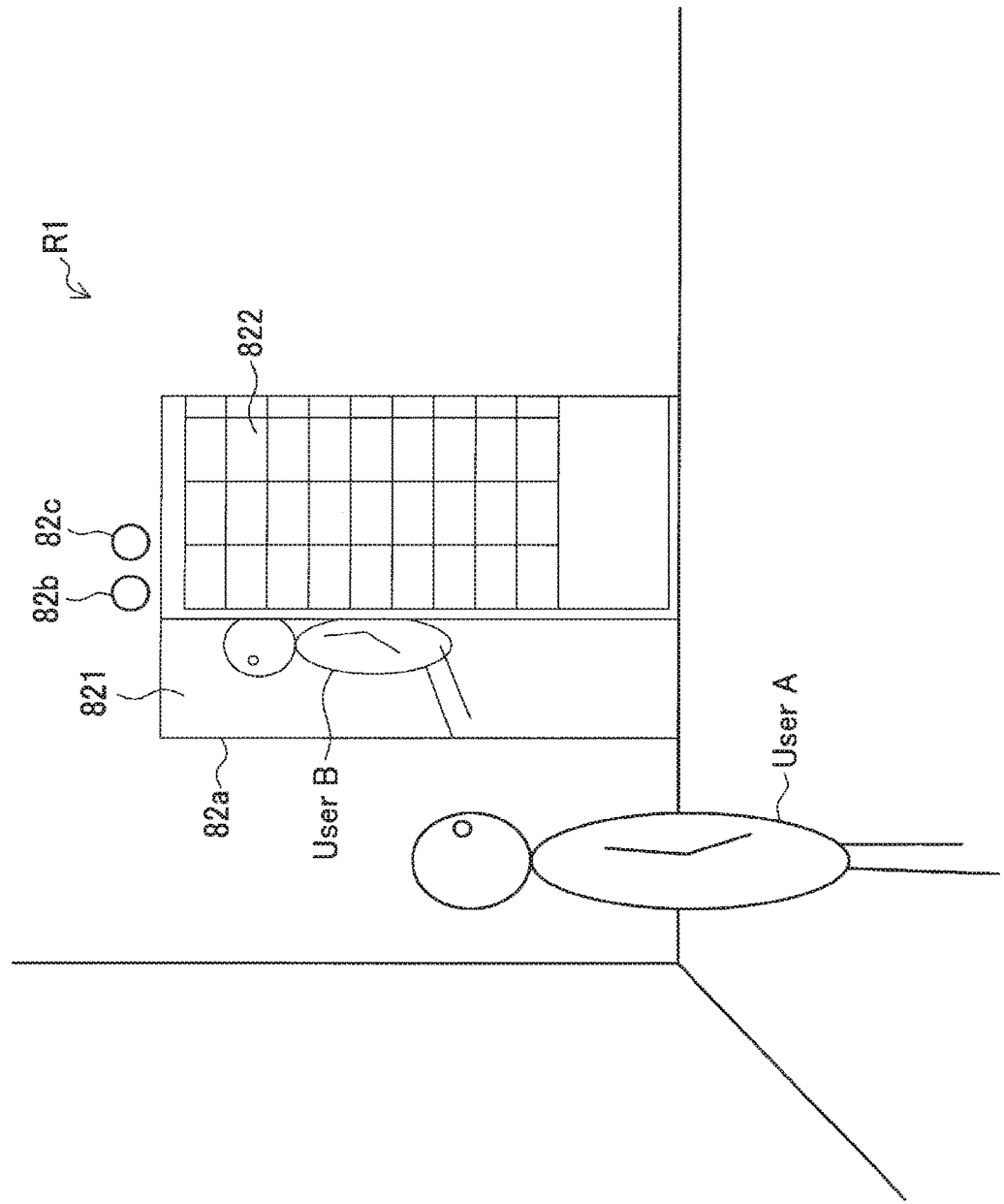
FIG. 36 is an explanatory diagram of an example of display of a shoji image according to the fourth application example.

FIG. 36 is an explanatory diagram of an example of the shoji image according to the present application example. As illustrated in FIG. 36, a display part 82*a*, a camera 82*b* and a microphone array 82*c* are provided on the surface of a wall in a room R1 where the user A is. The display part 82*a* is arranged such that the lower end thereof which is also the surface of a wall of the room R2 is close to the floor to realize presence and experience as if the shoji were actually provided on the wall of the room R1 and the remote room R2 were nearby when a captured image 821 of a room R2 and a shoji image 822 are displayed on the display part 82*a*. Further, the camera 82*b* and the microphone array 82*c* are provided above the display part 82*a* as an example.

The display part 82*a* displays the captured image 821 transmitted from the room R2 and the shoji image 822 that masks the captured image 821. The shoji image 822 displayed while superimposing on the captured image 821 and the opening degree thereof is adjusted depending on the privacy level.

The overview of the telepresence system 104 according to the present application example has been described above. Although the shoji image 822 is used as an example of a privacy control means in the example illustrated in FIG. 36, the present application example is not limited thereto and, for example, images of a curtain, a roll curtain, a misu, a blind, frosted glass, a liquid crystal shutter and the like may be used in the same manner. When the privacy control means is a curtain image, a roll curtain image, a misu image or a blind image, the privacy level is set as the opening degree thereof. When the privacy control means is a frosted glass image or a liquid crystal shutter image, the privacy level is set as the transmittance thereof.

In addition, data transmission and reception of the room R1 are controlled by a first communication control device (not shown) and data transmission and reception of the room R2 are controlled by a second communication control device (not shown) in the telepresence system 104 described above. The first and second communication control devices are connected through a network and transmit/receive data to/from each other.

3-4-1. Configuration

Figure 37:
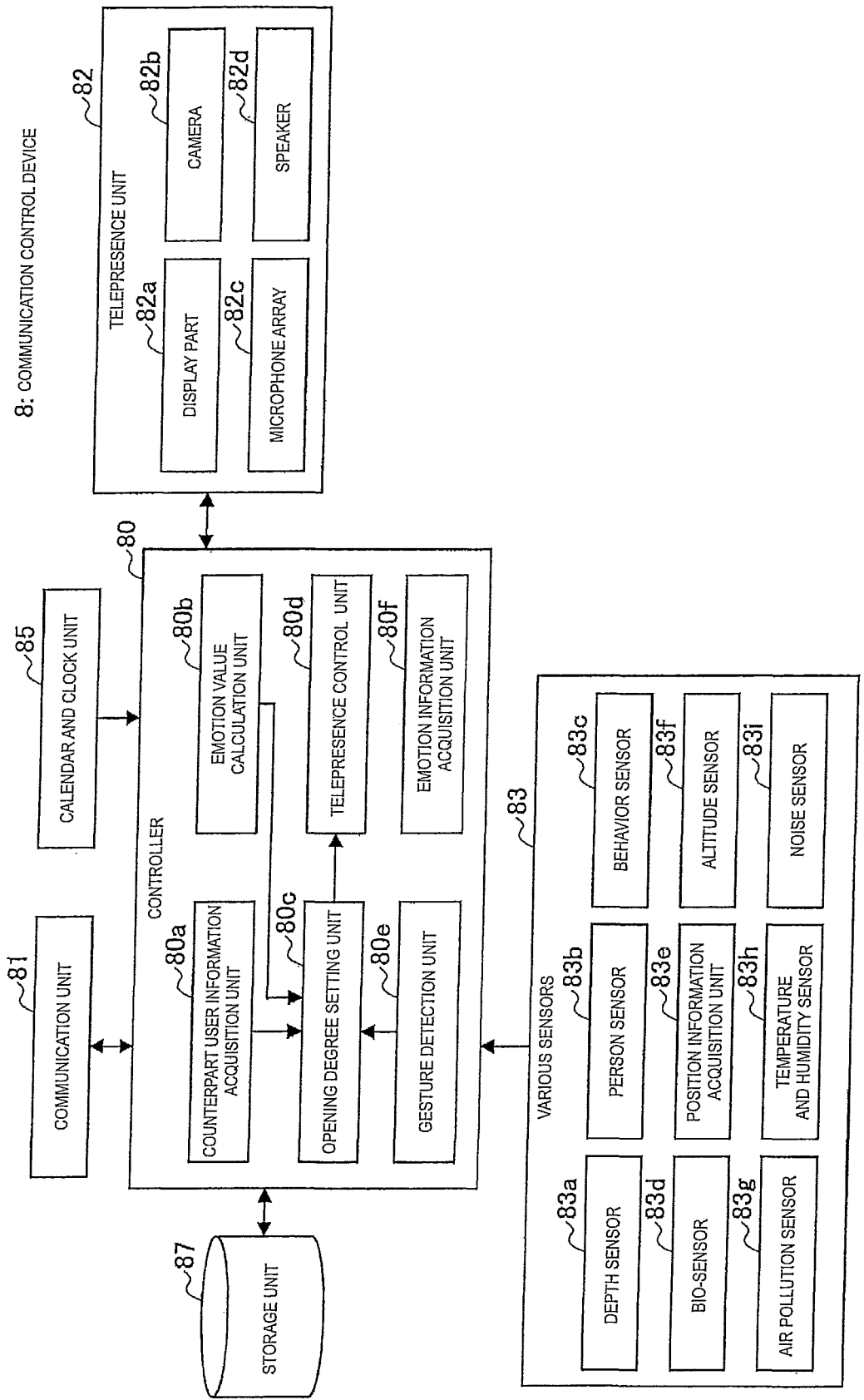
FIG. 37 is a block diagram illustrating an example of a configuration of a communication control device according to the fourth application example.

Next, a configuration of the communication control device included in the telepresence system 104 will be described with reference to FIG. 37. FIG. 37 is a block diagram illustrating an example of the configuration of the communication control device 8 according to the fourth application example. The communication control device 8 controls transmission and reception of data in spaces connected through the telepresence system 104.

As illustrated in FIG. 37, the communication control device 8 according to the present embodiment includes a controller 80, a communication unit 81, a telepresence unit 82, various sensors 83, a calendar and clock unit 85 and a storage unit 87.

[Controller 80]

The controller 80 controls each component of the communication control device 8. The controller 80 is realized by a micro-computer including a CPU, a ROM, a RAM and a nonvolatile memory. Specifically, the controller 80 functions as a counterpart user information acquisition unit 80*a*, an emotion value calculation unit 80*b*, an opening degree setting unit 80*c*, a telepresence control unit 80*d*, a gesture detection unit 80*e* and an emotion information acquisition unit 80*f*

The counterpart user information acquisition unit 80*a* acquires information about a counterpart user of a communication destination.

The emotion value calculation unit 80*b* acquires an interaction evaluation value correlated to the counterpart user from the emotion server 2 on the basis of an object ID of the counterpart user and calculates an emotion value of the counterpart user. The object ID of the counterpart user may be acquired through the counterpart user information acquisition unit 80*a* or through inquiry of a specific server or previously registered in the storage unit 87. The emotion value calculation unit 80*b* outputs the calculated emotion value of the counterpart user to the opening degree setting unit 80*c*.

The opening degree setting unit 80*c* sets a privacy level depending on the counterpart user as an opening degree. Specifically, the opening degree setting unit 80*c* sets a lower privacy level, that is, a higher opening degree of a virtual shoji when the counterpart user is more trusted depending on emotion values calculated by the emotion value calculation unit 80b.

The telepresence control unit 80d controls the telepresence unit 82 and realizes telepresence between a target space and a communication destination space. Specifically, the telepresence control unit 80d controls captured images photographed by the camera 82b of the telepresence unit 82 and sounds collected by the microphone array 82c to be transmitted from the communication unit 81 to the communication control device of the communication destination. Here, the telepresence control unit 80d controls the captured image to be masked depending on the opening degree set by the opening degree setting unit 80c. Specifically, the telepresence control unit 80d may perform processing of superimposing the shoji image on the captured image depending on the set opening degree and transmit the processed image to the communication destination or transmit the set opening degree with the captured image to the communication destination.

In addition, the telepresence control unit 80d controls the captured image 821 received from the communication control device of the communication destination to be displayed on the display part 82a and controls received sounds to be reproduced through a speaker 82d in the same manner. When the privacy level is shared with the communication destination, the telepresence control unit 80d adjusts the position of the displayed shoji image 822 is superimposed on the captured image 821 depending on the opening degree set by the opening degree setting unit 80c.

The gesture detection unit 80e detects a user's gesture on the basis of depth information acquired by a depth sensor 83a included among the various sensors 83. For example, a gesture of opening/closing the shoji is detected. Accordingly, a user can arbitrarily change the opening degree of the shoji image 822.

The emotion information acquisition unit 80f estimates an emotion of the user and acquires emotion information on the basis of bio-information detected by a bio-sensor 83d which will be described below, an expression of a face detected from a captured image acquired by a visible light camera, content of conversation detected from voice acquired through a microphone.

[Communication Unit 81]

The communication unit 81 transmits/receives data to/from an external device. For example, the communication unit 81 transmits, to the communication control device of the communication destination, captured images photographed by the camera 82b of the telepresence unit 82, sounds collected by the microphone array 82c, the opening degree set by the opening degree setting unit 80c and the like under the control of the telepresence control unit 80d. Further, the communication unit 81 receives captured images and sounds acquired in the space of the communication destination from the communication control device of the communication destination.

Further, the communication unit 81 is connected to the emotion server 2 and acquires an interaction evaluation value associated with the object ID of the target user.

[Various Sensors 83]

The various sensors 83 include a plurality of sensors for acquiring environment information of a target space, behavior information, emotion information and the like of a user in the target space. Specifically, the various sensors 83 according to the present embodiment include the depth sensor 83a, a person sensor 83b, the behavior sensor 83c, the bio-sensor 83d, the position information acquisition unit 83e, the altitude sensor 83f, the air pollution sensor 83g, the temperature and humidity sensor 83h, the noise sensor 83i and the like.

[Telepresence Unit 82]

The telepresence unit 82 includes the display part 82a, the camera 82b, the microphone array 82c and the speaker 82d. The display part 82a displays the captured image 821 of the space of the communication destination and the shoji image 822 superimposed depending on the opening degree set by the opening degree setting unit 80c, as illustrated in FIG. 36. In addition, the speaker 82d outputs sounds of the space of the communication destination. Here, the speaker 82d may output the sounds at a volume depending on the opening degree set by the opening degree setting unit 80c. The camera 82b captures an image of the target space (space of the communication source) and the captured image is transmitted to the communication control device of the communication destination. The microphone array 82c collects sounds of the target space, and sound data is transmitted to the communication control device of the communication destination.

[Calendar and Clock Unit 85]

The calendar and clock unit 85 acquires the current date and time and outputs the acquired date and time information to the controller 80.

[Storage Unit]

The storage unit 87 stores programs of various processes executed by the controller 80 and data used in various processes, for example, the attribute information, object ID and the like of the user.

The configuration of the communication control device 8 according to the present application example has been described. Meanwhile, the communication control device 8 is not limited to the aforementioned components. For example, the communication control device 8 may include a physical shoji unit and use a physical shoji arranged to cover the display part 82a as an example of a means for masking a picture depending on the privacy level.

Further, calculation of an emotion value may be performed on the side of the emotion server 2 instead of the emotion value calculation unit 80b of the communication control device 8.

In addition, although the communication control devices 3 for controlling spaces connected through telepresence are explained as systems connected through a network in the present application example, the telepresence system according to the present disclosure is not limited thereto and communication of the spaces may be controlled by a single server, for example. In this case, the server has the functional components included in the controller 80 of the communication control device 8 illustrated in FIG. 37. Further, the telepresence unit 82 and the various sensors 83 are provided in each space.

3-4-2. Operation Processes

Next, operation processes of the telepresence system 104 according to the present application example will be described in detail.

[Telepresence Control]

Figure 38:
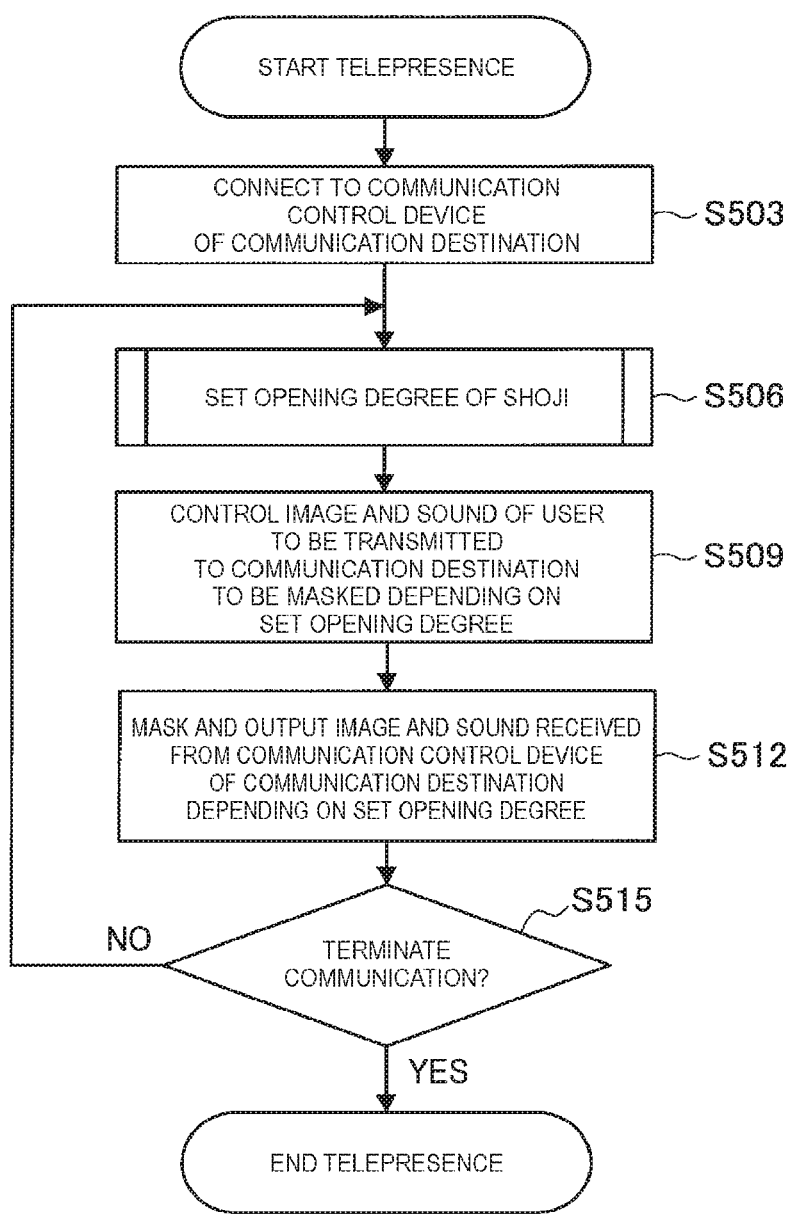
FIG. 38 is a flowchart illustrating a telepresence control process according to the fourth application example.

FIG. 38 is a flowchart illustrating a telepresence control process according to the present application example. As illustrated in FIG. 38, first of all, the telepresence control unit 80d of the communication control device 8 of a communication source performs a process of connecting to the telepresence control unit of the communication control device of a communication destination in step S503.

Then, the opening degree setting unit 80c of the communication control device 8 sets an opening degree of a shoji in step S506. Details of control of setting of the opening degree will be described below with reference to FIG. 39.

Subsequently, the telepresence control unit 80d acquires a captured image (picture) and sounds of a user to be transmitted to the communication destination through the camera 82b and the microphone array 82c and controls the acquired captured images and sounds to be masked depending on the set opening degree in step S509. Specifically, the telepresence control unit 80d may perform processing of superimposing a shoji image on the captured image depending on the set opening degree and transmit the processed image to the communication destination or transmit the set opening degree with the captured image to the communication destination, for example.

Thereafter, the telepresence control unit 80d controls an image and sounds received from the communication control unit of the communication destination to be output in a state in which the image and sounds are masked depending on the set opening degree through the display part 82a and the speaker 32d in step S512.

Then, the telepresence control unit 80d terminates communication with the communication destination when communication termination is ordered ("Yes" in S515).

[Control of Setting of Opening Degree]

Figure 39:
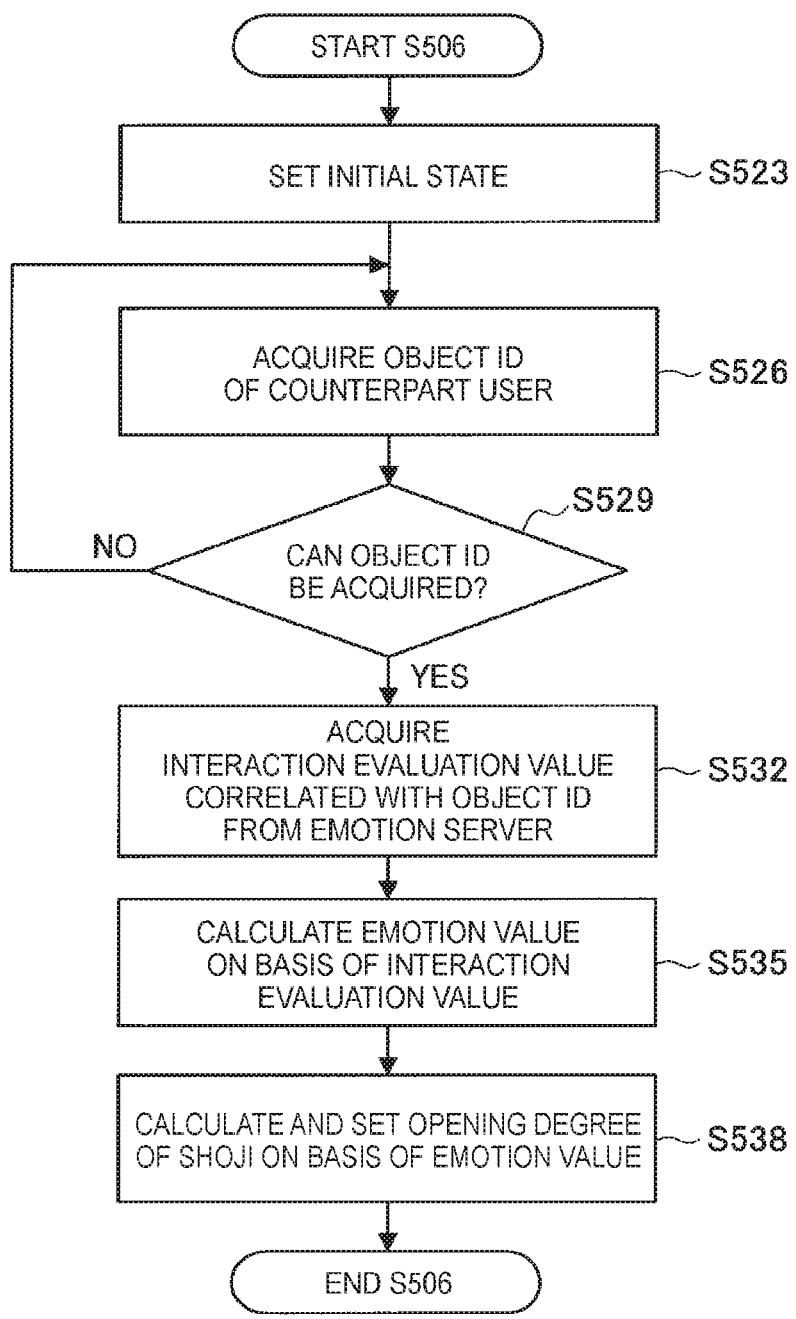
FIG. 39 is a flowchart illustrating an opening degree setting operation process according to the fourth application example.

Next, setting of the opening degree of the shoji illustrated in step S506 of FIG. 38 will be described detail. FIG. 39 is a flowchart illustrating an operation process of setting the opening degree according to the present application example. As illustrated in FIG. 39, first of all, the opening degree setting unit 80c of the communication control device 8 sets the shoji opening degree to a previously registered initial state in step S523.

Then, the emotion value calculation unit 80b acquires an object ID of a counterpart user in step S526. The object ID of the counterpart user can be acquired from the communication control device of the communication destination through the counterpart user information acquisition unit 80a.

Subsequently, the emotion value calculation unit 80b acquires an interaction evaluation value correlated to the object ID of the counterpart user from the emotion server 2 in step S532 when the object ID of the counterpart user can be acquired ("Yes" in S529).

Thereafter, the emotion value calculation unit 80b calculates an emotion value on the basis of the acquired interaction evaluation value in step S535. Here calculation of an interaction evaluation value acquired from the emotion server 2 and the emotion value are described in detail with reference to FIGS. 40 to 41.

FIG. 40 is an illustration of an example of interaction evaluation data according to the present application example. The example of data illustrated in FIG. 40 is interaction evaluation correlated with the object ID of a designated counterpart user (here, the user B), acquired by the emotion value calculation unit 80b from the emotion server 2.

Subsequently, the emotion value calculation unit 80b extracts only interaction evaluation of the counterpart user (here, the user B having object ID: 5505) for other objects (related objects) from accumulation data of past interaction evaluation illustrated in FIG. 40 and calculates emotion values. FIG. 41 is an illustration of an example of data used for emotion value calculation and extracted from the example of interaction evaluation value data shown in FIG. 40, as described above.

Meanwhile, interaction such as "watch/watched/through object/object is thrown, and make phone call," is sensed through a sensing device attached to/mounted on objects and surroundings of objects, as described above. For example, when the fact that the user B continuously watches the direction in which the TV is located is detected from a result of analysis of captured images of camera sensors attached to the TV and the room and when the fact that the TV operates and outputs pictures in a time period in which the user B is located in the room is detected from a TV operation history, interactions of "the user B is watching the TV"/"the TV is being watched by the user B" are sensed. In addition, when a motion of throwing an object by the user B or separation and movement of the object from a hand of the user B is detected from a result of analysis of captured images of camera sensors attached to the TV and the room and when hitting the case body of the TV by the object is sensed from a vibration sensor attached to the TV, interactions of "throwing the object at the TV"/"being thrown" are sensed.

Further, when a situation in which the user B holds the receiver of the telephone with a hand is detected from a result of analysis of captured images of camera sensors attached to the telephone and the room and when the fact that the user B made a phone call is detected from a telephone operation history, an interaction of making a phone call is sensed. Furthermore, when the fact that impact was applied to the telephone is detected by a vibration sensor attached to the telephone and when a sound of pulling a cord is detected by a microphone provided in the telephone, an interaction of making a phone call while pulling the cord is sensed.

Next, an example of calculation of an emotion value Q1 of the user B by the emotion value calculation unit 80b will be described. The emotion value Q1 is calculated according to the following formula 2, for example.

$$Q1 = \frac{\sum_{n}^{All\ interaction\ types} \left(a_n \times \sum Q_n\right)}{Total\ number\ of\ interactions} \quad \text{(Formula 2)}$$

Here, $a_n$: coefficient for interaction type n, $-1 \le a_n \le 1$ $\Sigma Q_n$: Sum of evaluations of interaction type n The above formula 2 represents that the emotion value Q1 is calculated by multiplying the sum of evaluation values for each interaction type by a coefficient depending on interaction type and dividing the total sum of all interaction types by the total number of interactions. Here, application of interaction evaluation shown in FIG. 41 to the above formula 1 is represented in the following formula 3.

$$Q1 = \frac{a_{watched} \times (0.1) + a_{thrown} \times (-0.8) + a_{make\ a\ phone\ call} \times (-0.5)}{3} \quad \text{(Formula 3)}$$

In this way, the emotion value calculation unit 80b can obtain the emotion value Q1 of the user B as represented by the above formula 3.

The calculated emotion value of the counterpart user represents trust of the counterpart user. Although a user is relieved even when privacy is lower when a communication counterpart is trusted in the telepresence system 104, it is possible to appropriately maintain privacy of the user by increasing the privacy when the counterpart is not trusted. Accordingly, utilization of the emotion value representing trust of the counterpart user is effective.

Referring back to FIG. 39, the opening degree setting unit 80*c* calculates and sets the shoji opening degree corresponding to the privacy level on the basis of emotion values calculated by the emotion value calculation unit 80*b* and outputs the set opening degree to the telepresence controller 80*d* in step S538.

Utilization of emotion values in the telepresence system 104 according to the present application example has been described above.

3-5. Presence Reproduction System

Next, a presence reproduction system 105 that adds new presentation based on a relationship between a photographer and a subject using emotion values when an existing moving image is played will be described as a fifth application example with reference to FIGS. 42 to 50.

Figure 42:
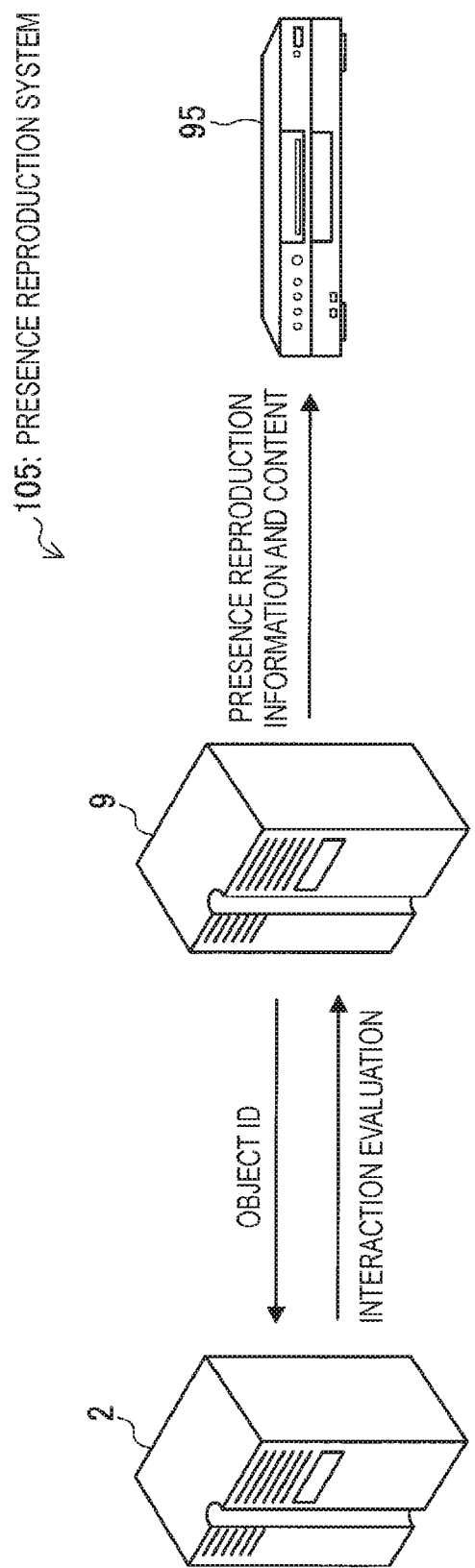
FIG. 42 is an explanatory diagram of the entire configuration of a presence reproduction system according to a fifth application example.

FIG. 42 is an explanatory diagram of the entire configuration of the presence reproduction system 105 according to the present application example. As illustrated in FIG. 42, the presence reproduction system 105 includes a reproduction information generation device 9 that generates presence reproduction information from acquired content data and a playback control device 95 that reproduces presence when the content data is generated for a viewer (user) when the content data is played back on the basis of the presence reproduction information. The reproduction information generation device 9 and the playback control device 95 may be connected through a network.

The reproduction information generation device 9 generates abstracted presence reproduction information for adding new presentation expressing a feeling toward a subject using emotion values corresponding to a predetermined index that indicates a feeling of a content data creator (e.g., photographer) toward the subject and a relationship therebetween.

The playback control device 95 performs device control and generation of image effects and sound effects such that presence (context) when content data is generated is reproduced when the content data is played back on the basis of presence reproduction information associated with the content data. Since the presence reproduction information has been abstracted, the playback control device 95 can perform a reproduction process depending on characteristics of an available device and effects that can be generated.

3-5-1. Configuration and Operation Process of Reproduction Information Generation Side Next, a configuration and an operation process of the reproduction information generation device 9 will be described with reference to FIGS. 43 to 47.

[Configuration of Reproduction Information Generation Device 9]

Figure 43:
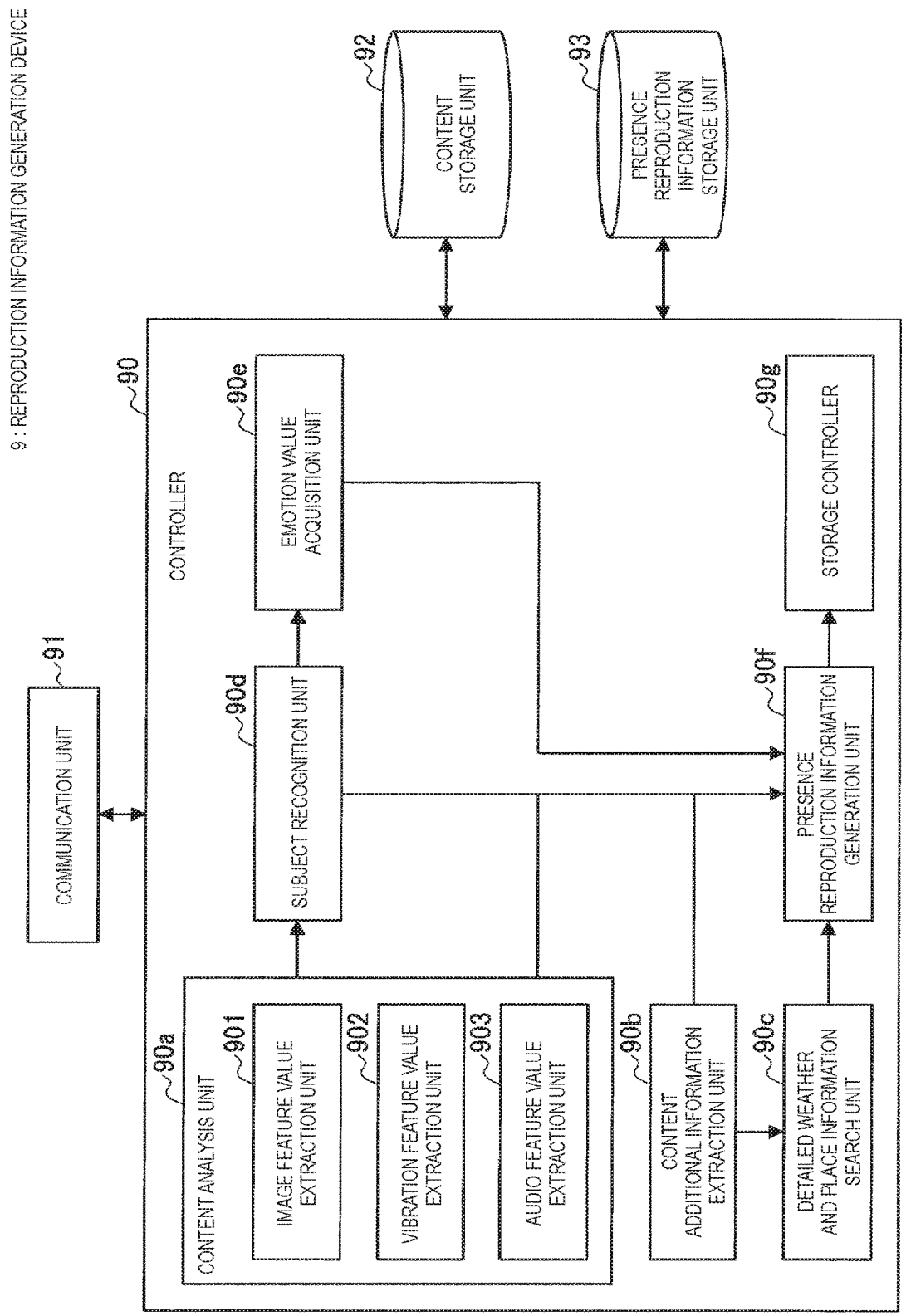
FIG. 43 is a block diagram illustrating an example of a configuration of a reproduction information generation device according to the fifth application example.

FIG. 43 is a block diagram illustrating an example of a configuration of the reproduction information generation device 9 according to the present application example. As illustrated in FIG. 43, the reproduction information generation device 9 includes a controller 90, communication unit 91, a content storage unit 92 and a presence reproduction information storage unit 93.

(Controller)

The controller 90 controls each component of the reproduction information generation device 9. The controller 90 is realized by a micro-computer including a CPU, a ROM, a RAM and a nonvolatile memory. Specifically, the controller 90 functions as a content analysis unit 90*a*, a content additional information extraction unit 90*b*, a detailed weather and place information search unit 90*c*, a subject recognition unit 90*d*, an emotion value acquisition unit 90*e*, a presence reproduction information generation unit 90*f*, and a storage controller 90*g*, as illustrated in FIG. 2.

The content analysis unit 90*a* performs image analysis and sound analysis for content data such as a moving image. Content data may be stored in the content storage unit 92 or may be received through the communication unit 91. The content analysis unit 90*a* includes an image feature value extraction unit 901, a vibration feature value extraction unit 902 and a sound feature value extraction unit 903.

The image feature value extraction unit 901 has a function of extracting an image feature value on the basis of image analysis. The vibration feature value extraction unit 902 has a function of extracting a vibration feature value on the basis of image analysis. In addition, the sound feature value extraction unit 903 has a function of extracting a sound feature value on the basis of sound analysis. Such feature values may be extracted for each frame of a moving image or extracted for a predetermined number of frames.

The content additional information extraction unit 90*b* extracts additional information from content data. The additional information is information stored when the content data is generated (during photography in the case of a moving image) and may be, for example, date information (photographing date in the case of a moving image), time information and position information (latitude, longitude and altitude) of the content data, sensor information acquired when the content data is generated and the like.

The detailed weather and place information search unit 90*c* searches for detailed weather information and detailed place information on a content generation place on the basis of the date, time and place of the content data extracted by the content additional information extraction unit 90*b*. The detailed weather information may be weather, temperature, humidity, wind direction, wind power, rainfall and the like. The detailed place information may be a station name, a facility name, a place name, a building type and the like. The detailed weather and place information search unit 90*c* accesses a search server (reverse geo-coding system, event calendar server or the like) on a network to search for such detailed weather and place information.

The subject recognition unit 90*d* recognizes a subject of the content data on the basis of the image feature value extracted by the image feature value extraction unit 901 of the content analysis unit 90*a* or the sound feature value extracted by the sound feature value extraction unit 903.

The emotion value acquisition unit 90*e* acquires emotion values of the content data creator (a photographer in the case of a moving image) and the subject. Specifically, for the emotion server 2, the emotion value acquisition unit 90*e* requests acquisition of emotion values on the basis of an object ID of the creator and an object ID of the subject. When evaluation of an interaction between the creator and the subject is transmitted from the emotion server 2, the emotion value acquisition unit 90*e* calculates a relative emotion value (an index indicating a creator's feeling toward the subject) of the creator with respect to the subject on the basis of the interaction evaluation. Emotion value calculation may be performed in the emotion server 2. In this case, the emotion value acquisition unit 90*e* acquires the calculated emotion value from the emotion server 2 through the communication unit 91.

The object ID of the creator may be embedded in the content data as metadata and extracted by the content additional information extraction unit 90b. The object ID of the subject may be embedded in the content data as metadata and extracted by the content additional information extraction unit 90b. Otherwise, the object ID of the subject may be acquired on the basis of the feature value of the subject recognized by the subject recognition unit 90d. Matching of the subject feature to the object ID may be stored in a storage unit (not shown) of the reproduction information generation device 9 or stored in an object DB 22 of the emotion server 2. The emotion value acquisition unit 90e may acquire the object ID of the subject by transmitting the subject feature value to the emotion server 2.

The presence reproduction information generation unit 90f generates information for providing presence (context) of the content data to a viewer (user) when the content data is played.

The storage controller 90g may embed the presence reproduction information generated by the presence reproduction information generation unit 90f in content data stored in the content storage unit 92 or store the presence reproduction information in the presence reproduction information storage unit 93 as a separate file in association with the content data.

The communication unit 91 transmits/receives data to/from an external device. For example, the communication unit 91 is connected to the emotion server 2 and receives interaction evaluation corresponding to an object ID. In addition, the communication unit 91 is connected to the playback control device 95 and transmits content data having presence reproduction information embedded therein or the content data and presence reproduction information associated therewith.

The content storage unit 92 stores content data. Stored content data may be data received through the communication unit 91.

The presence reproduction information storage unit 93 stores presence reproduction information generated as separate files in association with content data.

[Operation Process of Reproduction Information Generation Device 9]

Figure 44:
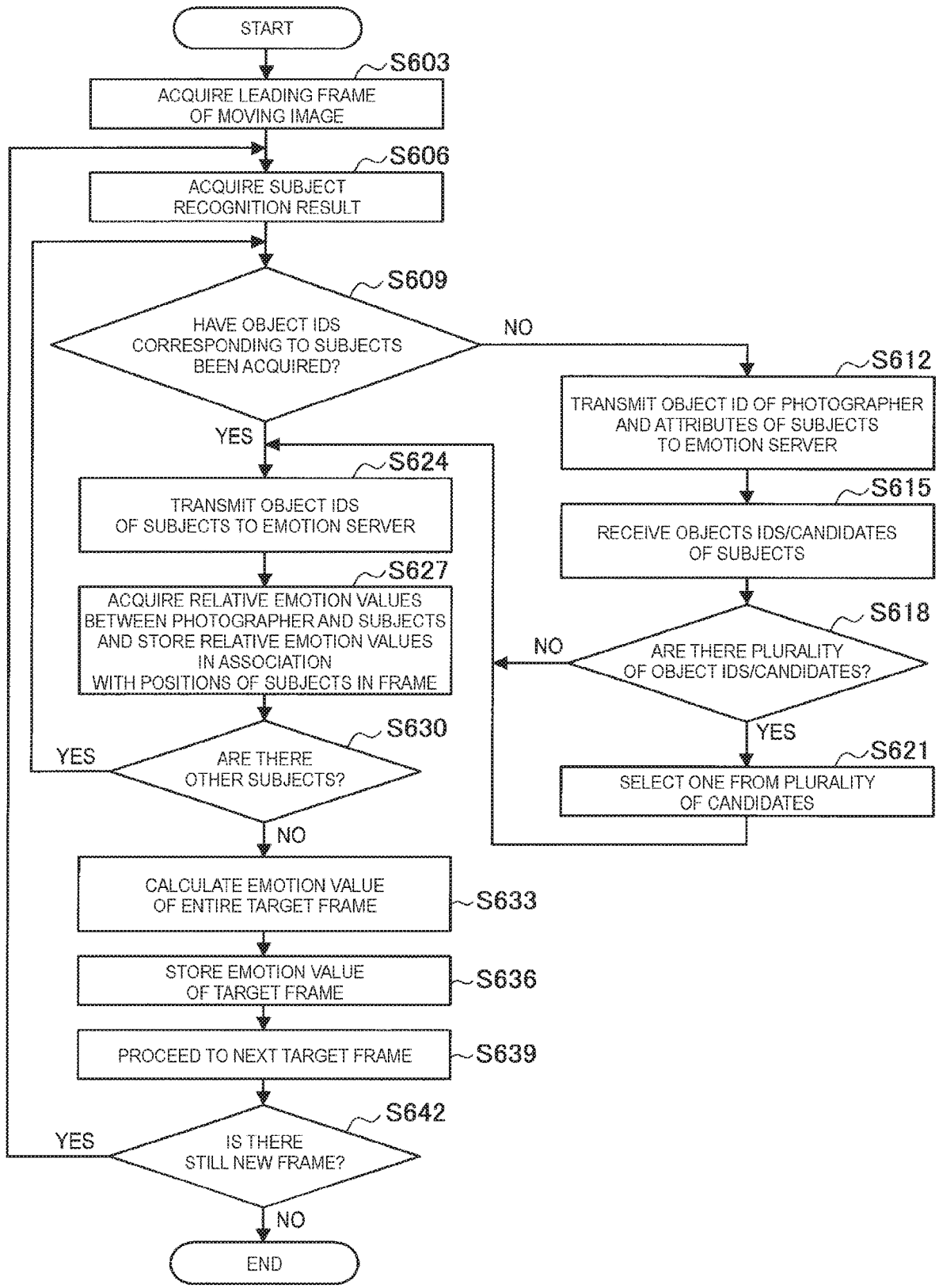
FIG. 44 is a flowchart illustrating a presence information generation process according to the fifth application example.

Next, a reproduction information generation process by the reproduction information generation device 9 will be described with reference to FIG. 44. FIG. 44 is a flowchart illustrating a reproduction information generation process according to the present application example.

First of all, as shown in FIG. 44, the emotion value acquisition unit 90e acquires a leading frame of the moving image in step S603.

Then, the emotion value acquisition unit 90e acquires a subject recognition result of a target frame from the subject recognition unit 90d in step S606. The subject recognition unit 90d recognizes subjects in the frame on the basis of image feature value extracted through image analysis of the target frame. For example, subjects S1, S2 and S3 are recognized through image analysis of a frame 97 of a moving image generated through photography by a photographer P, as illustrated in FIG. 45.

Then, the emotion value acquisition unit 90e acquires an object ID corresponding to the subject of the target frame recognized by the subject recognition unit 90d in step S609.

When the object ID of the subject cannot be acquired (No in S609), the emotion value acquisition unit 90e transmits the object ID of the photographer and attributes of the subject to the emotion server 2 in step S612.

Subsequently, the emotion value acquisition unit 90e receives candidates of the object IDs of the subjects from the emotion server 2 in step S615. The emotion server 2 searches for objects having histories of interaction with the photographer for related objects identical or similar to the attributes of the subjects, for example, through the related object search unit 20d and transmits object IDs of the related objects to the reproduction information generation device 9 as candidates.

Then, if there are a plurality of object ID candidates transmitted from the emotion server 2 ("Yes" in S618), the emotion value acquisition unit 90e selects one object ID corresponding to the subjects from the plurality of candidates in step S621.

Subsequently, the emotion value acquisition unit 90e transmits the object IDs of the subjects to the emotion server 2 in step S624.

Thereafter, the emotion value acquisition unit 90e acquires relative emotion values between the photographer and the subjects and stores the acquired relative emotion values in association with the positions of the subjects in the frame in step S627. The relative emotion values between the photographer and the subjects may be calculated in the emotion server 2 or calculated by the emotion value acquisition unit 90e on the basis of evaluation of interactions between the photographer and the subjects received from the emotion server 2.

Subsequently, if there are other subjects in the target frame ("Yes" in S630), the process is repeated from step S609. Accordingly, relative emotion values indicating emotions or feelings of the photographer P (father, object ID: 312039) for the subject S1 (wife, object ID: 105384093), the subject S2 (child, object ID: 15122014) and the subject S3 (toy, object ID: 101960), illustrated in FIG. 14, are acquired, for example.

Here, calculation of the relative emotion values by the emotion value acquisition unit 90e will be described in detail with reference to FIGS. 46 and 47. FIG. 46 is an illustration of an example of data of interaction evaluation according to the present embodiment. Interaction evaluation shown in FIG. 46 is transmitted from the emotion server 2 on the basis of the object ID of the photographer and the object ID of each subject designated by the emotion value acquisition unit 90e.

For example, in the first line of the example of data shown in FIG. 46, evaluation of 0.7 is given to an interaction of "giving an accessory," performed by the photographer P (object ID: 312039) for the wife corresponding to the subject S1 (object ID: 105384093) on 24, Dec. 2013. In the second line, evaluation of 1.00 is given to an interaction of "being given the accessory" of the wife corresponding to the subject S1 (object ID: 105384093), performed by the photographer P (object ID: 312039) on 24, Dec. 2013. In this way, an interaction performed by an object on one side for an object on the other side may be detected by the objects of both sides.

Detected interaction types may be storing, physical affection, conversation, playing, etc., as illustrated in FIG. 46, in addition to the aforementioned giving.

A giving interaction is detected from, for example, a history of use of a credit card and a purchase history of Internet shopping, content written in mail and on social media, recognition of captured images obtained by cameras provided in a room or on an object, recognition of sounds obtained by microphones provided in a room or on an object, etc. Evaluation of the giving interaction is performed by the evaluation unit 20b of the emotion server 2. For example, the evaluation unit 20b extracts a spending degree on the basis of a usual purchase history of a person who gives a present and the ratio of an amount of money for the present to his or her income, a positive degree for the present based on recognition of conversation with a sales person, a sincerity degree based on a web page view time during Internet shopping and a time from page change to product selection, etc., assigns predetermined weights to such values and normalizes the values to a range of −1.0 to 1.0 to produce evaluation values.

In addition, a storing interaction is detected from an object position, movement history, recognition of captured images obtained through cameras provided in a room or on an object, and the like, for example. The evaluation unit 20b assigns weights to a storage place, humidity of the storage place, the amount of dust in the atmosphere and the like and normalizes the values to a range of −1.0 to 1.0 to produce evaluation values.

Furthermore, a physical affection interaction is detected on the basis of determination of touch through human body communication via wearable devices of both sides, image recognition through cameras, motion patterns of acceleration sensors of both sides, and the like, for example. The evaluation unit 20b assigns weights to various indices acquired from a degree of smiling obtained through smiling-face recognition, the sound of laughter obtained through voice recognition, and content of conversation and normalizes the result values to a range of −1.0 to 1.0 to produce evaluation values.

In addition, a conversation interaction is detected on the basis of voice recognition, voice tone, analysis of content written in mail and on social media (syntactic analysis and semantic analysis) and the like, for example. The evaluation unit 20b determines a degree of positive/negative mode of content of the conversation using words, context, voice tone, etc. included in the conversation and finally normalizes the result values to a range of −1.0 to 1.0 to produce evaluation values because a total sum of evaluations change according to the number of words and the content of the conversation.

Furthermore, a playing interaction is detected on the basis of checking of connection between a near field communication chip attached to a toy and a near field communication chip attached to a child, motions of acceleration sensors of both sides and the like, for example. When "playing" cannot be recognized through connection checking and motions, if the toy is the object of the other side, the "playing" interaction is recognized because toys are for playing. The evaluation unit 20b obtains an evaluation value of the child for the toy on the basis of a result of measurement of interaction time of both sides and smiling-face detection and laughter detection through captured images and voice. In addition, an evaluation value from the viewpoint of the toy may be obtained by measuring how roughly the toy is handled and whether handling is beyond a prescribed mode of use of the toy. Although the evaluation value from the viewpoint of the toy decreases when an infant handles the toy roughly, it is possible to adjust the evaluation value at a step of finally obtaining the emotion value by decreasing a weight factor of the evaluation value from the viewpoint of the toy or correcting the evaluation value when the counterpart is an infant.

Subsequently, when relative emotion values indicating emotions and feelings of the photographer for the respective subjects are calculated through the emotion value acquisition unit 90e, the emotion value acquisition unit 90e extracts only interaction evaluation between the photographer and each subject from the interaction evaluation data shown in FIG. 46. FIG. 47 is an illustration of an example of data used for emotion value calculation extracted from the example of the interaction evaluation data shown in FIG. 46. As shown in FIG. 47, interaction evaluation between the photographer (object ID: 312039) and the subjects S1 to S3 (object IDs: 105384093, 15122014 and 101960) is extracted.

The emotion value acquisition unit 90e obtains the relative emotion values between the photographer and the subjects using total sums of evaluations of the target subjects, total sums obtained by multiplying interaction types of the target subjects by weight factors and then adding the evaluations of the target subjects thereto, or average values obtained by dividing the total sums by the numbers of interactions, for example.

Referring back to FIG. 44, the emotion value acquisition unit 90e calculates an emotion value of the entire frame in step S633. Specifically, the emotion value is acquired using a total sum of relative emotion values of subjects in the frame or an average obtained by dividing the total sum by the number of subjects, for example.

Then, the emotion value acquisition unit 90e stores the emotion values (the relative emotion values of the subjects and the emotion value of the entire frame) of the target frame in step S636.

Thereafter, the processing target frame proceeds to the next frame in step S639, and when there is still a new frame ("Yes" in S642), the process is repeated from step S606.

Emotion value calculation according to the present embodiment as presence reproduction information has been described. Although a relative emotion value between each subject and the photographer is calculated in the embodiment described above, the present disclosure is not limited thereto and an absolute emotion value of each subject may be calculated or a relative emotion value between subjects may be calculated as necessary. An absolute value of each subject is obtained using a total sum of all interaction evaluations of the subject, a total sum obtained by multiplying interaction types by weight factors and then adding all evaluations of the target subject thereto, or an average value obtained by dividing the total sum by the number of interactions. Furthermore, a relative emotion value between subjects is obtained using a total sum of interaction evaluations between the subjects, a total sum obtained by multiplying interaction types by weight factors and then adding interaction evaluations between the subjects thereto, or an average value obtained by dividing the total sum by the number of interactions.

3-5-2. Configuration and Operation Process of Playback Side

Next, a configuration and an operation process of the playback control device 95 will be described with reference to FIGS. 48 to 50. A playback side may freely decide a reproduction method depending on characteristics of devices included in the playback side on the basis of the abstracted presence reproduction information generated by the reproduction information generation device 9.

[Configuration of Reproduction Control Device 95]

Figure 48:
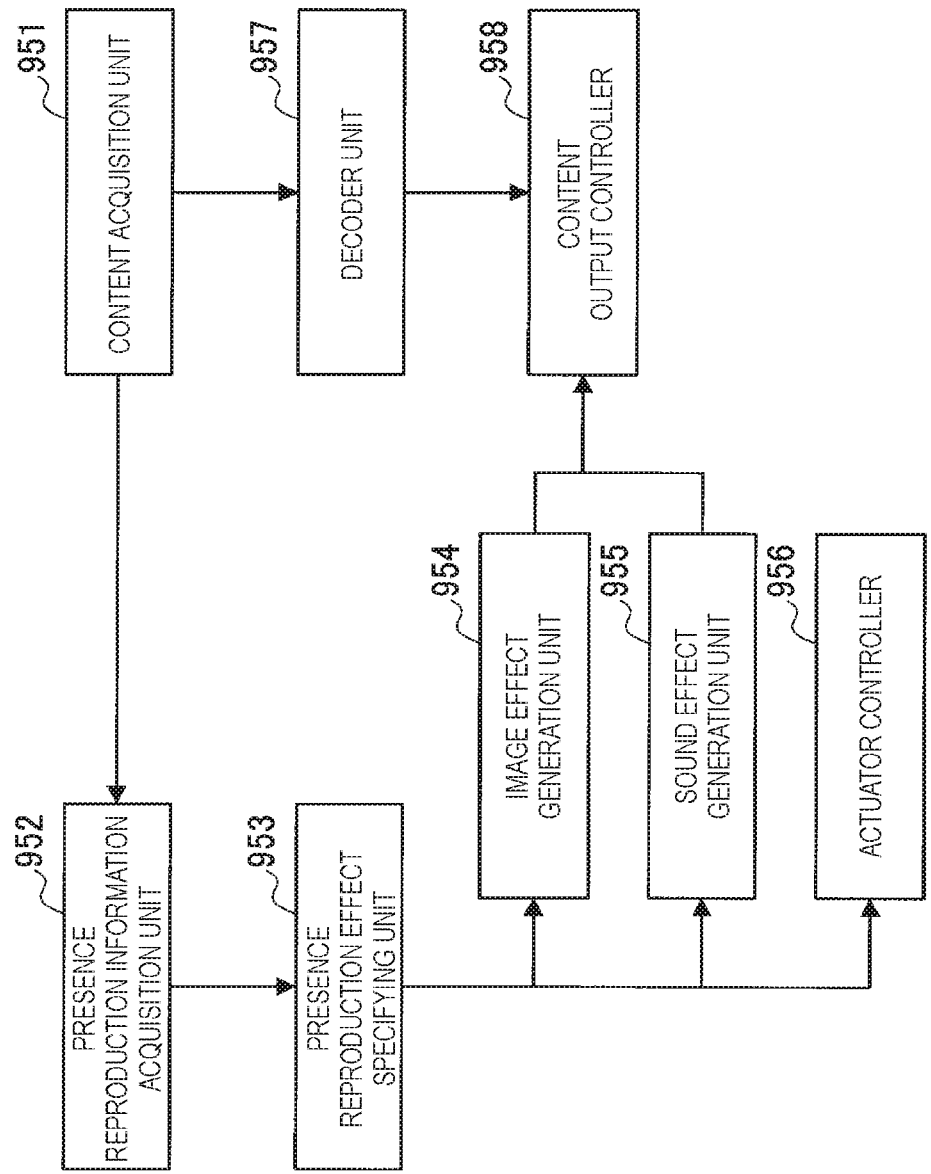
FIG. 48 is a block diagram illustrating an example of a configuration of a reproduction control device according to the fifth application example.

FIG. 48 is a block diagram illustrating an example of a configuration of the playback control device 95 according to the present application example. As illustrated in FIG. 48, the playback control device 95 includes a content acquisition unit 951, a presence reproduction information acquisition unit 952, a presence reproduction effect specifying unit 953, an image effect generation unit 954, a sound effect generation unit 955, a device controller 956, a decoder unit 957 and a content output controller 958.

The content acquisition unit 951 acquires content data to be played. For example, the content acquisition unit 951 acquires content data from a cloud (e.g., the content storage unit 92 of the reproduction information generation device 9).

The presence reproduction information acquisition unit 952 acquires presence reproduction information corresponding to the content data to be played. For example, it is assumed that the presence reproduction information has been embedded in the content data or has been stored on a cloud as a file separately from the content data.

The presence reproduction effect specifying unit 953 specifies devices with which presence (context indicated by the presence reproduction information) will be reproduced depending on the presence reproduction information acquired by the presence reproduction information acquisition unit 952 and characteristics of devices provided at the playback side. For example, a television device that outputs images and sounds, an air-conditioner device, an aroma spraying device, a vibrating device, a lighting device, a blowing device and the like may be considered as devices included in the playback side.

The image effect generation unit 954 generates image effects for reproducing presence in accordance with an instruction of the presence reproduction effect specifying unit 953.

The sound effect generation unit 955 generates sound effects for reproducing presence in accordance with an instruction of the presence reproduction effect specifying unit 953.

The device controller 956 controls the various devices to provide presence to a user (viewer) in accordance with an instruction of the presence reproduction effect specifying unit 353.

The decoder unit 957 decodes content data acquired by the content acquisition unit 951 and outputs the decoded content data to the content output controller 958.

The content output controller 958 outputs the content data decoded by the decoder unit 957. Specifically, when the content data is a moving image, for example, the content output controller 958 controls the television device to play the moving image. Furthermore, the content output controller 958 plays the moving image with image effects generated by the image effect generation unit 954 or outputs sound effects generated by the sound effect generation unit 955.

[Operation Process of Playback Control Device 95]

Next, a playback process by the playback control device 95 will be described with reference to FIG. 49. Presence reproduction information includes relative emotion values indicating an emotion and a feeling of a photographer toward subjects, as described above. It is possible to provide a new experience of viewing subjects with the feeling of the photographer with respect to the subjects by performing presentation depending on the relative emotion values at the playback side.

Figure 49:
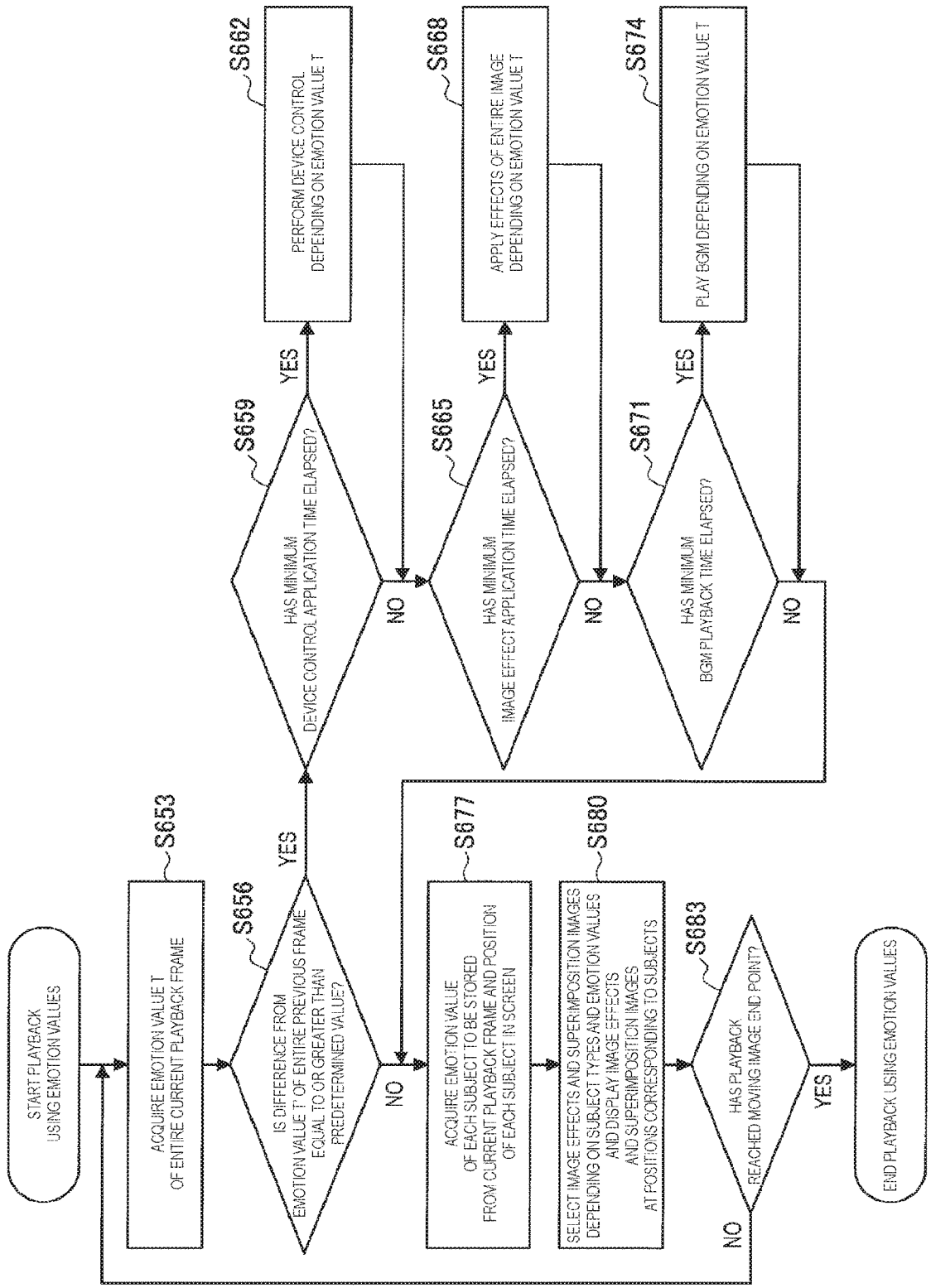
FIG. 49 is a flowchart illustrating a playback process using emotion values according to the fifth application example.

FIG. 49 is a flowchart illustrating a playback process using emotion values according to the present embodiment. As illustrated in FIG. 49, first of all, the presence reproduction effect specifying unit 953 acquires an emotion value T of the entire current playback frame in step S653. The emotion value T of the entire playback frame may be obtained from presence reproduction information acquired by the presence reproduction information acquisition unit 952. The emotion value T of the entire playback frame corresponds to an emotion value of the entire target frame described in step S633 of FIG. 44.

Then, the presence reproduction effect specifying unit 953 determines whether a difference between an emotion value T' of the entire previous frame and the emotion value T of the entire current frame is equal to or greater than a predetermined value in step S656.

Subsequently, when the emotion value difference is equal to or greater than the predetermined value ("Yes" in S656), the presence reproduction effect specifying unit 953 determines whether a minimum device control application time has elapsed in step S659 This is for the purpose of avoiding switching of device control within a short time.

If the minimum device control application time has elapsed ("Yes" in S659), the presence reproduction effect specifying unit 953 instructs the device controller 956 to perform device control depending on the emotion value T in step S662. For example, physical presentation depending on the emotion value, such as generation of vibration, discharge of smoke and change of illumination, is performed.

Then, the presence reproduction effect specifying unit 953 determines whether a minimum image effect application time has elapsed in step S665. This is for the purpose of avoiding switching of image effects within a short time.

If the minimum image effect application time has elapsed ("Yes" in S665), the presence reproduction effect specifying unit 953 instructs the image effect generation unit 954 to apply effects of the entire image depending on the emotion value T in step S668. Effects of the entire image are presentation of brightening the entire tone of the image or slightly reddening the hue of the image, for example.

Then, the presence reproduction effect specifying unit 953 determines whether a minimum background music (BGM) application time has elapsed in step S671. This is for the purpose of avoiding switching of BGM within a short time.

If the minimum BGM application time has elapsed ("Yes" in S671), the presence reproduction effect specifying unit 953 instructs the sound effect generation unit 955 to play BGM depending on the emotion value T in step S674. For example, merry and bright BGM is played when the emotion value T is high, whereas gloomy BGM is played when the emotion value T is low.

Then, the presence reproduction effect specifying unit 953 acquires an emotion value of each subject recognized from the current playback frame and the position of each subject in the screen (i.e., position in the frame) in step S677. The emotion value of each subject is a relative emotion value of the photographer with respect to each subject, which is included in the presence reproduction information.

Subsequently, the presence reproduction effect specifying unit 953 instructs the image effect generation unit 954 to select image effects and superimposed images depending on subject types and emotion values and instructs the content output controller 958 to display the selected image effects at positions corresponding to subjects in step S680. Here, an example of image effects arranged to correspond to subjects depending on emotion values will be described with reference to FIG. 50.

Depending on relative emotion values of subjects S1, S2 and S3 recognized from a frame 98 shown at the left side of FIG. 50, the presence reproduction effect specifying unit 953 arranges image effects E1 to E3 respectively corresponding to the subjects S1 to S3 as in a frame 99 shown at the right side of FIG. 50. If the subject S1 is a mother, the subject S2 is a child and the subject S3 is a toy, for example, image effects for family and children are selected. In addition, if relative emotion values are high, pleasant and bright image effects are selected. Furthermore, arrangement corresponding to a subject may be arrangement of an image effect around the subject such that the image effect and the subject do not overlap. Accordingly, a feeling of the photographer when performing photographing, an atmosphere during photography and the like are represented through newly added presentation, thereby reproducing presence during photography.

Although presentation (device control, image effects and BGM) depending on emotion values is described in S662, S668, S674 and S680, the present embodiment is not limited thereto, and when an abstract subjective expression of the photographer estimated from the relative emotion values of the subjects is described in the presence reproduction information, presentation depending on the subjective expression may be performed.

In addition, when moving image playback does not reach a moving image end point ("No" in step S683), the process of S653 through S680 is repeated.

Utilization of emotion values in the presence reproduction system 105 according to the present application example has been described above.

4. CONCLUSION

As described above, in the information processing system according to embodiments of the present disclosure, it is possible to express an emotional value of an object as a numeral value on the basis of an interaction between objects. Specifically, it is possible to calculate an emotion value associated with an article, an emotion value correlated to a user and a relative emotion value between the article and the user by measuring interactions between the article and the user and storing a history in a server as specific multi-dimensional vector values associated with the article and the user.

Such emotion values can be used in the personal credit information provision system 101, the auction system 102, the environment adjustment system 103, the telepresence system 104 and the presence reproduction system 105.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, interaction information may be accumulated and evaluation and emotion values thereof may be calculated whenever the interaction information is accumulated or evaluation and emotion values of accumulated interaction information may be calculated as necessary.

Further, a computer program for exerting a function of each apparatus can be prepared in hardware such as the CPU, the ROM, and the RAM included in the above apparatus. Further, a computer readable storage medium in which the computer program is stored is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system including:
a detection unit that detects information related to an interaction between a first object and a second object; and
a generation unit that is capable of generating an emotion value of the first object and an emotion value of the second object on the basis of the information related to the interaction.

(2)
The information processing system according to (1), wherein the generation unit is capable of generating an absolute numerical emotion value based on information related to interactions between one object and a plurality of other objects and a relative value based on information related to an interaction between the one object and a specific object.

(3)
The information processing system according to (1) or (2), further including:
a storage controller that associates the information related to the interaction with each of the first object and the second object and stores the information in a storage unit,
wherein the generation unit generates an emotion value of a specific object on the basis of a history of information related to the interaction and associated with the specific object stored in the storage unit.

(4)
The information processing system according to any one of (1) to (3), wherein the generation unit is capable of generating the emotion value of the first object and the emotion value of the second object on the basis of the information related to the interaction even when the first object is a person and the second object is an article.

(5)
The information processing system according to any one of (1) to (4), wherein, when the interaction between the first object and the second object has been generated, the detection unit detects information related to a bidirectional interaction.

(6)
The information processing system according to any one of (1) to (5), including:
a credit information provision server that regards the emotion values as personal credibility and provides personal credit information.

(7)
The information processing system according to any one of (1) to (6), including:
a commercial transaction server that regards the emotion values as trust of an exhibitor or a value of an exhibited item and provides an emotion value of the exhibitor or the exhibited item.

(8)
The information processing system according to any one of (1) to (7), including:
an environment adjustment server that controls environment adjustment depending on an emotion value of a target user or an object involved with the target user when a surrounding environment of the target user is adjusted by a moving object moving while tracking the target user.

(9)
The information processing system according to any one of (1) to (8), including:
a communication control device that automatically sets a privacy level depending on an emotion value of a user of a communication destination device and controls a picture of a user of a communication source device to be masked depending on the automatically set privacy level when the picture of the user of the communication source device is transmitted to the communication destination device.

(10)

The information processing system according to any one of (1) to (9), including:

a reproduction information generation device that generates abstracted presence reproduction information on the basis of an emotion value of a subject extracted from content data and controls the generated presence reproduction information to be associated with the content data and stored.

(11)

A control method including:

detecting information related to an interaction between a first object and a second object; and being capable of generating an emotion value of the first object and an emotion value of the second object on the basis of the information related to the interaction.

(12)

A storage medium having a program stored therein, the program causing a computer to function as:

a detection unit that detects information related to an interaction between a first object and a second object; and a generation unit that is capable of generating an emotion value of the first object and an emotion value of the second object on the basis of the information related to the interaction.

REFERENCE SIGNS LIST 100 information processing system
101 personal credit information provision system
102 auction system
103 environment adjustment system
104 telepresence system
105 presence reproduction system
1 sensing device
11 sensor
12 interaction extraction unit
13 communication unit
2 emotion server
20 controller
20a interaction storage controller
20b evaluation unit
20c object management unit
20d related object search unit
20e emotion value calculation unit
21 communication unit
22 object DB
24 emotion information DB
3 network
4 personal credit information provision server
5 auction server
6 moving object
7 environment adjustment server
8 communication control device
9 reproduction information generation device
95 playback control device

The invention claimed is:

1. An information processing system comprising:
a plurality of sensors, each sensor associated with a corresponding object of a plurality of objects, each sensor configured to detect an interaction between the corresponding object and a person and transmit interaction information to a server over a network, the interaction information describing actions taken by the person against the corresponding object, the actions including at least one of driving, cleaning, and repairing;
the server configured to receive the interaction information from the plurality of sensors, generate an emotional value for each of the plurality of objects based on the interaction information, and determine a value of each of the plurality of objects based on the generated emotional value;
a credit information provision server configured to acquire at least one emotional value of the generated emotional values from the server based on an identification of the person and search conditions, the search conditions including at least one maker name of an object of the plurality of objects, and provide personal credit information of the person based on the acquired at least one emotional value; and
circuitry configured to generate an absolute numerical emotional value based on information related to interactions between one of the plurality of objects and other ones of the plurality of objects and a relative value based on information related to an interaction between the one of the plurality of objects and a specific object.

2. The information processing system according to claim 1, further comprising:
a storage controller configured to associate information related to an interaction with each of a first object and a second object and store the information in a storage,
wherein an emotional value of a specific object is generated based on a history of the information related to the interaction and associated with the specific object stored in the storage.

3. The information processing system according to claim 1, further comprising:
circuitry configured to generate a first emotional value of a first object and a second emotional value of a second object based on information related to an interaction between the first object and the second object when the first object is a person and the second object is an article.

4. The information processing system according to claim 1, wherein, when an interaction between a first object and a second object has been generated, information related to a bidirectional interaction is detected.

5. The information processing system according to claim 1, comprising:
a commercial transaction server configured to regard the emotional value as a trust of an exhibitor or a value of an exhibited item and provide another emotional value of the exhibitor or the exhibited item.

6. The information processing system according to claim 1, comprising:
an environment adjustment server configured to control an environment adjustment depending on an emotional value of a target user or an object involved with the target user when a surrounding environment of the target user is adjusted by a moving object moving while tracking the target user.

7. The information processing system according to claim 1, comprising:
a communication control device configured to automatically set a privacy level depending on an emotional value of a user of a communication destination device and control a picture of another user of a communication source device to be masked depending on an automatically set privacy level when the picture of the other user of the communication source device is transmitted to the communication destination device.

8. The information processing system according to claim 1, comprising:
a reproduction information generation device configured to generate abstracted presence reproduction information based on an emotional value of a subject extracted from content data and control the generated abstracted presence reproduction information to be associated with the content data and to be stored.

9. A control method comprising:
detecting, by each of a plurality of sensors, each sensor associated with a corresponding object of a plurality of objects, an interaction between the corresponding object and a person;
transmitting interaction information to a server over a network, the interaction actions including at least one of driving, cleaning, and repairing;
receiving, by the server, the interaction information from the plurality of sensors;
generating an emotional value for each of the plurality of objects based on the interaction information;
determining a value of each of the plurality of objects based on the generated emotional value;
acquiring at least one emotional value of the generated emotional values from the server based on an identification of the person and search conditions, the search conditions including at least one maker name of an object of the plurality of objects; and
providing personal credit information of the person based on the acquired at least one emotional value; and
circuitry configured to generate an absolute numerical emotional value based on information related to interactions between one of the plurality of objects and other ones of the plurality of objects and a relative value based on information related to an interaction between the one of the plurality of objects and a specific object.

10. A non-transitory computer readable medium storing computer readable instructions thereon that, when executed by a computer, causes the computer to perform a method comprising:
detecting, by each of a plurality of sensors, each sensor associated with a corresponding object of a plurality of objects, an interaction between the corresponding object and a person;
transmitting interaction information to a server over a network, the interaction information describing actions taken by the person against the corresponding object, the actions including at least one of driving, cleaning, and repairing;
receiving, by the server, the interaction information from the plurality of sensors;
generating an emotional value for each of the plurality of objects based on the interaction information;
determining a value of each of the plurality of objects based on the generated emotional value;
acquiring at least one emotional value of the generated emotional values from the server based on an identification of the person and search conditions, the search conditions including at least one maker name of an object of the plurality of objects; and
providing personal credit information of the person based on the acquired at least one emotional value; and
circuitry configured to generate an absolute numerical emotional value based on information related to interactions between one of the plurality of objects and other ones of the plurality of objects and a relative value based on information related to an interaction between the one of the plurality of objects and a specific object.

11. The information processing system according to claim 1, wherein the determination of the value of each of the plurality of objects is also based on a monetary value.

12. The information processing system according to claim 1, wherein the emotional values are acquired based on the search conditions designated by the person.

* * * * *